US011132881B2

(12) United States Patent
Wild et al.

(10) Patent No.: US 11,132,881 B2
(45) Date of Patent: Sep. 28, 2021

(54) ELECTRONIC DEVICES CAPABLE OF COMMUNICATING OVER MULTIPLE NETWORKS

(71) Applicant: Amazon Technologies, Inc., Seattle, WA (US)

(72) Inventors: Ben Wild, Marina Del Rey, CA (US); Matthew J. England, Santa Monica, CA (US); Mark Siminoff, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 16/368,406

(22) Filed: Mar. 28, 2019

(65) Prior Publication Data

US 2019/0347916 A1   Nov. 14, 2019

Related U.S. Application Data

(60) Provisional application No. 62/680,869, filed on Jun. 5, 2018, provisional application No. 62/668,538, filed on May 8, 2018.

(51) Int. Cl.
    G08B 13/196   (2006.01)
    H04L 29/08    (2006.01)
    (Continued)

(52) U.S. Cl.
    CPC ........ G08B 13/19656 (2013.01); H04L 12/46 (2013.01); H04L 67/1095 (2013.01); H04W 88/16 (2013.01); H04W 84/12 (2013.01)

(58) Field of Classification Search
    CPC .............. G08B 13/19656; H04L 12/46; H04L 67/1095; H04W 88/16
    See application file for complete search history.

(56) References Cited

U.S. PATENT DOCUMENTS 4,764,953 A   8/1988  Chern et al.
5,428,388 A   6/1995  von Bauer et al.
              (Continued)

FOREIGN PATENT DOCUMENTS

CN   2585521    11/2003
CN   2792061     6/2006
              (Continued)

OTHER PUBLICATIONS

The PCT Search Report and Written Opinion dated Jun. 12, 2019 for PCT Application No. PCT/US2019/024673, 14 pages.

(Continued)

*Primary Examiner* — Habte Mered
(74) *Attorney, Agent, or Firm* — Lee & Hayes, P.C.

(57) ABSTRACT

This application is directed to an electronic device that acts as a bridge between a remote system and one or more other electronic devices. For instance, the electronic device may establish a first network connection using one or more network interfaces and a second network connection using the one or more network interfaces. In some instances, the first network connection includes a wireless local area network and the second network connection includes a low-power wide-area network. The electronic device may then receive data from the remote system over the first network connection, where the data represents a command for an additional electronic device. Using the data, the electronic device may transmit a data packet to the additional electronic device over the second network connection. The data packet may represent at least an identifier of the additional electronic device and the command.

20 Claims, 26 Drawing Sheets

(51) Int. Cl.
*H04W 88/16* (2009.01)
*H04L 12/46* (2006.01)
*H04W 84/12* (2009.01)

(56) References Cited

U.S. PATENT DOCUMENTS

| | | | |
|---|---|---|---|
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1 | 8/2002 | Xin |
| 6,456,322 | B1 | 9/2002 | Marinacci |
| 6,476,858 | B1 | 11/2002 | Ramirez Diaz et al. |
| 6,633,231 | B1 | 10/2003 | Okamoto et al. |
| 6,658,091 | B1 | 12/2003 | Naidoo et al. |
| 6,753,774 | B2 | 6/2004 | Pan et al. |
| 6,970,183 | B1 | 11/2005 | Monroe |
| 7,062,291 | B2 | 6/2006 | Ryley et al. |
| 7,065,196 | B2 | 6/2006 | Lee |
| 7,085,361 | B2 | 8/2006 | Thomas |
| 7,109,860 | B2 | 9/2006 | Wang |
| 7,193,644 | B2 | 3/2007 | Carter |
| 7,304,572 | B2 | 12/2007 | Sheynman et al. |
| 7,382,249 | B2 | 6/2008 | Fancella |
| 7,450,638 | B2 | 11/2008 | Iwamura |
| 7,643,056 | B2 | 1/2010 | Silsby |
| 7,683,924 | B2 | 3/2010 | Oh et al. |
| 7,683,929 | B2 | 3/2010 | Elazar et al. |
| 7,738,917 | B2 | 6/2010 | Ryley et al. |
| 8,139,098 | B2 | 3/2012 | Carter |
| 8,144,183 | B2 | 3/2012 | Carter |
| 8,154,581 | B2 | 4/2012 | Carter |
| 8,619,136 | B2 | 12/2013 | Howarter et al. |
| 8,780,201 | B1 | 7/2014 | Scalisi et al. |
| 8,823,795 | B1 | 9/2014 | Scalisi et al. |
| 8,842,180 | B1 | 9/2014 | Kasmir et al. |
| 8,872,915 | B1 | 10/2014 | Scalisi et al. |
| 8,937,659 | B1 | 1/2015 | Scalisi et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 9,013,575 | B2 | 4/2015 | Scalisi |
| 9,049,352 | B2 | 6/2015 | Scalisi et al. |
| 9,053,622 | B2 | 6/2015 | Scalisi |
| 9,058,738 | B1 | 6/2015 | Scalisi |
| 9,060,103 | B2 | 6/2015 | Scalisi |
| 9,060,104 | B2 | 6/2015 | Scalisi |
| 9,065,987 | B2 | 6/2015 | Kasmir et al. |
| 9,094,584 | B2 | 7/2015 | Scalisi et al. |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,142,214 | B2 | 9/2015 | Scalisi |
| 9,160,987 | B1 | 10/2015 | Kasmir et al. |
| 9,165,444 | B2 | 10/2015 | Scalisi |
| 9,172,920 | B1 | 10/2015 | Kasmir et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi et al. |
| 9,179,108 | B1 | 11/2015 | Scalisi et al. |
| 9,179,109 | B1 | 11/2015 | Kasmir et al. |
| 9,196,133 | B2 | 11/2015 | Scalisi et al. |
| 9,197,867 | B1 | 11/2015 | Scalisi et al. |
| 9,230,424 | B1 | 1/2016 | Scalisi et al. |
| 9,237,318 | B2 | 1/2016 | Kasmir et al. |
| 9,247,219 | B2 | 1/2016 | Kasmir et al. |
| 9,253,455 | B1 | 2/2016 | Harrison et al. |
| 9,342,936 | B2 | 5/2016 | Scalisi |
| 9,508,239 | B1 | 11/2016 | Harrison et al. |
| 9,736,284 | B2 | 8/2017 | Scalisi et al. |
| 9,743,049 | B2 | 8/2017 | Scalisi et al. |
| 9,769,435 | B2 | 9/2017 | Scalisi et al. |
| 9,786,133 | B2 | 10/2017 | Harrison et al. |
| 9,799,183 | B2 | 10/2017 | Harrison et al. |
| 10,601,604 | B2 * | 3/2020 | Kozura ............... H04L 12/2816 |
| 2002/0094111 | A1 | 7/2002 | Puchek et al. |
| 2002/0147982 | A1 | 10/2002 | Naidoo et al. |
| 2003/0043047 | A1 | 3/2003 | Braun |
| 2004/0085205 | A1 | 5/2004 | Yeh |
| 2004/0085450 | A1 | 5/2004 | Stuart |
| 2004/0086093 | A1 | 5/2004 | Schranz |
| 2004/0095254 | A1 | 5/2004 | Maruszczak |
| 2004/0135686 | A1 | 7/2004 | Parker |
| 2005/0111660 | A1 | 5/2005 | Hosoda |
| 2006/0010199 | A1 | 1/2006 | Brailean et al. |
| 2006/0022816 | A1 | 2/2006 | Yukawa |
| 2006/0139449 | A1 | 6/2006 | Cheng et al. |
| 2006/0155851 | A1 | 7/2006 | Ma et al. |
| 2006/0156361 | A1 | 7/2006 | Wang et al. |
| 2007/0008081 | A1 | 1/2007 | Tylicki et al. |
| 2010/0225455 | A1 | 9/2010 | Claiborne et al. |
| 2013/0057695 | A1 | 3/2013 | Huisking |
| 2014/0098227 | A1 | 4/2014 | Chen et al. |
| 2014/0267716 | A1 | 9/2014 | Child et al. |
| 2015/0035987 | A1 | 2/2015 | Fernandez |
| 2015/0163463 | A1 | 6/2015 | Hwang et al. |
| 2016/0132031 | A1 * | 5/2016 | Kozura ............... H04L 12/2816 700/275 |
| 2017/0171517 | A1 | 6/2017 | Modestine et al. |
| 2017/0367049 | A1 * | 12/2017 | Hanchett ................ G06F 8/658 |
| 2018/0077391 | A1 | 3/2018 | Siminoff et al. |
| 2018/0176512 | A1 | 6/2018 | Siminoff |
| 2018/0288761 | A1 * | 10/2018 | Gordon ............ H04W 72/0446 |
| 2019/0364503 | A1 * | 11/2019 | Kasslin ................ H04W 52/02 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |
| WO | WO2014144628 | 9/2014 |

OTHER PUBLICATIONS

Woo-Hyun et al, "IoT Smart Bell Notification System: Design and Implementation", 2017 19th International Conference on Advanced Communication Technology 9ICACT), Global IT Research Institute—GIRI, Feb. 19, 2018, pp. 298-300.

* cited by examiner

ELECTRONIC DEVICES CAPABLE OF COMMUNICATING OVER MULTIPLE NETWORKS

RELATED APPLICATIONS

This application claims priority to U.S. Provisional Patent Application Ser. No. 62/668,538, filed on May 8, 2018, titled "MULTI-BUTTON AUDIO/VIDEO RECORDING AND COMMUNICATION DEVICE," and U.S. Provisional Patent Application Ser. No. 62/680,869, filed on Jun. 5, 2018, titled "AUDIO/VIDEO DOORBELLS CAPABLE OF COMMUNICATING OVER MULTIPLE NETWORKS," the entire contents of which are incorporated herein by reference.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present A/V doorbells capable of communicating over multiple networks now will be discussed in detail with an emphasis on highlighting the advantageous features. These embodiments depict the novel and non-obvious A/V doorbells capable of communicating over multiple networks, as shown in the accompanying drawings, which are for illustrative purposes only. These drawings include the following figures, in which like numerals indicate like parts.

DETAILED DESCRIPTION

Figure 1:
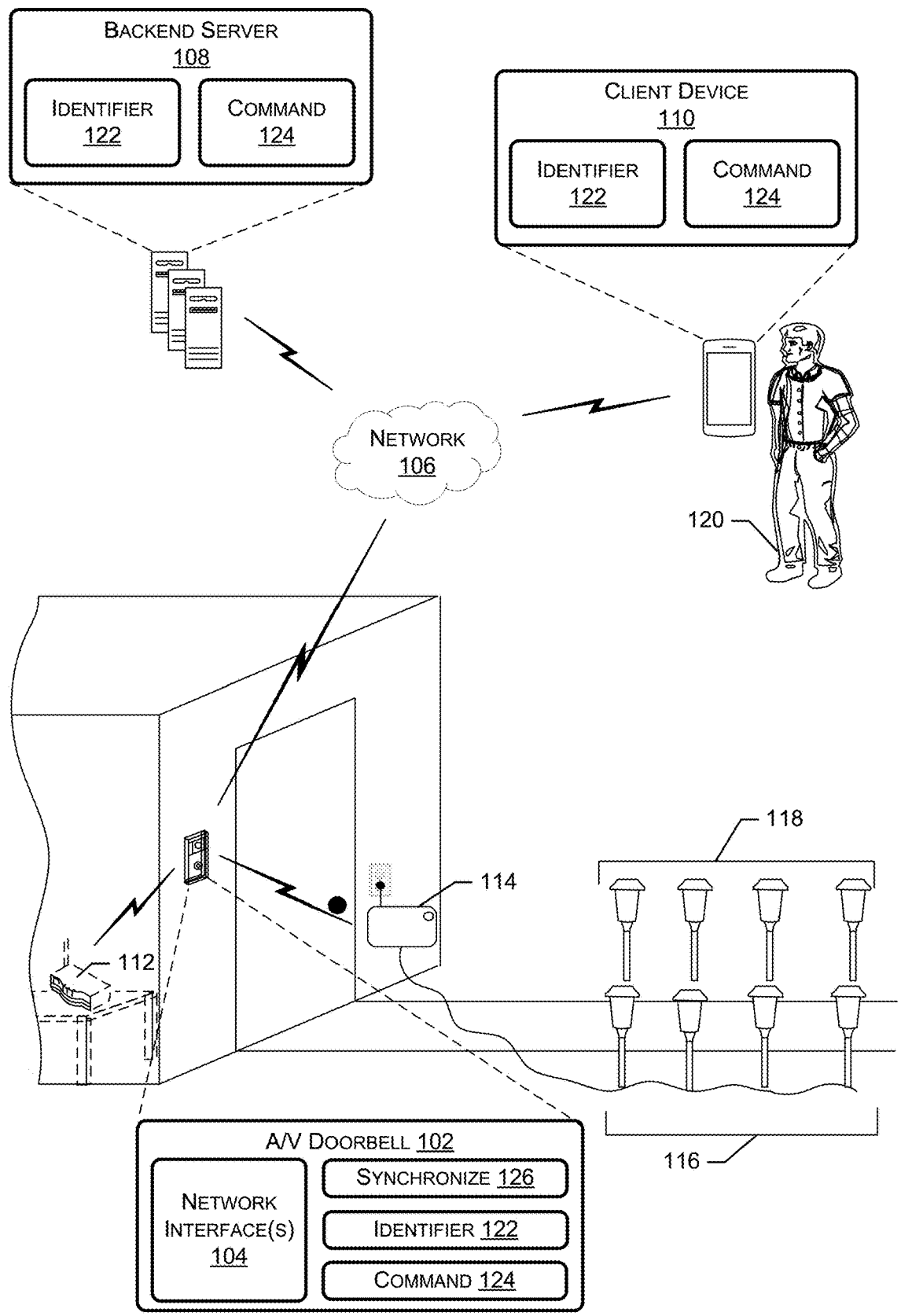
FIG. 1 is a schematic diagram of an example of an A/V doorbell communicating with electronic devices using multiple networks, according to various aspects of the present disclosure.

One aspect of the present embodiments includes the realization that, historically, A/V recording and communication doorbells (also referred to as "A/V doorbells") have been used for the purpose of triggering a notification that a person is present at the property. As A/V doorbells become integrated with home automation and security systems, a need arises to leverage additional functionalities of the A/V doorbells. For example, in order to improve the integration of the A/V doorbells with the home automation and the security systems, it may be advantageous to provide additional functionality with regard how the A/V doorbells communicate with other network devices.

The present embodiments solve these problems by providing an A/V doorbell that is capable of communicating over different types of networks in order to communicate with both remote network devices and local network devices. For example, the A/V doorbell may use a first network interface to communicate over a first network with remote network devices, such as a backend server and a client device. In some examples, the first network may include a wireless local area network, such as, but not limited to, the Internet, a local intranet, a Personal Area Network (PAN), a Local Area Network (LAN), a Wide Area Network (WAN), and/or the like. The A/V doorbell may further use the first network interface and/or a second network interface to communicate over a second network with local network devices, such as a hub device, an automation device, and/or other electronic devices. In some examples, the second network may include a low-power wide-area network (LPWAN), such as, but not limited to, a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

By configuring the A/V doorbell to communicate over the different types of networks, the A/V doorbell may operate as a "bridge" between the remote network devices and the local network devices. For example, the A/V doorbell may receive a first data packet from a remote network device over the first network, where the first data packet indicates a command to be performed by a local network device. The A/V doorbell may then use the first data packet to generate a second data packet for the local network device. In some examples, the second data packet may include first data for synchronizing the A/V doorbell with the local network device, second data representing an identifier of the local network device, and third data representing the command to be performed by the local network device. The A/V doorbell may then transmit, over the second network, at least a portion of the second data packet to the local network device. In response to receiving the at least the portion of the second data packet, the local network device may perform the command as represented by the second data packet. In some examples, the A/V doorbell may then receive, over the second network, fourth data from the local network device, where the fourth data indicates that the command was performed. In response, the A/V doorbell may transmit, over the first network, the fourth data to the network device. As a result, the A/V doorbell is able to facilitate communication between local network devices and remote network devices without requiring a homeowner to invest in additional devices configured only to perform the functions that can now be performed as an additional function of the A/V doorbell. In addition, because an A/V doorbell may already be located outside of a home or other structure, the A/V doorbell may have a more clear communication path with local network devices that may also be installed on the outside of the home or other structure.

The present disclosure describes, in part, an A/V doorbell that is capable of communicating over different types of networks in order to communicate with both remote network devices and local network devices. For example, the A/V doorbell may include a first network interface that is capable of communicating with first network devices over a first network (e.g., using a first wireless protocol). In some examples, the first network may include a wireless local area network, such as, but not limited to, the Internet, a local intranet, a PAN, a LAN, a WAN, and/or the like. In some examples, the first network devices may include remote network devices, such as, but are not limited to, a backend server, a client device, and/or any other type of device that the A/V doorbell may communicate with over the first network. To communicate with a first network device over the first network, the A/V doorbell may use the first network interface to transmit data to a networking device (e.g., a router), where the networking device then forwards the data to the first network device. Additionally, the first network device may transmit data to the networking device, where the networking device then transmits the data to the A/V doorbell.

The A/V doorbell may further include a second network interface that is capable of communicating with second network devices over a second network (e.g., using a second wireless protocol). In some examples, the second network interface may include and/or be similar to the first network interface. In other examples, the second network interface may include a different network interface than the first network interface. In some examples, the second network may include a LPWAN, such as, but not limited to, a CSS modulation technology network (e.g., LoRaWAN), an Ultra Narrow Band modulation technology network (e.g., Sigfox, Telensa, NB-IoT, etc.), RingNet, and/or the like. In some examples, the second network devices may include local network devices, such as, but not limited to, a client device, an automation device (e.g., motion sensor, light sensor, light emitter, locking mechanism, etc.), a sensor, a transformer, and/or any other type of device that the A/V doorbell may communicate with over the second network. To communicate with a second network device over the second network, the A/V doorbell may use the second network interface to transmit data directly to the second network device. Additionally, the A/V doorbell may use the second network interface to receive data directly from the second network device and, in some embodiments, transmit (or forward) the data to the first network device.

In some examples, such as to conserve power of the A/V doorbell (e.g., conserve battery power), the A/V doorbell may deactivate (e.g., turn off, cease providing power to, put into a low power mode, etc.) the first network interface and/or the second network interface. For a first example, the A/V doorbell may deactivate the first network interface when the A/V doorbell is not transmitting and/or receiving data over the first network. At first time intervals, the A/V doorbell may then activate (e.g., turn on, provide power to, put into a high power mode, etc.) the first network interface, such as to transmit data to the networking device in order to stay logged into the first network and/or receive data from the first network devices. The first time intervals may include, but are not limited to, ten milliseconds, fifty milliseconds, one second, five seconds, and/or the like. If the A/V doorbell does not have additional data to transmit over the first network and/or does not begin receiving additional data over the first network, the A/V doorbell may once again deactivate the first network interface.

For a second example, the A/V doorbell may deactivate (e.g., turn off, cease providing power to, put into a low power mode, etc.) the second network interface when the A/V doorbell is not transmitting and/or receiving data over the second network. At second time intervals, the A/V doorbell may then activate (e.g., turn on, provide power to, put into a high power mode, etc.) the second network interface, such as to transmit data to the second network devices and/or receive data from the second network devices. The second time intervals may include, but are not limited to, ten milliseconds, fifty milliseconds, one second, five second, and/or the like. If the A/V doorbell does not have additional data to transmit over the second network and/or does not being receiving additional data over the second network, the A/V doorbell may once again deactivate the second network interface.

In some examples, the A/V doorbell may use more power communicating over the first network (e.g., using the first network interface) than communicating over the second network (e.g., using the second network interface). As such, the first time intervals used to activate the first network interface for communicating over the first network may be greater than the second time intervals used to activate the second network interface for communicating over the second network. Additionally, in some examples, the A/V doorbell may receive, over the second network, data from a second network device while the second network interface is activated. In such examples, the data may include a command to activate the first network interface for communicating over the first network. In response, the A/V doorbell may activate the first network interface for communicating over the first network. The A/V doorbell may then transmit data over the first network and/or receive data from a first network device (e.g., the backend server) over the first network. In some examples, by activating the first network interface in response to receiving the data over the second network, the A/V doorbell is capable to activating the first network interface less frequently and as such, conserve a greater amount of power.

In some examples, the A/V doorbell may operate as a "bridge" device so that the first network devices may communicate with the second network devices. For example, a first network device, such as the backend server, may transmit data (referred to, in this example, as "first data") to the A/V doorbell. In some examples, the first data may correspond to a first data packet that includes at least data (referred to, for this example, as "second data") representing an identifier associated with a second network device and data (e.g., referred to, for this example, as "third data") representing a command to be performed by the second network device. The A/V doorbell may receive the first data from the backend server over the first network (e.g., the networking device may forward the first data to the A/V doorbell). In response, the A/V doorbell may determine that the first data packet includes the second data representing the identifier of the second network device and determine that the first data packet includes the third data representing the command. The A/V doorbell may then transmit data (e.g., referred to, in this example, as "fourth data") to the second network device over the second network.

In some examples, the fourth data may correspond to a second data packet generated by the A/V doorbell. The second data packet may include data (e.g., a header, a preamble, etc.) (referred to, for this example, as "fifth data") that synchronizes the A/V doorbell with the second network device, data (referred to, in this example, as "sixth data") representing the identifier of the second network device, and/or data (referred to, in this example, as "seventh data") representing the command to be performed by the second network device. In some examples, the fifth data may include additional data that identifies a network of devices, where the network devices include at least some of the second network devices. For examples, the fifth data may identify the second network at which the A/V doorbell is communicating (e.g., data that identifies the low-power wide-area network), data (e.g., a sync word) indicating that the second network is associated with the second network devices that are included in the A/V doorbell's network, and/or data that identifies the A/V doorbell. In some examples, the A/V doorbell may generate the sixth data using the identifier of the second network device and/or generate the seventh data using the command to be performed by the second network device.

Additionally, or alternatively, in some examples, the sixth data and/or the seventh data may include the second data and the third data, respectively. For example, since the second data and/or the third data were transmitted using a first protocol associated with the first network, the A/V doorbell may respectively convert the second data and/or the third data to the sixth data and/or the seventh data, which the A/V doorbell is able to transmit using the second network that is associated with a second protocol. For example, the A/V doorbell may use a protocol converter to convert the second data, which may include a first data format that is configured to be transmitted over the first network (e.g., a data format that is configured to be transmitted over the wireless local area network), to the sixth data, which may include a second data format that is configured to be transmitted over the second network (e.g., a data format that is configured to be transmitted over the LPWAN). Additionally, the A/V doorbell may use the protocol converter to convert the third data, which may include the first data format that is configured to be transmitted over the first network, to the seventh data, which may include the second data format that is configured to be transmitted over the second network.

The A/V doorbell may then transmit, over the second network, at least a portion of the second data packet to the second network device. For example, the second network device may transition from operating in a deactivated mode, in which the second network device disables (e.g., turns off, ceases providing power to, etc.) a network interface in order to save power, to operating in an active mode, in which the second network device activates (e.g., turns on, provides power to, etc.) the network interface. While operating in the active mode, the second network device may receive at least a portion of the fifth data included the second data packet. In response, the second network device may determine to continue to operate in the active mode. The second network device, while still operating in the active mode, may then receive the sixth data and the seventh data included the second data packet. The second network device may then determine, based on the sixth data, that the second data packet is directed to the second network device. Additionally, the second network device may determine, based on the seventh data, the command to be performed by the second network device.

The second network device may then perform the command represented by the second data packet. For a first example, if the second network device includes a light emitter, the command may cause the light emitter to begin emitting light or cease from emitting light. For a second example, if the second network device includes a transformer, the command may cause the transformer to activate at least one light emitter (e.g., begin providing power to the at least one light emitter) or deactivate the at least one light emitter (e.g., cease from providing power to the at least one light emitter). For a third example, if the second network device includes a locking mechanism, such as on an entrance (e.g., a door, gate, window, etc.) of a property, the command may cause the locking mechanism to lock the entrance or unlock the entrance. In either of the examples, the A/V doorbell may receive, over the second network, data (referred to, in this example, as "eighth data") from the second network device, where the eighth data indicates that the command was performed. The A/V doorbell may then transmit the eighth data (and/or additional data that indicates that the command was performed) to the first network device (e.g., the backend server) over the first network.

Additionally to, or alternatively from, transmitting the second data packet, the A/V doorbell may separately transmit the fifth data, the sixth data, and/or the seventh data. For example, the A/V doorbell may transmit data (referred to, in this example, as "ninth data") over the second network, where the ninth data is configured to synchronize the A/V doorbell with second network device(s). For example, the ninth data may indicate time(s) that the second network device(s) are to transition from operating in a deactivated mode, where network interface(s) for the second network device(s) are deactivated, to an active mode, where the network interface(s) are activated. In some examples, the A/V doorbell transmits the ninth data at given time intervals. The given time intervals may include, but are not limited to, one second, five seconds, ten seconds, and/or the like. The second network device(s) may then receive the ninth data from the A/V doorbell and, in response, activate the network interface(s) at the time(s) indicated by the ninth data. Additionally, at one of the time(s) indicated by the ninth data, the A/V doorbell may transmit, over the second network, the sixth data and/or the seventh data to the second network device, which will be operating in the active mode. This process, in some examples, may be performed using time-division multiplexing (TDM).

In some examples, in addition to, or alternatively from, causing the second network device to perform the command (e.g., generating and transmitting the second data packet) based on receiving the first data packet, the A/V doorbell may update configuration data using the first data packet. For example, the A/V doorbell may include at least a first input interface which, based on receiving input, causes the A/V doorbell to signal a signaling device (e.g., a doorbell chime, a wireless speaker, etc.) to output sound. The A/V doorbell may further include at least a second input interface that may be customized by a user of the A/V doorbell. For example, based on receiving the first data packet, the A/V doorbell may update the configuration data to associate the command to be performed by the second network device with the second input interface. After updating the configuration data, the A/V doorbell may receive an input using the second input interface. In response, the A/V doorbell may cause the second network device to perform the command, such as by generating and then transmitting, over the second network, the second data packet to the second network device.

In some examples, the A/V doorbell may communicate with at least one other A/V doorbell over the second network. For example, the A/V doorbell may be located at a first geographical location, such as a first property. Additionally, a second A/V doorbell may be located at a second geographic location, such as a second property. The A/V doorbell may then transmit, over the second network, data to the second A/V doorbell, which may then forward the data to one of the first network devices (e.g., the backend server). In some examples, the A/V doorbell may transmit the data to the second A/V doorbell based on the A/V doorbell not being able to connect to the first network. In some examples, the A/V doorbell may be associated with a first user and/or first user profile while the second A/V doorbell is associated with a second user and/or second user profile. In some examples, by communicating between A/V doorbells over the second network, A/V doorbells located within a geographic area may be able to create a network that other network devices located within the geographic area may connect with. The geographic area may include, but is not limited to, a neighborhood, a city, a state, a defined area, and/or the like.

In some examples, the A/V doorbell may transmit data using at least a first synchronization technique (e.g., coordinated network technique) and/or a second synchronization technique (e.g., an uncoordinated network technique). When communicating using the first synchronization technique, the A/V doorbell may transmit, using the network interface(s), data (e.g., the ninth data) that is configured to synchronize the A/V doorbell with the second network devices. For example, the data may indicate time(s) in which the second network devices are to transition from a deactivated mode, in which the second network devices are not receiving and/or transmitting data (e.g., network interfaces of the second network devices are deactivated), to an activated mode, in which the second network devices are capable of receiving and/or transmitting data (e.g., the network interfaces of the second network devices are activated). In some examples, the data may indicate different times(s) for different network devices. For example, the data may indicate that at least a first of the second network device is to be activated at first time(s), at least a second of the second network device(s) is to be activated at second time(s), and/or so forth. In some examples, the A/V doorbell may transmit the data at given time intervals. The given time intervals may include, but are not limited to, a millisecond, ten milliseconds, sixty-four milliseconds, two-hundred-fifty milliseconds, five-hundred milliseconds, seven-hundred-fifth milliseconds, every second, every five seconds, every ten seconds, and/or the like.

While communicating using the first synchronization technique, the A/V doorbell may activate the network interface(s) at the given time(s) to transmit data to and/or receive data from the second network devices. For example, if the A/V doorbell is storing data (e.g., the sixth data and/or the seventh data described above) that is to be transmitted to a second network device, the A/V doorbell may activate the network interface(s) for communicating over the second network at the time that is designated for synchronizing with the second network device. The A/V doorbell may then transmit the data over the second network to the second network device. Additionally, even if the A/V doorbell is not storing data that is to be transmitted to the second network device, the A/V doorbell may still activate the network interface(s) for communicating over the second network at the time that designated for synchronizing with the second network device in order to receive data from the second network device (e.g., if the second network device transmits data).

When communicating using the second synchronization technique, the A/V doorbell may generate the second data packet that includes the fifth data for synchronizing the A/V doorbell with the second network devices, the sixth data, and/or the seventh data. The A/V doorbell may generate the fifth data such that, when transmitting the second data packet, the length of time that it takes to transmit the fifth data is long enough for the second network devices to receive the fifth data while the second network devices are activated. For example, the second network devices may deactivate their network interfaces such that the second network devices are not able to receive data. At given time intervals (e.g., every 1 millisecond, 64 milliseconds, 1 second, 5 seconds, and/or the like), the second network devices may activate the network devices in order to determine if other network devices (e.g., the A/V doorbell) are transmitting data. As such, the length of time that it takes for the A/V doorbell to transmit the fifth data should be at least the given time interval used by the second network devices. This way the second network devices receive the fifth data and stay activated in order to receive the rest of the second data packet.

In some examples, the fifth data may identify the second network at which the A/V doorbell is communicating (e.g., data that identifies the low-power wide-area network), data (e.g., a sync word) indicating that the second network is associated with the second network devices) that are included in the A/V doorbells network, and/or data that identifies the A/V doorbell. In some examples, communicating using the first synchronization technique may consume more power than communicating using the second synchronization technique. As such, in some examples, the A/V doorbell may communicate using the first synchronization technique when the A/V doorbell is receiving power from an external source and communicate using the second synchronization technique when the A/V doorbell is receiving power from the battery. Additionally, in some examples, the A/V doorbell may communicate using both the first synchronization technique and the second synchronization technique.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic diagram of an example of an A/V doorbell 102 communicating with electronic devices using multiple networks, according to various aspects of the present disclosure. For example, the A/V doorbell 102 may include a first network interface 104 that is capable of communicating with first network devices (e.g., remote network devices) over a first network 106 (e.g., using a first wireless protocol). In the example of FIG. 1, the first network devices include a backend server 108 and a client device 110. The first network may include a wireless local area network, such as, but not limited to, the Internet, a local intranet, a PAN, a LAN, a WAN, and/or the like. For example, to communicate with the first network devices over the first network 106, the A/V doorbell 102 may use the first network interface 104 to transmit data to a networking device 112 (e.g., a router), where the networking device 112 then forwards the data to the first network devices. Additionally, the first network devices may transmit data to the networking device 112, where the networking device 112 then transmits the data to the A/V doorbell 102.

The A/V doorbell 102 may further include a second network interface 104 that is capable of communicating with second network devices (e.g., local network devices) over a second network (e.g., using a second wireless protocol). In some examples, the second network interface 104 may include and/or be similar to the first network interface 104. In other examples, the second network interface 104 may include a different network interface than the first network interface 104. In the example of FIG. 1, the second network devices include an electronic device 114 (e.g., a transformer device), which controls light emitters 116, and light emitters 118. The second network may include a LPWAN, such as, but not limited to, a CSS modulation technology network (e.g., LoRaWAN), an Ultra Narrow Band modulation technology network (e.g., Sigfox, Telensa, NB-IoT, etc.), Ring-Net, and/or the like. For example, to communicate with a second network device over the second network, the A/V doorbell 102 may use the second network interface 104 to transmit data directly to the second network device. Additionally, the A/V doorbell 102 may use the second network interface 104 to receive data directly from the second network device.

In some examples, such as to conserve power of the A/V doorbell 102 (e.g., conserve battery power), the A/V doorbell 102 may deactivate (e.g., turn off, cease providing power to, enter a low power mode, etc.) the first network interface 104 and/or the second network interface 104. For a first example, the A/V doorbell 102 may deactivate the first network interface 104 when the A/V doorbell 102 is not transmitting and/or receiving data over the first network 106. At first time intervals, the A/V doorbell 102 may then activate (e.g., turn on, provide power to, enter a high power mode, etc.) the first network interface 104, such as to transmit data to the networking device 112 in order to stay logged into the first network 106 and/or receive data from the networking device 112. The first time intervals may include, but are not limited to, ten milliseconds, fifty milliseconds, one second, five second, and/or the like. In some examples, if the A/V doorbell 102 does not have additional data to transmit over the first network 106 and/or does not begin receiving additional data over the first network 106, the A/V doorbell 102 may once again deactivate the first network interface 104.

For a second example, the A/V doorbell 102 may deactivate the second network interface 104 when the A/V doorbell 102 is not transmitting and/or receiving data over the second network. At second time intervals, the A/V doorbell 102 may then activate (e.g., turn on, provide power, enter a low power mode, etc.) the second network interface 104, such as to transmit data to the second network devices and/or receive data from the second network devices. The second time intervals may include, but are not limited to, ten milliseconds, fifty milliseconds, one second, five second, and/or the like. In some examples, if the A/V doorbell 102 does not have additional data to transmit over the second network and/or does not begin receiving additional data over the second network, the A/V doorbell 102 may once again deactivate the second network interface 104.

In some examples, the A/V doorbell 102 may use more power communicating over the first network 106 (e.g., using the first network interface 104) than communicating over the second network (e.g., using the second network interface 104). As such, the first time intervals used to activate the first network interface 104 for communicating over the first network 106 may be greater than the second time intervals used to activate the second network interface 104 for communicating over the second network interface. Additionally, in some examples, the A/V doorbell 102 may receive, over the second network, data from a second network device while the second network interface 104 is activated. In such examples, the data may include a command to activate the first network interface 104 for communicating over the first network 106. In response, the A/V doorbell 102 may activate the first network interface 104 for communicating over the first network 106 and receive data from one of the first network devices in response. By activating the first network interface 104 in response to receiving the data over the second network, the A/V doorbell 102 is capable to activating the first network interface 104 less frequently and as such, conserve a greater amount of power.

In the example of FIG. 1, the A/V doorbell 102 may operate as a "bridge" between the first network devices and the second network devices. For example, a user 120 of the client device 110 may want to activate the light emitters 116. To activate the light emitters 116, the client device 110 may receive input indicating an identifier 122 associated with the electronic device 114 that controls the light emitters 116 as well as a command 124 to activate the light emitters 116. The client device 110 may then transmit data representing the identifier 122 and the command 124 to the backend server 108. The backend server 108 may receive the data from the client device 110. Based on receiving the data, the backend server 108 may transmit first data representing the identifier 122 and second data representing the command 124 to the A/V doorbell 102. In some examples, to transmit the first data and the second data, the backend server 108 generates a first data packet that includes the first data and the second data. The backend server 108 then transmits the first data packet to the A/V doorbell 102 over the first network 106.

The A/V doorbell 102 may receive, over the first network 106, the first data and the second data (e.g., the first data packet) from the backend server 108. The A/V doorbell 102 may then transmit, over the second network and to the electronic device 114, at least a portion of third data for synchronizing 126 the A/V doorbell 102 with the electronic device 114, fourth data representing the identifier 122, and fifth data representing the command 124 to be performed by the electronic device 114. In some examples, to transmit the third data, the fourth data, and the fifth data, the A/V doorbell 102 may initially generate a second data packet that includes the third data, the fourth data, and the fifth data. The A/V doorbell 102 may then transmit, over the second network, at least a portion of the second data packet to the electronic device 114. In some examples, the A/V doorbell 102 may generate the fourth data using the identifier 122 of the electronic device 114 and/or generate the fifth data using the command 124 to be performed by the electronic device 114.

Additionally, or alternatively, in some examples, the fourth data and/or the fifth data may include the first data and the second data, respectively. For example, the first data and/or the second data may be retrieved from the first data packet, and the first data and/or the second data may then be included in the second data packet (as the fourth data and/or the fifth data, respectively) during generation of the second data packet. As an alternate example, since the first data and/or the second data were transmitted using a first protocol associated with the first network 106, the A/V doorbell 102 may convert or translate (e.g., using a protocol converter) the first data and/or the second data to the fourth data and/or the fifth data, respectively, which the A/V doorbell 102 is able to transmit over the second network associated with the second protocol. For example, the A/V doorbell 102 may use a protocol converter to convert the first data, which may include a first data format that is configured to be transmitted over the first network (e.g., a data format that is configured to be transmitted over the wireless local area network), to the fourth data, which may include a second data format that is configured to be transmitted over the second network (e.g., a data format that is configured to be transmitted over the LPWAN). Additionally, the A/V doorbell 102 may use the protocol converter to convert the second data, which may include the first data format that is configured to be transmitted over the first network, to the fifth data, which may include the second data format that is configured to be transmitted over the second network.

The electronic device 114 may receive at least a portion of the third data, the fourth data, and the fifth data (e.g., within the second data packet) from the A/V doorbell 102. The electronic device 114 may then use the fourth data representing the identifier 122 to determine that the fifth data representing the command 124 is directed to the electronic device 114 (e.g., determine that the second data packet is directed to the electronic device 114). In response, the electronic device 114 may perform the command 124, which may include causing the light emitters 116 to activate. For example, based on receiving the fifth data representing the command 124, the electronic device 114 may begin providing power to the light emitters 116 (e.g., by closing a switch, thereby supplying power to the light emitters 116) such that the light emitters 116 begin emitting light. In some examples, the A/V doorbell 102 may then receive, over the second network, sixth data from the electronic device 114, where the sixth data indicates that the command 124 has been performed (e.g., the light emitters 116 are activated). The A/V doorbell 102 may then transmit, over the first network 106, seventh data to the backend server 108 and/or the client device 110 (which may be via the backend server 108), where the seventh data indicates that the command 124 has been performed by the electronic device 114.

In some examples, the A/V doorbell 102 may further store data that associates the light emitters 116 with the light emitters 118 (and/or the electronic device 114). In such examples, based on receiving the first data representing the identifier 122 and the second data representing the command 124, the A/V doorbell 102 may identify the association between the light emitters 116 and the light emitters 118 (and/or the electronic device 114). Based on the association, the A/V doorbell 102 may determine to cause the light emitters 118 to perform a similar command 124 as the light emitters 116. For example, the A/V doorbell 102 may determine to activate the light emitters 118. To activate the light emitters 118, the A/V doorbell 102 may transmit, over the second network, eighth data to the light emitters 118, where the eighth data includes a command to activate (e.g., to begin emitting light). The light emitters 118 may receive the eighth data from the electronic device 114 and, in response, activate.

Figure 2:
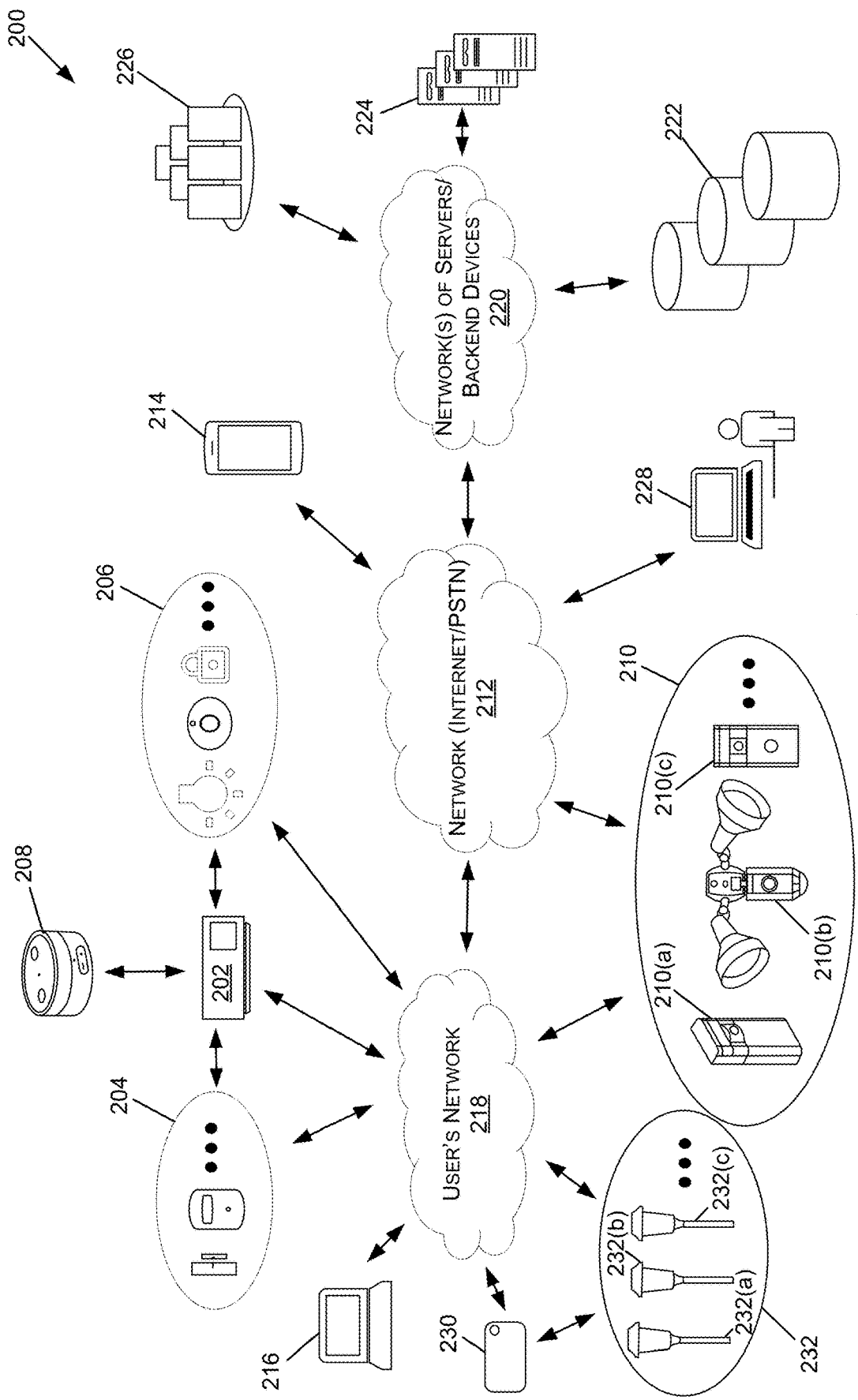
FIG. 2 is a functional block diagram illustrating a system for communicating in a network, according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., homeowners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, electronic device(s) 230 (although only one is shown for clarify reasons), light emitters 232, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system 200 may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, the electronic device(s) 230, the light emitters 232, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210" or "A/V doorbell 210" or "A/V doorbells 210") (which may represent, and/or be similar to, the A/V doorbell 102). The A/V devices 210 may include security cameras 210(*a*), light cameras 210(*b*) (e.g., floodlight cameras, spotlight cameras, etc.), A/V doorbells 210(*c*) (e.g., wall powered and/or battery powered A/V doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3A.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, the electronic device(s) 230, the light emitters 232, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, the electronic device(s) 230, the light emitters 232, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, the electronic device(s) 230, the light emitters 232, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, the electronic device(s) 230, the light emitters 232, or the A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound.

Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The VA device 208, the hub device 202, and/or the combination thereof may be configured to communicate with the A/V devices 210 in response to inputs (e.g., voice inputs, touch inputs, etc.) from users. For example, the VA device 208, the hub device 202, and/or the combination thereof may receive an input indicating a request to turn on the exterior lights (e.g., the light emitter(s) 232). The VA device 208, the hub device 202, and/or the combination thereof may then generate and transmit data representative of the input to the A/V device(s) 210 over the first network. In some examples, the data representative of the input is transmitted to the A/V device(s) 210 over the first network and/or the network (Internet/PSTN) 212 via the backend server 224. In other examples, the data representative of the input is transmitted directly to the A/V device(s) 210 over the first network. In either example, data may be received by the A/V device 210 in a first data packet(s) over the first network. The A/V device 210 may then transmit a signal(s) including a second data packet(s) over the second network to the light emitter(s) 232 (and/or the electronic device(s) 230). The signal(s) may include the data representative of the input, or may include other data representative of the input (e.g., after converting the data representative of the input to data that is appropriate for the protocol of the second network). The light emitter(s) 232 and/or the electronic device(s) 230 may then receive the signal(s), and activate (e.g., turn on) the light emitter(s) 232. As such, even if the VA device 208, the hub device 202, and/or the combination thereof are not able to communicate over the second network (e.g., don't include a network interface capable of communication over the second network, or are out of range of the light emitter(s) 232 and/or electronic device(s) 230), the A/V device(s) 210 may be able to act as the "bridge" and provide the data (e.g., identifiers, commands, etc.) to the light emitter(s) 232 and/or electronic device(s) 230 via the second network.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices. In some examples, the electronic device(s) 230 and/or the light emitters 232 may be considered automation devices and/or may be considered part of an automation device or system (e.g., an outdoor lighting system, an indoor lighting system, and indoor/outdoor lighting system, etc.).

As described herein, in some of the present embodiments, some or all of the client devices 214, 216, the A/V device(s) 210, the smart-home hub device 202, the VA device 208, the sensors 204, the automation devices 206, the electronic device(s) 230, and/or the light emitters 232 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 110). The client devices 214, 216 may communicate with and/or be associated with (e.g., capable of access to and control of) the A/V devices 210, a smart-home hub device 202, the VA device 208, sensors 204, automation devices 206, the electronic device(s) 230, and/or the light emitters 232. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, the electronic device(s) 230, the light emitters 232, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

With further reference to FIG. 2, the system 200 may also include a security monitoring service 228. The security monitoring service 228 may be operated by the same company that manufactures, sells, and/or distributes the A/V devices 210, the hub device 202, the VA device 208, the electronic device(s) 230, the light emitters 232, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the electronic device(s) 230, the light emitters 232, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, turn on and off one or more of the light emitters 232, etc.). For example, the security monitoring service 228 may operate and control their own client devices and/or network of servers/backend devices for monitoring and/or controlling security systems. In such an example, the A/V devices 210, the hub device 202, the VA device 208, the electronic device(s) 230, the light emitters 232, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

The system 200 may also include the electronic device(s) 230 (which may represent, and/or be similar to, the electronic device 114). The electronic device(s) 230 may be configured to control the light emitters 232 (which may represent, and/or be similar to, the light emitters 116 and/or the light emitters 118) using conditions set by a user. The light emitters 232 may include at least a first type of light emitter 232(a), a second type of light emitter 232(b), and a third type of light emitter 232(c). The light emitters 232 may include pathway lights, walkway lights, floodlights, spotlights, security lights, dome lights, entryway lights, garden lights, outdoor lights, indoor lights, landscape lighting, accent lighting, wall sconces, bullets, globes, and/or any other type of light emitter.

The first type of light emitters 232(a) may be configured to receive power from the electronic device(s) 230. To control the first type of light emitters 232(a), the electronic device(s) 230 may begin to provide power to the first type of light emitters 232(a) to activate the first type of light emitters 232(a) and cease providing the power the deactivate the first type of light emitters 232(a). Additionally, the second type of light emitters 232(b) may be configured to receive power from the electronic device(s) 230. To control the second type of light emitters 232(b), the electronic device(s) 230 (and/or other electronic devices, such as the A/V devices 210) may transmit first control signals to the second type of light emitters 232(b) that are configured to cause the second type of light emitters 232(b) to activate, and transmit second control signals to the second type of light emitters 232(b) that are configured to cause the second type of light emitters 232(b) to deactivate. Furthermore, the third type of light emitters 232(c) may be configured to receive power from a source that is external to the electronic device(s) 230, such as a battery. To control the third type of light emitters 232(c), the electronic device(s) 230 (and/or other electronic devices, such as the A/V devices 210) may transmit first control signals to the third type of light emitters 232(c) that are configured to cause the third type of light emitters 232(c) to activate, and transmit second control signals to the third type of light emitter 232(c) that are configured to cause the third type of light emitters 232(c) to deactivate.

Figure 3A:
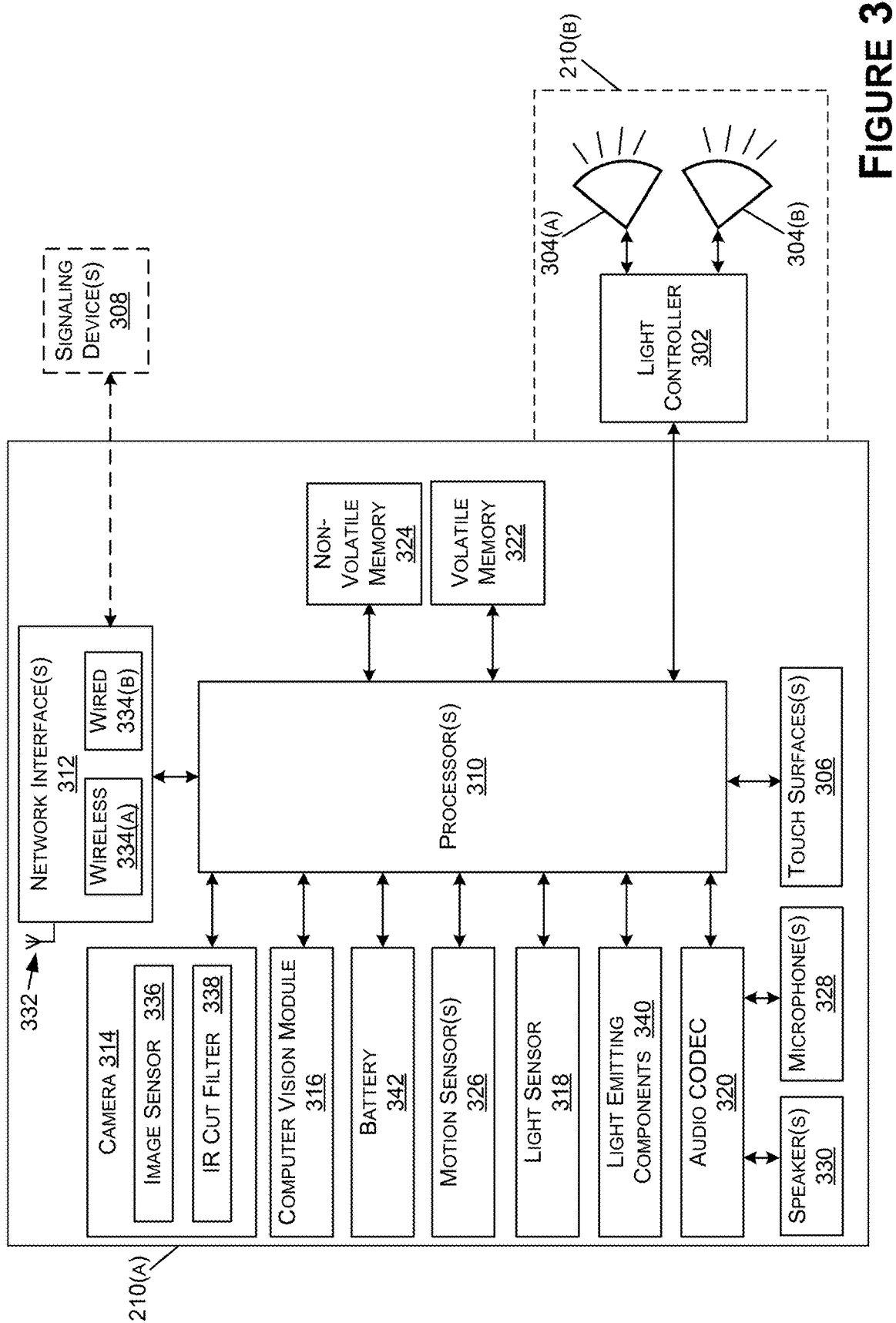
FIG. 3A is a functional block diagram of an example multi-button A/V recording and communication doorbell, according to various aspects of the present disclosure.

FIG. 3A is a functional block diagram for an A/V device 210 according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the A/V doorbell 210(c), which may include some or all of the components of the security camera 210(a) in addition to a touch surface(s) 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3A, the A/V device 210 may include a processor(s) 310, network interface(s) 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the network interface(s) 312, and may perform various functions as described in the present disclosure. In various embodiments, when the processor(s) 310 is triggered by the motion sensor(s) 326, the camera 314, the speaker(s) 330, the microphone(s) 328, the network interface(s) 312, the touch surface(s) 306, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the network interface(s) 312 and the camera 314.

With further reference to FIG. 3A, each of the network interface(s) 312 may comprise an integrated circuit including a processor core, memory, and programmable input/output peripherals. The network interface(s) 312 may be operatively connected to the processor(s) 310. In some embodiments, the network interface(s) 312 is configured to handle communication links between the A/V device 210 and other, external devices, external receivers, external transmitters, and/or external transceivers, and to route incoming/outgoing data appropriately. For example, inbound data from antenna(s) 332 of the network interface(s) 312 may be routed through the network interface(s) 312 before being directed to the processor(s) 310, and outbound data from the processor(s) 310 may be routed through the network interface(s) 312 before being directed to the antenna(s) 332 of the network interface(s) 312. As another example, the network interface(s) 312 may be configured to transmit data to and/or receive data from a remote network device (e.g., one or more components of the network(s) of servers/backend devices 220 described in FIG. 2). Each of the network interface(s) 312 may include wireless 334(a) and wired 334(b) adapters. For example, the network interface(s) 312 may include one or more wireless antennas, radios, receivers, transmitters, and/or transceivers (not shown in FIG. 3A for simplicity) configured to enable communication across one or more wireless networks, such as, without limitation, Wi-Fi, cellular, Bluetooth, Z-Wave, Zigbee, LPWAN(s), and/or satellite networks. The network interface(s) 312 may receive inputs, such as power and/or data, from the camera 314, the processor(s) 310, the touch surface(s) 306, the motion sensors 326, a reset button (not shown in FIG. 3A for simplicity), and/or the non-volatile memory 324. The network interface(s) 312 may also include the capability of communicating over wired connections, such as with signaling device(s) 308. For example, when the touch surface(s) 306 of the A/V doorbell 210(c) receives touch, the network interface(s) 312 may be triggered to perform one or more functions, such as to transmit a signal over the wired 334(b) connection to the signaling device(s) 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The network interface(s) 312 may also act as a conduit for data communicated between various components and the processor(s) 310.

In some examples, the network interface(s) 312 may include at least a first network interface 312 and a second network interface 312. The A/V device 210 may use the first network interface 312 to communicate with network devices over a first network (e.g., using a first wireless protocol). In some examples, the first network may include a wireless local area network, such as, but not limited to, the Internet, a local intranet, a PAN, a LAN, a WAN, and/or the like (e.g., the user's network 218, the network (Internet/PSTN) 212, etc.). In some examples, the A/V device 210 may communicate over the first network based on which network devices the A/V device 210 is attempting to communicate with. For example, the A/V device 210 may communicate overt the first network when attempting to communicate with remote network devices. The remote network devices may include, but are not limited to, the backend server 224, the backend APIs 226, the storage devices 222, the client devices, 214, 216, the security monitoring server 228, and/or any other network device that is not located at a same property as the A/V device 210 and/or not within a communication range of a second network, described below.

In some examples, the A/V device 210 may communicate over the first network when the A/V device 210 is transmitting and/or receiving data that requires a given data rate. The given data rate may include, but is not limited to, one megabyte per second, ten megabytes per second, one hundred megabytes per second, one gigabyte per second, and/or the like. In some examples, the A/V device 210 may communicate over the first network when the A/V device 210 is transmitting and/or receiving data that exceeds a threshold size. The threshold size may include, but is not limited to, one megabyte, ten megabytes, one hundred megabytes, one gigabyte, and/or the like. Still, in some examples, the A/V device 210 may communicate over the first network when the A/V device 210 is transmitting and/or receiving data that includes a given type of data. The given type of data may include, but is not limited to, video data, audio data, sensor data, and/or the like.

Additionally, the A/V device 210 may use the second network interface 312 to communicate with network devices over a second network (e.g., using a second protocol). In some examples, the second network may include a LPWAN, such as, but not limited to, a CSS modulation technology network (e.g., LoRaWAN), an Ultra Narrow Band modulation technology network (e.g., Sigfox, Telensa, NB-IoT, etc.), RingNet, and/or the like. In some examples, the A/V device 210 may communicate over the second network based on which network devices the A/V device 210 is attempting to communicate with. For example, the A/V device 210 may communicate overt the first network when attempting to communicate with local network devices. The local network devices may include, but are not limited to, the sensors 204, the automation devices 206, the hub device 202, the VA device 208, the network device(s) 230, the electronic devices 230, the light emitters 232, and/or any other network device that is located at a same property as the A/V device 210 and/or is located within a communication range of the second network. In some examples, the A/V device 210 may communicate over the second network when the A/V device 210 is transmitting and/or receiving data that is below a threshold size. The threshold size may include, but is not limited to, one megabyte, ten megabytes, one hundred megabytes, one gigabyte, and/or the like. In some examples, the A/V device 210 may communicate over the second network when the A/V device 210 is transmitting and/or receiving data that includes a given type of data. The given type of data may include, but is not limited to, video data, audio data, sensor data, and/or the like.

In some examples, the first network interface 312 may include the second network interface 312. For example, an integrated circuit including a processor core, memory, and programmable input/output peripherals may be configured to communicate over the first network and the second network. In some examples, the first network interface 312 may include a different network interface than the second network interface. For example, a first integrated circuit including a processor core, memory, and programmable input/output peripherals may be configured to communicate over the first network. Additionally, a second integrated circuit including a processor core, memory, and programmable input/output peripherals may be configured to communicate over the second network.

In some examples, such as to conserve power of the A/V device 210 (e.g., conserve power from the battery 342), the A/V device 210 may deactivate (e.g., turn off, cease providing power to, put into a low power mode, etc.) the first network interface 312 and/or the second network interface 312. For a first example, the A/V device 210 may deactivate the first network interface 312 when the A/V device 210 is not transmitting and/or receiving data over the first network. At first time intervals, the A/V device 210 may then activate (e.g., turn on, provide power to, put into a high power mode, etc.) the first network interface 312, such as to transmit data to a networking device in order to stay logged into the first network and/or receive data from the networking device. The first time intervals may include, but are not limited to, ten milliseconds, fifty milliseconds, one second, five second, and/or the like. If the A/V device 210 does not have additional data to transmit over the first network and/or does not begin receiving additional data over the first network, the A/V device 210 may once again deactivate the first network interface 312.

For a second example, the A/V device 210 may deactivate the second network when the A/V device 210 is not transmitting and/or receiving data over the second network. At second time intervals, the A/V device 210 may then activate (e.g., turn on, provide power to, put into a high power state, etc.) the second network interface 312, such as to transmit data to the network devices and/or receive data from the network devices. The second time intervals may include, but are not limited to, ten milliseconds, fifty milliseconds, one second, five second, and/or the like. If the A/V device 210 does not have additional data to transmit over the second network and/or does not begin receiving additional data over the second network, the A/V device 210 may once again deactivate the second network interface 312.

In some examples, the A/V device 210 may use more power communicating over the first network (e.g., using the first network interface 312) than communicating over the second network (e.g., using the second network interface 312). As such, the first time intervals used to activate the first network interface 312 for communicating over the first network may be greater than the second time intervals used to activate the second network interface 312 for communicating over the second network interface 312. Additionally, in some examples, the A/V device 210 may receive, over the second network, data from a network device (e.g., the hub device 202, the VA device 208, an automation device 206, and/or the like) while the second network interface 312 is activated. In such examples, the data may include a command to activate the first network interface 312 for communicating over the first network. In response, the A/V device 210 may activate the first network interface 312 for communicating over the first network and transmit data over the first network and/or receive data from an additional network device over the first network. By activating the first network interface 312 in response to receiving the data over the second network, the A/V device 210 is capable to activating the first network interface 312 less frequently and as such, conserve a greater amount of power.

In some examples, such as when the A/V device 210 is communicating over the second network, the A/V device 210 may communicate using a high data rate (HDR) and/or a low data rate (LDR). For example, the A/V device 210 may transmit data (e.g., signals) using both the HDR and the LDR. As such, the A/V device 210 is able to communicate with network devices that use the HDR (e.g., network devices that transmit and/or receive data using the HDR) and the A/V device 210 is able to communicate with network devices that communicate using the LDR (e.g., network devices that transmit and/or receive data using the LDR). In some examples, communicating over the HDR may include transmitting data at a rate that is equal to or exceeds a given data rate. Additionally, communicating over the LDR may include transmitting data at a rate that is below the given data rate. The given data rate may include, but is not limited to, 10 kilobytes per second, 50 kilobytes per second, 1 megabyte per second, and/or the like. For example, the A/V device 210 may transmit data using the HDR, where the HDR includes a rate of 50 kilobytes per second, and transmit data using the LDR, where the LDR includes a rate of 1 kilobyte per second.

In some examples, communicating over the LDR may consume more power than communicating over the HDR, however, the A/V device 210 may be able to transmit data a longer distance communicating over the LDR than communicating over the HDR. As such, in some examples, the A/V device 210 may use the HDR when using power from a battery 342 (e.g., if the A/V device 210 is battery powered). This may conserve the power of the battery 342. Additionally, in some examples, the A/V device 210 may use the LDR when receiving power from an external power source. Furthermore, in some examples, the A/V device 210 may transmit data using the HDR when the A/V device 210 is transmitting data to a network device that is located within a threshold distance to the A/V device 210 and transmit data using the LDR when the A/V device is transmitting data to a network device that is located outside of the threshold distance to the A/V device 210. The threshold distance may include, but is not limited to, ten meters, fifth meters, one hundred meters, and/or the like.

In some examples, the A/V device 210 may transmit data over the LDR when the A/V device 210 is not capable of communicating over the first network. In some examples, the A/V device 210 may communicate over the HDR when the A/V device 210 is able to communicate over the first network, but the A/V device 210 may switch to communicating over the LDR when the A/V device 210 is unable to communicate over the first network. In some examples, the A/V device 210 may only be configured to communicate using the HDR. In some examples, the A/V device 210 may only be configured to communicate using the LDR.

In some examples, the A/V device 210 may transmit data (e.g., the synchronization data, data representing commands, data packets, etc.) using the HDR at first time intervals and transmit data (e.g., the synchronization data, data representing commands, data packets, etc.) using the LDR at second time intervals. In some examples, the first time intervals are greater than the second time intervals. In some examples, the second time intervals are greater than the first time intervals. Still, in some examples, the first time intervals are equal to the second time intervals.

For example, the A/V device 210 may transmit, at the first time intervals, first data using the HDR, where the first data indicates first times for synchronizing with the A/V device 210 (e.g., first times that network devices that communicate using the HDR are able to communicate with the A/V device 210). Additionally, the A/V device 210 may transmit, at the second time intervals, second data using the LDR, where the second data indicates second times for synchronizing with the A/V device 210 (e.g., second times that network devices that communicate using the LDR are able to communicate with the A/V device 210). In some examples, the first times are different than the second times. In some examples, the first times are similar to the second times.

The touch surface(s) 306 may include any touch surface capable of detecting and receiving touch input(s). For example, the touch surface(s) 306 may include a capacitive touch sensor, a resistive touch sensor, a mechanical switch (e.g., has a range of movement), sensor pads, track pads, surface acoustic waves (SAW), an infrared (IR) sensor, an optical imaging sensor, an acoustic pulse recognition sensor, a sensor that implements a low-power CVM for the detection of a person (e.g., a finger, hand, etc., of a person), or any other type of button/sensor capable of receiving touch input. When embodied as a capacitive touch sensor, the touch surface(s) 306 may include a dielectric layer disposed between electrodes of the capacitive touch sensor such that the dielectric layer senses when force (e.g., touch input) is applied to the touch surface(s) 306. Depending on the implementation, the dielectric layer may include deformable or non-deformable dielectric materials. For example, the capacitive touch sensor may operate by detecting changes in capacitance between the electrodes due to the deforming of the deformable dielectric layer as the distance between the electrodes vary. The electrodes of the two layers may be arranged to intersect in the plane of the capacitive touch sensor (e.g., the layers of electrodes may be situated such that the electrodes of the layers are parallel within the individual layers but not parallel to electrodes in the other layer). The dielectric layer between the layers of electrodes provides a vertical separation to prevent contact between electrodes of the different layers. Accordingly, each application of touch input on the touch surface(s) 306 may create a contact point on the capacitive touch sensor. The shape of the contact point may be determined by the object creating the contact on the touch surface(s) 306. In some examples, the contact point may be characterized by the location of the contact point on the touch surface(s) 306 and represented by X and Y coordinates. In some examples, a center of the contact point may define the location of the contact or the contact point may also be characterized by the area of the contact. Moreover, in some examples, the capacitive touch sensor may detect a magnitude of the contact point, that is, how hard an object is pressing the touch surface(s) 306. Accordingly, in some examples, each contact point on the touch surface(s) 306 may be interpreted as having a location (e.g., X and Y) and an amount of force (e.g., Z). As such, the touch surface(s) 306 may leverage a force-sensitive capacitive touch sensor to detect touch input at the touch surface(s) 306. In some examples, and as discussed in detail below, the A/V device 210 may include any number of touch surfaces. Additionally, when the A/V device 210 includes more than one touch surface, the touch surface(s) 306 may be of a similar size (so as to have similar capacitances), or may be of different sizes.

In some examples, the touch surface(s) 306 may also include a fingerprint scanner/reader for performing fingerprint recognition. The fingerprint scanner may be incorporated into one or more of the touch surface(s) 306 such that when a user touches or presses the touch surface(s) 306, biometric fingerprint data is generated.

The touch surface(s) 306 may also include backlighting capabilities. The backlighting may illuminate portions of the touch surface(s) 306, such as outlining a perimeter of the touch surface(s) 306 or an icon associated with the touch surface(s) 306.

With further reference to FIG. 3A, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3A, the volatile memory 322 and the non-volatile memory 324 are illustrated as being separate from the processor(s) 310. However, the illustration of FIG. 3A is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3A, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3A for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the network interface(s) 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

In some examples, the camera 314 may be used for iris recognition and/or facial recognition of users within the field of view of the camera 314. In some examples, the camera 314 may also include a retinal scanner for performing retinal scans of users within the field of view of the camera.

With further reference to FIG. 3A, the recording and communication A/V device 210 may comprise the light sensor 318 and the one or more light-emitting components 340, such as LEDs. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the network interface(s) 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the network interface(s) 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the network interface(s) 312, the digital audio data from the user is decompressed by the audio CODEC 320 and emitted to the visitor through the speaker(s) 330. In some examples, the speech captured by the microphone(s) may be used for voice recognition and authentication when interacting with the A/V device 210.

With further reference to FIG. 3A, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3A, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3A, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3A, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3A, the CVM 316, and/or the camera 314 and/or the processor(s) 310 may receive information about the person using any one, or any combination of more than one, of the foregoing biometrics.

Again, with reference to FIG. 3A, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3A, in embodiments where the A/V device 210 includes a doorbell, such as the A/V doorbell 210(c), the A/V device 210 may include the touch surface(s) 306. When the touch surface(s) 306 is/are pressed, touched, and/or otherwise triggered, the processor(s) 310 may receive an output signal from the touch surface(s) 306 that may activate one or more functions. In one example, an output signal may be transmitted, using the network interface(s) 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the network interface(s) 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220). As discussed herein, a variety of functions may be performed in response to touching, pressing, or otherwise triggering the touch surface(s) 306.

Although the A/V device 210 is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 3B:
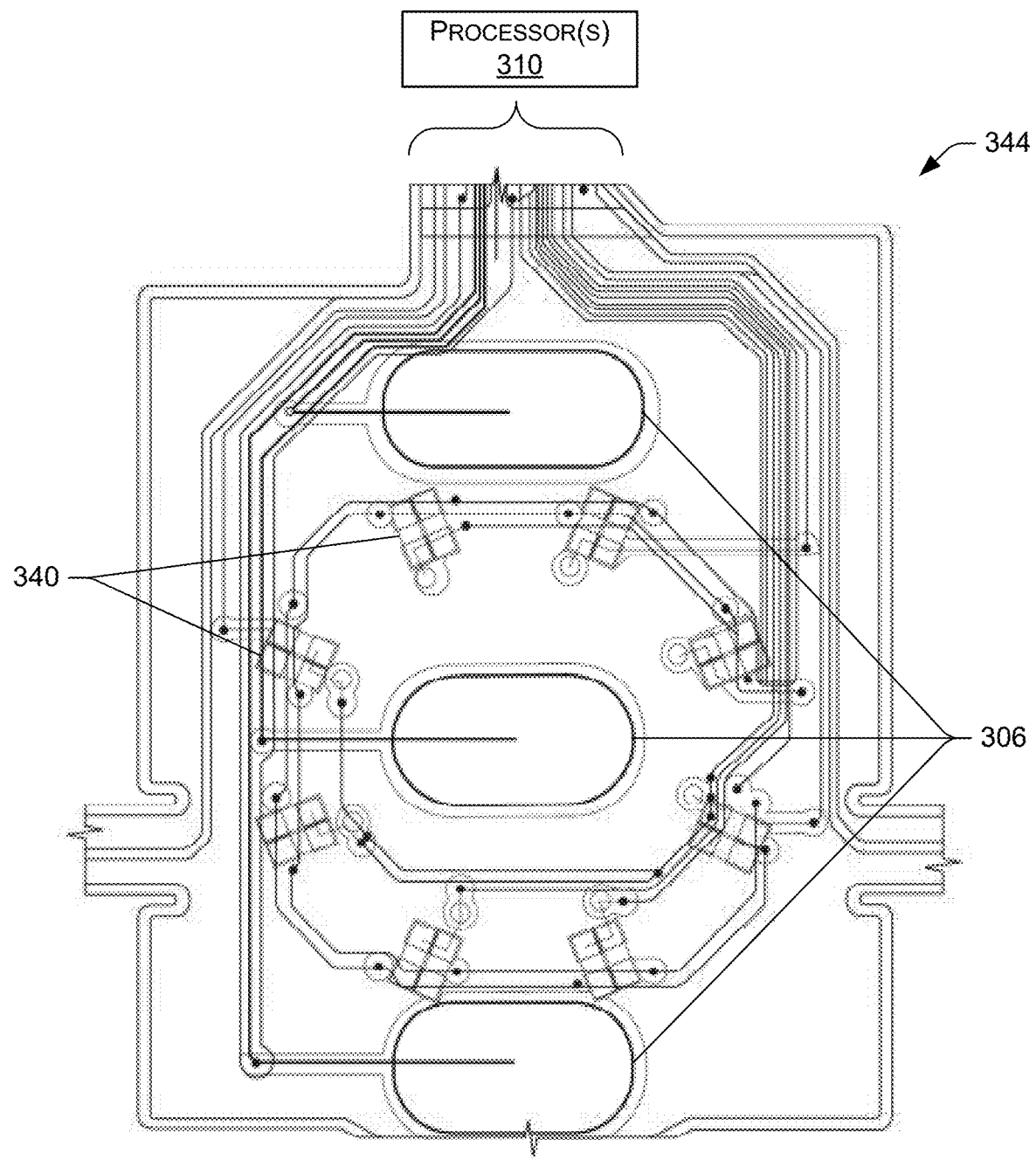
FIG. 3B is a circuit diagram of an example multi-button A/V recording and communication device, according to various aspects of the present disclosure.

FIG. 3B is a design illustrating a circuit 344 having touch surfaces according to various aspects of the present disclosure. The circuit 344 may be coupled to the processor(s) 310. In some examples, the circuit 344 may reside beneath a front plate of the A/V device 210, or be part of the front plate, to receive touch input from a user via the touch surface(s) 306. The circuit 344 may be coupled to the interior surface of the front plate of the A/V device 210. Shown in FIG. 3B, the touch surface(s) 306 may include three touch surfaces capable of receiving touch input. In some examples, the touch surface(s) 306 may be the same size (e.g., capacitors of the touch surface(s) may include similar areas). In some example, having the touch surface(s) 306 as the same size may to provide improved touch input in wet contact conditions (e.g., rain)

With further reference to FIG. 3B, light emitting components 340 may be disposed on the circuit 344. Noted above, the light emitting components 340 may shine light through an enclosure of the A/V device 210 out to the environment, such as a light pipe.

Figure 4A:
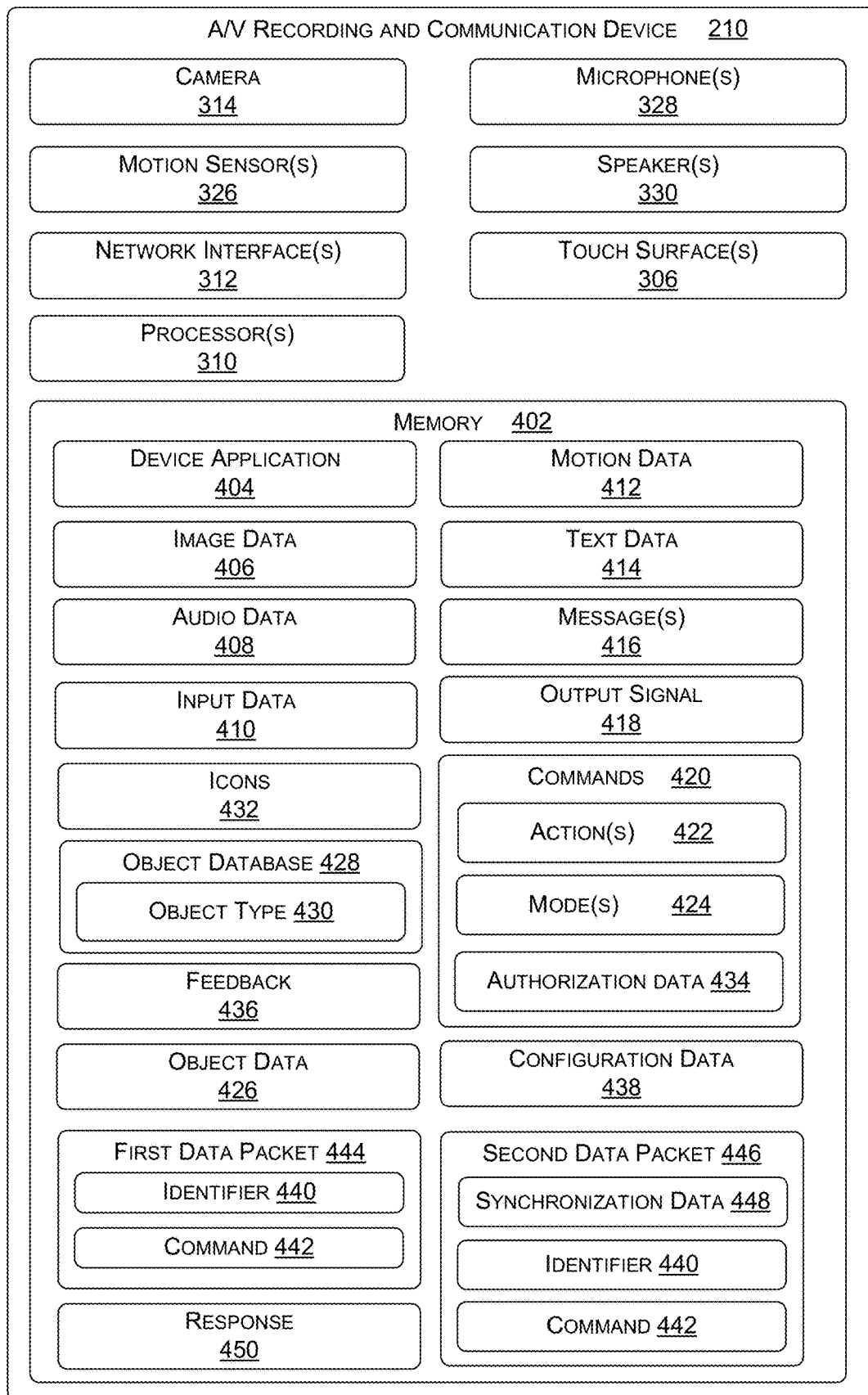
FIG. 4A is a functional block diagram illustrating an example embodiment of a multi-button A/V recording and communication device, according to various aspects of the present disclosure.

FIG. 4A is functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some examples, the A/V device 210 illustrated in FIG. 4A may correspond to the A/V doorbell 102 of FIG. 1A. In some embodiments, the A/V device 210 may omit one or more of the components shown in FIG. 4A and/or may include one or more additional components not shown in FIG. 4.

As shown in FIG. 4A, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the touch surface(s) 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

The device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the network interface(s) 312. In various embodiments, the device application 404 may also configure the processor(s) 310 to generate and/or transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the network interface(s) 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

The image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314. The image data 406 may be representative of (e.g., depict) a physical environment in a field of view of the camera 406. In some embodiments, the physical environment may include one or more objects (e.g., persons, vehicles, animals, items, etc.), and the image data 406 may be representative of the one or more objects, such as the one or more objects within the physical environment.

In further reference to FIG. 4A, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

With further reference to FIG. 4A, a message 416 may be generated by the processor(s) 310 and transmitted, using the network interface(s) 312, to the client device 214, 216, the backend server 224, and/or the hub device 202. For example, in response to detecting motion using the camera 314 and/or the motion sensor(s) 326, or input data 410 generated in response to touch input received at the touch surface(s) 306, the A/V device 210 may generate and/or transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the input data 410, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message(s) 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein with regard to FIG. 4A, at least some of the processes of the backend server 224, the hub device 202, and/or the client device 214, 216 may be executed by the A/V device 210.

As noted above, the input data 410 may include data generated in response to touch input received at the touch surface(s) 306. The touch surface(s) 306 may receive touch input (e.g., a press, a touch, a series of touches and/or presses, etc.) and may generate the input data 410 indicative of the touch input. For example, the input data 410 may represent touch input at the touch surface(s) 306, a series of touch inputs at the touch surface(s) 306, a time corresponding to the touch input(s) of the touch surface(s) 306, and/or an amount of force corresponding to the touch input(s) of the touch surface(s) 306. Additionally, in some examples, the input data 410 may indicate which touch surface of the touch surface(s) 306 the touch input was received. That is, the A/V device 210 may include a plurality of touch surface(s) 306. When multiple touch inputs are received at the touch surface(s) 306, the processor(s) 310 may be configured to associate each touch input with a respective touch surface of the touch surface(s) 306. The input data 410 may therefore indicate, or otherwise represent, which touch surface of the touch surface(s) 306 the touch input was received.

In some examples, touch input received at the touch surface(s) 306 may cause the processor(s) 310 to generate biometrics. Additionally, or alternatively, the processor(s) 310 may cause the camera 314 may generate biometrics when touch input is received at the touch surface(s) 306 and/or when motion is detected at the A/V device 210. Depending on the embodiment, the biometrics may include data or images of the user at the A/V device 210 and/or features of the user which may be used for fingerprint recognition (e.g., via a fingerprint scanner), iris recognition (e.g., via the camera 314), retinal scans, facial recognition, and/or voice recognition (e.g., via the microphone(s) 328.

In further reference to FIG. 4A, the processor(s) 310 may be configured to store commands 420. The commands 420 may be performed by the A/V device 210 or the network devices (e.g., the hub device 202, the sensors 204, the automation devices 206, the backend server 224, the client device 214, 216, the electronic device 230, the light emitters 232, and/or other electronic devices connected to the A/V device 210). By way of non-limiting examples, the commands 420 may include, or relate to, arming/disarming a security system and/or a home-automation system, ringing a doorbell, unlocking and/or locking a door (e.g., causing an automation device 206 to unlock and/or lock a door), activating the light cameras 210(b) (e.g., floodlight cameras, spotlight cameras, etc.), initiating communication with a homeowner at which the A/V device 210 is located (e.g., push to talk), transmitting the message(s) 416 to homeowners, person(s), etc., transmitting messages/notifications to electronic devices (e.g., speakers), causing the electronic device 230 to activate (turn on, provide power to, etc.) and/or deactivate (e.g., turn off, cease providing power to, etc.) the light emitters 232, cause the light emitters 232 to activate and/or deactivate, and/or initiating a communication with the security monitoring service 228. The commands 420 may also be associated with other services, such as a food delivery service, a carrier service, newspaper delivery, emergency personnel/services, etc. As noted above, the commands 420 may be performed by the A/V device 210 or the A/V device 210 may transmit a request that causes the network device(s) to perform the command 420. In some examples, the commands 420 transmitted to the other network devices may be included within the output signal 418.

The commands 420 may be associated with individual touch surfaces of the touch surface(s) 306. That is, in some examples, each touch surface of the touch surface(s) 306 may be associated with a command of the commands 420. In this sense, the A/V device 210 (or the network device(s)) may perform a plurality of commands 420 based at least in part on which touch surface of the touch surface(s) 306 touch input is received. To illustrate, after receiving the input data 410, the processors(s) 310 may determine which touch surface of the touch surface(s) 306 the touch input was received and determine the command 420 associated with the touch surface. For example, the processor(s) 310 may determine that the touch input was received at a second touch surface of the touch surface(s) 306. Using this determination, the processor(s) 310 may then determine the command 420 associated with the second touch surface of the touch surface(s) 306. As a result, the processor(s) 310 may cause the command 420 associated with the second touch surface. Therefore, based on which touch surface the touch input is received, the user may cause certain command(s), of the commands 420, to be performed. In some examples, the processor(s) 310 may analyze a series of touch inputs at the touch surface(s) 306 to determine the command(s) 420. For example, the input data 410 may indicate that a series of touch inputs includes touch input being received at a first touch surface of the touch surface(s) 306, touch input being received at a second touch surface of the touch surface(s) 306, and then touch input being received at a third touch surface of the touch surface(s) 306. This series of touch inputs may be analyzed by the processor(s) 310 to determine an associated command 420.

In some examples, the commands 420 may be predefined, such that the A/V device 210 has a preconfigured set of commands 420, or a user associated with the A/V device 210 (e.g., the homeowner) may create and define customized commands 420 performable by the A/V device and/or the network device(s).

In some examples, the commands 420 may be associated with authorization data 434. The authorization data 434 may represent whether the command 420 is associated with any authorizations that are required to perform the command 420. In some examples, the authorization data 434 may indicate (i) whether or not a user needs to be authorized to perform the command 420, (ii) the users that are authorized to perform the command 420, (iii) an amount of force on a touch surface to trigger performance of the command 420, (iv) a pattern of touch inputs for triggering performance of the command 420, (v) an amount of time a user needs to touch a touch surface to trigger performance of the command 420, etc. That is, to cause certain commands 420 to be performed, the processor(s) 310 may determine whether the input data 410 is received from an authorized user or whether the command 420 is otherwise authorized. In some examples, different commands 420 may be associated with respective authorization data 434 or some commands 420 may not be associated with authorization data 434. For example, after the processor(s) 310 analyze the input data 410 and determine the command 420, the processor(s) 310 may determine, before causing the command 420 to be performed, whether or not the user needs to be authorized and/or whether the command 420 is associated with any authorizations, as represented by the authorization data 434. For example, prior to performing a command to disarm a security system, the processor(s) 310 may determine that the command 420 is associated with the authorization data 434 and needs to be performed by an authorized user.

To authorize the command 420, the processor(s) 310 may analyze biometrics (e.g., fingerprints, retinal scans, voice recognition, etc.) associated with the input data 410 to determine whether the user issuing the touch input is authorized to perform the command 420. If the user is not authorized to perform the command 420, the A/V device 210 may not perform the command, thereby preventing unauthorized users from gaining access to home, for example. However, a command associated with ringing a doorbell may not include authorization data 434. In some examples, one or more of the touch surfaces 306 may be associated with authorization data 434 and one or more other touch surfaces 306 may not be associated with authorization data 434. As such, the determination of authorization may only be determined for the inputs to the touch surface(s) 306 associated with authorization data 434. For one example, the doorbell button, when pressed, may always send a signal to the signaling device, cause a message to be sent to the client device(s) 214, 216, and/or cause output of a sound using the speaker(s) 330. As such, the doorbell button may not include associated authorization data 434. However, the unlock button may be associated with unlocking a door, such as a front door, and thus may have associated authorization data 434 to prevent unwanted persons from accessing the property. In some examples, in response to determining that an input to the unlock button has been received, the A/V device 210 (and/or another device, such as a network device) may determine the proper authorization technique (e.g., fingerprint identification, facial recognition, code input, and use the authorization data 434 to authorize or not authorize the user at the A/V device 210.

The authorization data 434 may also include gestures. For example, the processor(s) 310 may determine, using gesture recognition, whether the command 420 is authorized. In some examples, the gestures may include hand gestures or facial gestures. Gesture recognition may be performed using the image data 406 captured by the camera 314 or a depth sensor. Accordingly, the processor(s) 310 may analyze a gesture received and corresponding to the command 420 to determine whether the command 420 is authorized. By way of non-limiting examples, the gesture may include an open hand gesture corresponding to unlock a door at the property or a closed hand gesture corresponding to locking the door at the property. In determining the command 420, the processor(s) 310 may analyze the gesture to determine that the command 420 is authorized. In some examples, the gesture may be received prior to or before receiving touch input. For example, after pressing a touch surface associated with unlocking a door, the user may provide a gesture, which may be used by the processor(s) 310 to authorize the command of unlocking the door. Additionally, command 420 or touch surface(s) may be associated with respective gestures.

Additionally, in some examples, the command 420 may be authorized through receiving authorizations from the client device 214, 216. For example, the processor(s) 310 may receive, using the network interface(s) 312, an authorization from the client device 214, 216 that the command 420 is authorized.

In some examples, the commands 420 may be associated with one or more actions 422 and/or one or more modes 424. Performing the commands 420 may involve the A/V device 210 and/or other network device(s) (e.g., the hub device 202, the sensors 204, the automation devices 206, the electronic device(s) 230, the light emitters 232, etc.) performing one or more actions, as represented by the actions 422, or entering one or more modes, as represented by the modes 424. In this sense, executing the command 420 may involve configuring A/V device 210 and/or the network devices to perform one or more operations. For example, in response to the processor(s) 310 determining the command 420, the command 420 may cause one or more actions 422 to be performed. As a non-limiting example, if the processor(s) 310 determine that the command 420 is associated with arming a security system, the processor(s) 310 may transmit an arming action to the hub device 202 that causes the hub device 202 to arm the security system. As an additional example, if the command 420 represents unlocking and/or locking a door, the processor(s) 310 may transmit, using the network interface(s) 312, an unlocking/locking signal (and/or the second data packet 446, described herein) to a locking automation device that causes the locking/unlocking action to be performed. As another example, if the command 420 represents activation of the light cameras 210(*b*), the processor(s) 310 may transmit, using the network interface(s) 312, a signal that causes lights of the light cameras 210(*b*) to activate. As a further example, if the command 420 represents activation of one or more lights (e.g., pathway lights, floodlights, spotlights, interior lights, exterior lights, accent lights, etc.), the processor(s) 310 may transmit, using the network interface(s) 312, a signal (and/or the second data packet 446, described herein) that causes one or more of the lights to activate (e.g., turn on). As an additional example, if the command 420 involves communicating with the security monitoring service 228 and/or the homeowner, the processor(s) 310 may activate the camera 314 and/or microphone(s) 328 and/or initiate a two-way communication using the network interface(s) 312. Accordingly, when the processor(s) 310 determine the command 420, the processor(s) 310 may determine whether the command 420 is associated with any actions 422. When the command 420 is associated with one or more actions 422, the processor(s) 310 may cause the A/V device 210 or the network device(s) to perform the actions 422.

The actions 422 may be predefined such that the A/V device 210 or the network device(s) performs preconfigured actions 422, the actions may be customized such that the user of the A/V device 210 may customize the actions 422 associated with the commands 420, or a combination thereof.

Additionally, or alternatively, the commands 420 may be associated with one or more modes, as represented by the modes 424. The modes 424 may configure the A/V device 210 and/or the network device(s) according to one or more settings. In this sense, the modes 424 may be associated with the commands 420 such that performing the command 420 involves the A/V device 210 and/or the network device(s) entering modes 424. By way of non-limiting examples, modes 424 may include an object protection mode (e.g., monitoring an object within the field of view of the A/V device 210), a standby mode (e.g., reduced functionally and/or low power mode), an active mode (e.g., full functionality and/or normal power mode), and/or an alarming mode (e.g., sounding an alarm). In some examples, the modes 424 may be predefined or the modes 424 may be customized by a user of the A/V device 210.

To monitor the object, for example, the device application 404 may configure the processor(s) 310 to analyze the image data 406 in order to determine if the image data 406 depicts an object. For example, when monitoring a package delivered by a carrier service to the home, the processor(s) 310 may analyze the image data 406 to determine if the image data 406 depicts the package. In some examples, to analyze the image data 406, computer vision processing and/or image processing, as described herein, for example, may be performed by the processor(s) 310 of the A/V device 210 to determine that the image data 406 depicts the package. For example, the image data 406 generated by the A/V device 210 may be analyzed to determine object data 426. In some of the present embodiments, one or more of the image data 406, the motion data 412, and the audio data 408 may be used to determine the object data 426. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or superquadrics, for example.

In some embodiments, the processor(s) 310 may compare the object data 426 to an object database 428 to determine what, if any, object(s) the image data 406 depicts in the field of view of the A/V device 210. For example, the object database 428 may store image data corresponding to images and/or video footage that depict various objects, where the image data may be labeled (e.g., tagged, such as in the form of metadata) to indicate an object type 430 (alternatively referred to herein as the "type of object 430") depicted by each image and/or video footage. For a first example, the object database 428 may store image data depicting a package, where the image data is labeled to indicate that the type of object 430 includes a package. Based on the comparing, the processor(s) 310 may match the object data 426 from the image data 406 to the image data stored in the object database 428. The processor(s) 310 may then use the match to determine that the object data 426 represents an object (e.g., the package) and/or to determine the type of object 430 that the object data 426 represents. For example, if the processor(s) 310 matches the object data 426 from the image data 406 to image data stored in the object database 428 that represents the package, then the processor(s) 310 may determine that the image data 406 depicts an object and/or that the image data 406 depicts the package. In some examples, when the object data 426 represents multiple objects, the processor(s) 310 may perform a similar analysis to identify each object represented by the object data 426 and/or the respective type of object 430 associated with each of the objects represented by the object data 426.

In some examples, in addition to, or alternatively from, comparing the image data 406 to the image data stored in the object database 428, features and/or characteristics of various objects may be stored in the object database 428, and the features and/or characteristics of the objects in the image data 406 may be determined (e.g., using computer vision processing, image processing, or the like) and compared against the features and/or characteristics from the object database 428. For example, sizes, volumes, weights, colors, movement types, and/or other features and/or characteristics of various objects may be stored in the object database 428. The size, volume, weight, color, movement type, and/or other features and/or characteristics of an object depicted by the image data 406 may then be compared to the sizes, volumes, weights, colors, movement types, and/or other features and/or characteristics stored in the object database 428 to identify the type of object 430 depicted by the image data 406.

However, although referred to as an object protection mode in the sense that the object is a package, the processor(s) 310 may cause the camera 314 to identify and monitor any object which may include but are not limited to, people, animals, vehicles, electronic devices (e.g., remote control vehicles, drones, etc.), and/or any other type of object that can be depicted by the image data 406 and/or cause motion that can be detected by the A/V device 210. For example, the object database 428 may store image data depicting an animal (e.g., a dog, a cat, a coyote, etc.), where the image data is labeled to indicate that the type of object 430 includes the animal (e.g., the dog, the cat, the coyote, etc.) and the processor(s) 310 may use this to determine the presence of the animal at the A/V device 210. In another example, the object database 428 may store image data depicting a vehicle, where the image data is labeled to indicate the type of object 430 includes the vehicle and the processor(s) 310 may use this to determine the presence of the animal at the A/V device 210. Furthermore, although described as being performed in the A/V device 210, in some embodiments, the image data 406 may be analyzed by any of the backend server 224, the hub device 202, and/or the client device 214, 216, in order to determine if the image data 406 depicts the object (e.g., package). Thus, any or all of the operations described herein to analyze the image data 406 may be performed by any of these devices.

With further reference to FIG. 4A, in some examples, the device application 404 may configure the processor(s) 310 to display icons 432 in associated with the touch surface(s) 306. The icons 432 may be associated with the commands 420, features, modes 424, and/or functionalities to be performed by the A/V device 210 and/or the network device(s) and displayed in association with the touch surface(s) 306 to visually illustrate the commands 420 associated with the touch surface(s) 306 of the A/V device 210. In this sense, the icons 432 may indicate to a user of the A/V device 210 the commands 420 performable in response to receiving touch input at the touch surface(s) 306. In some examples, the icons 432 may be displayed based on the processor(s) 310 detecting motion at the A/V device 210, as represented by the motion data 412, or based on receiving touch input, as represented by the input data 410. In some examples, the processor(s) 310 may display all the icons 432 or may only display the icon 432 associated with the command(s) 420 performed (e.g., using the input data 410). The icons 432 may be displayed through backlighting the touch surface(s) 306. For example, the processor(s) 310 may cause light emitting components (e.g., LEDs) to illuminate in order to display the icons 432. By way of non-limiting examples, the icons 432 may include, or relate to, a lock (e.g., locked or unlocked), a phone, a package (e.g., envelope, box, etc.), deliveries (e.g., delivery truck), food (e.g., takeout), newspaper, a doorbell, users (e.g., outline of persons/people), or any other icon representative of the command 420. The icons 432 may be predefined, or in some examples, the icons 432 may be configured or otherwise customized by the user of the A/V device 210. When customized by the user, the user may select any icon type (e.g., from a list of available or predefined icons 432, by creating his or her own custom icon (e.g., by uploading an image, clipart, or other data type from the Internet and/or a storage of his or her client device 214, 216), and/or the like) to associate with any command, feature, mode, and/or functionality of the A/V device 210. For example, the user may select an image of himself or herself to use as an icon that may be associated with a touch surface of the A/V device configured for a command of initiating a two-way audio, one-way video communication session between the A/V device 210 and the client device 214, 216 of the user (e.g., a visitor at the A/V doorbell 210 may select the icon including the image of the user and, in response, the communication session may begin). In some examples, the A/V device 210 may be installed at a multi-unit dwelling (e.g., an apartment complex, a duplex, a townhome, etc.), and different touch surfaces of the A/V device 210 may be associated with different units of the multi-unit dwelling. As such, an image, name, unit number, custom icon type (e.g., user may include icon of a butterfly, and notify friends, family, visitors, etc. that the touch surface with the butterfly corresponds to his or her unit), or other association between the unit and/or the residents of the unit may be represented by the icons 432. In such an example, selection of a touch surface corresponding to a particular unit may initiate an audio and/or video communication session between a client device of a resident of the unit and the A/V device 210, may signal a signaling device (e.g., a doorbell chime, a wireless speaker, etc.) within the unit associated with the icon 432 and/or touch surface to emit sound, and/or the like. As another example, a user may associate an icon 432 representing fireworks with illuminating one or more lights communicatively coupled to the A/V device 210. In such an example, the icon 432 may not include a direct or obvious correlation between the command (e.g., turning on one or more lights) and the icon type (e.g., an image of fireworks), but this functionality allows the user to create custom and unique touch surface(s) and overall appearances for the A/V device 210.

In some examples, the icons 432 may be displayed, illuminated, or otherwise visible at all times. In other examples, the icons 432 may be displayed, illuminated, or otherwise visible when motion is detected, when an entity or object is within a field of view of the A/V device 210 (e.g., an entity or object that is not normally in the field of view, such as a person, a vehicle, an animal, etc.), after an input to the touch surface is received, and/or the like. In such an example, the icons 432 may not be constantly displayed, illuminated, or otherwise visible. In some examples, one or more icons may always be displayed, illuminated, or otherwise visible, and one or more other icons may not always be displayed, illuminated, or otherwise visible. In such examples, the one or more other icons may only be displayed, illuminated, or otherwise visible when motion is detected, when an entity or object is within a field of view of the A/V device 210 (e.g., an entity or object that is not normally in the field of view, such as a person, a vehicle, an animal, etc.), after an input to the touch surface is received, and/or the like. In some examples, only the icons 432 that are associated with commands that the person (user) in the field of view of the A/V device 210 is authorized to make may be displayed, illuminated, or otherwise visible. For example, when a person approaches the A/V device 210, facial recognition, voice recognition, and/or another biometric analysis may be performed (e.g., by the A/V device 210 and/or the network device(s)) to determine which commands the person is authorized to make. In response to the determination, the icons 423 associated with the commands may be displayed, illuminated, or otherwise made visible to the person. As another example, the person may scan his or her finger at the A/V device 210, and the icons 432 that the person is authorized to make may be displayed, illuminated, or otherwise made visible to the person based on the authorization of the person determined using the biometric data from the fingerprint scan. Other types of biometric scanning may also be used for this purpose, including iris scanning, retina scanning, and/or the like.

In some examples, the A/V device 210 may include icons 432 that are affixed to the touch surface(s). For example, the icons 432 may be painted on the touch surface(s), stuck to the touch surface(s) (e.g., as a sticker, using adhesive or the like), etched onto the touch surface(s), and/or the like. In embodiments where the icons 432 are not originally affixed to the A/V device 210 (e.g., stickers, such as stickers that can be attached to the touch surface(s) adhesively, magnetically, frictionally, or the like), the icons 432 may be included with the A/V device 210 within the packaging, for example. In such an example, the package may come with any number of icons 432 that may be symbolic of various commands, features, modes, and/or functionalities of the A/V device 210, and the user may adhere or otherwise associate the icons 432 with the touch surface(s) that the user assigns the commands, features, modes, and/or functionalities. In some examples, the icons 432 may be removeable such that the user may remove the icons and replace them with other icons when the user changes the commands, features, modes, and/or functionalities associated with any of the touch surface(s).

In performing the commands 420, or after causing the command 420 to be performed, the processor(s) 310 may be configured to generate and/or transmit the message(s) 416. In some examples, the message(s) 416 may be transmitted when the command 420 is not authorized. The message(s) 416 may serve as notification to the homeowner of the commands 420 being performed or when not authorized, the commands 420 that were not authorized. In some examples, prior to transmitting the message(s) 416, the processor(s) 310 may analyze the image data 406 and/or the input data 410. For example, in the object protection mode where the A/V device 210 is monitoring a package, when the homeowner comes home and moves the package, the processors(s) 310 may analyze the image data 406 and identify the homeowner. In such example, the processor(s) 310 may cease from generating and/or transmitting the message(s) 416.

After identifying the command 420 and/or performing the command 420, the processor(s) 310 may be configured to output feedback 436. In some examples, the feedback 436 may be associated with the command 420. Feedback represented by the feedback 436 may be outputted by at least one of the speaker(s) 330, the touch surface(s) 306 (e.g., backlighting), and/or the one or more lighting elements (e.g., light pipe). The feedback 436 may indicate to a user of the A/V device 210 that the command 420 is being performed or was performed. For example, the processor(s) 310 may cause the speaker(s) 330 to output an audible tone indicating that the command 420 is being performed. As an alternative example, the feedback 436 may cause the touch surface(s) 306 to illuminate the icons 432. The feedback 436 may be predefined (e.g., audible tone or lights) or may be customized, pre-recorded, or configured by the user of the A/V device 210. For example, the user of the A/V device 210 may customize the feedback 436 (e.g., using the client device 214, 216) such that the speaker(s) 330 output a pre-recorded message or output a particular light display. By way of illustration, when the homeowner is on a vacation, in response to the processor(s) 310 determining the carrier service command has been selected, the speaker(s) 330 may output a response indicating that the homeowner is on vacation and instruct the carrier service to deliver the package to a neighbor, place the package behind a fence, return at a later time, etc.

With further reference to FIG. 4A, the processor(s) 310 may be configured to receive, using the network interface(s) 312, configuration data 438. The configuration data 438 may be received from the network device(s) (e.g., the hub device 202, the backend server 224, and/or the client device 214, 216). The configuration data 438 may represent a configuration of the touch surface(s) 306. In response to receiving the configuration data 438, the device application 404 may configure the processor(s) 310 to use the configuration data 438 to configure the touch surface(s) 306. In this sense, a configuration of the touch surface(s) 306 may be represented by the configuration data 438 and, as discussed above, the touch surface(s) 306 may be configurable to include certain commands (e.g., the commands 420) and/or certain icons (e.g., the icons 432), for example. The configuration data 438 may also indicate the action(s) 422, the modes 424, and/or the authorization data 434 associated with the commands 420. Additionally, or alternatively, the configuration data 438 may include the feedback 436 to be outputted by the A/V device 210. For example, the configuration data 438 may indicate that a first touch surface of the touch surface(s) 306 is associated with a first command 420, a second touch surface of the touch surface(s) 306 is associated with a second command 420, and a third touch surface of the touch surface(s) 306 is associated with a third command 420. The configuration data 438 may further include that the first touch surface is associated with a first icon representing the first command 420, the second touch surface is associated with a second icon representing a second command 420, and the third touch surface is associated with a third icon representing a third command 420. The configuration data 438 may further be associated with respective users. For example, using the configuration data 438 and an identity of the user interacting with the A/V device 210, the A/V device 210 may update the amount of touch surface(s) 306 of the A/V device 210 or the commands 420 associated with the touch surface(s) 306. In this sense, the touch surface(s) 306, and the commands 420 being performed, may be based on the identity of the user interacting with the A/V device 210.

Upon receiving the configuration data 438, the processor(s) 310 may use the configuration data 438 to associate the first touch surface with the first command 420 and/or the first icon, the second touch surface with the second command 420 and/or the second icon, and the third touch surface with the third command 420 and/or the third icon. After configuring the touch surface(s) 306, the processor(s) 310 may transmit, using the network interface(s) 312, an indication representing that the touch surface(s) 306.

In subsequent uses of the A/V device 210, for example, when the input data 410 indicates touch input received at the first touch surface, the processor(s) 310 may cause the first command to be performed. In making this determination, the processor(s) 310 may use the configuration data 438.

In some examples, the A/V device 210 may operate as a "bridge" between first network devices (e.g., remote network device, such as the backend server 224, the client device 214, 216, etc.) and second network devices (e.g., local network device, such as sensors 204, automation devices 206, the electronic device 230, the light emitters 232, the hub device 202, etc.). For example, the processor(s) 310 may receive, using the first network interface 312 and over the first network, and from a first network device, first data representing an identifier 440 of a second network device and second data representing a command 442 to be performed by the second network device. In some examples, the A/V device 210 receives the first data and the second data as part of a first data packet 444 generated and transmitted by the first network device. For example, the backend server 224 may generate the first data packet 444 to include the first data representing the identifier 440 and the second data representing the command 442. The processor(s) 310 may then receive, using the first network interface 312 and over the first network, the first data packet 444 from the backend server 224.

In some examples, the identifier 440 may include, but is not limited to, an Internet Protocol (IP) address, a media access control (MAC) address, a numerical identifier, an alphabetic identifier, a mixed numerical and alphabetic identifier, and/or any other type of identifier that may be used to identify the second network device. In some examples, the identifier 440 may include, but is not limited to, IP address, MAC address, a numerical identifier, an alphabetic identifier, a mixed numerical and alphabetic identifier (e.g., alphanumeric identifier), and/or any other type of identifier that may be used to identify two or more of the second network devices. In such examples, the command 442 may be directed to each of the second network devices that are included in the two or more second network device. In some examples, the command 442 may be similar to one of the commands 420. For a first example, a command 442 may be configured to cause an electronic device 230 (and/or more than one electronic device 230 indicated by the identifier 440) to activate (e.g., turn on, provide power to, etc.) light emitter(s) 232. For a second example, a command 442 may be configured to cause the electronic device 230 (and/or the more than one electronic device 230) to deactivate (e.g., turn off, cease providing power to, etc.) the light emitter(s) 232. For a third example, a command 442 may be configured to cause light emitter(s) 232 to activate (e.g., emit light). For a fourth example, a command 442 may be configured to cause the light emitter(s) 232 to deactivate (e.g., cease emitting light). For a fifth example, a command 442 may be configured to cause a locking mechanism 206 to lock an entrance. For a sixth example, a command 442 may be configured to cause the locking mechanism 206 to unlock the entrance.

In some examples, the first data packet 444 may further include data (e.g., a portion of the second data) that represents one or more additional characteristics associated with the command 442. In some examples, the data may represent a value for adjusting a setting associated with the second network device, where the setting is associated with the command 442. For example, the setting may include at least one of brightness level of a light emitter 232 (and/or other light source), a threshold ambient light level of a light emitter 232 (and/or other light source), a motion sensitivity level for a motion sensor 202, an auto-shutoff delay time for a second network device, a light output mode for a light emitter 232, a peer-to-peer communication channel, a peer-to-peer network link key, a peer-to-peer broadcast network key, or a group identifier. As such, the value may indicate at least one of the brightness level, the threshold ambient light level, the motion sensitivity level, the auto-shutoff delay time, a value associated with the light output mode, the peer-to-peer communication channel, the peer-to-peer network link key, the peer-to-peer broadcast network key, or the group identifier. The second network device may then use the value to adjust the setting when performing the command 420.

In some examples, the processor(s) 310 may determine that the first data represents the identifier 440 and the second data represents the command 442. For example, the processor(s) 310 may analyze the first data packet 444 to determine that the first data packet 444 includes the first data and the second data. The processor(s) 310 may then generate a second data packet 446 to be transmitted at least to the second network device. The second data packet 446 may include third data (e.g., synchronization data 448) for synchronizing the A/V device 210 with the second network device. For example, the third data may correspond to a preamble, header, and/or the like of the second data packet 446 that indicates that the A/V device 210 is about to transmit additional data. In some examples, the third data (e.g., the synchronization data 448) may further include a sync word representative of and/or signifying the network of second network devices. In some examples, the A/V device 210 may generate the third data such that, when transmitting the second data packet 446, the length of time that it takes to transmit the third data is long enough for the second network device to receive the third data while when a network interface is activated by the second network device. For example, the second network device may deactivate its network interface such that the second network device is not able to receive data. At given time intervals (e.g., every 1 millisecond, 64 milliseconds, 1 second, 5 seconds, and/or the like), the second network device may activate the network device in order to determine if other network devices are transmitting data. As such, the length of time that it takes for the A/V device 210 to transmit the third data should be at least the given time interval used by the second network device.

In some examples, the third data (e.g., synchronization data 448) may include data indicating the second network at which the A/V device 210 is communicating (e.g., data that identifies the low-power wide-area network), data (e.g., a sync word) indicating that the second network is associated with the second network devices (e.g., the sensors 204, the automation devices 206, the hub device 202, the VA device 208, the electronic device 230, the light emitters 232, etc.) that are included in the A/V device's 210 network, and/or data that identifies the A/V device 210. The sync word may include a numerical identifier, an alphabetic identifier, a mixed numerical and alphabetic identifier, and/or any other type of identifier that may be used to identify the network of devices. In some examples, other devices that receive the second data packet 446 may ignore the data packet 446 based on the synchronization not being associated with such devices. The identifier of the A/V device 210 may include a numerical identifier, an alphabetic identifier, a mixed numerical and alphabetic identifier, and/or any other type of identifier that may be used to identify the A/V device 210. In some examples, each of the network devices may receive the third data from the second data packet 446. The network devices may then analyze the third data to determine that the third data represents the identifier. In response, each of the network devices may continue to activate respective network interfaces in order to receive the remaining portion of the second data packet 446.

The remaining portion of the second data packet 446 may include at least fourth data representing the identifier 440 of the second network device and fifth data representing the command 442 to be performed by the second network device and/or the value associated with the command 442. In some examples, the fourth data and/or the fifth data included in the second data packet 446 may include the first data and/or the second data included in the first data packet 444, respectively. For example, since the first data and/or the second data (e.g., the first data packet 444) were transmitted using a first protocol associated with the first network, the processor(s) 310 may respectively convert the first data and/or the second data from the first data packet 444 to the fourth data and/or the fifth data included in the second data packet 446, which the A/V device 210 is able to transmit using the second network associated with the second protocol. Additionally, or alternatively, in some examples, the processor(s) 310 may generate the fourth data using the identifier 440 of the second network device as represented by the first data and/or generate the fourth data using the command 442 to be performed by the second network device as represented by the second data. In some examples, the identifier 440 from the first data packet 444 may include a same identifier as the identifier 440 from the second data packet 446. In some examples, the identifier 440 from the first data packet 444 may include a different identifier than the identifier 440 from the second data packet 446. For example, the identifier received in the first data packet may indicate to the A/V device 210 the device (and thus an associated identifier) and/or the identifier that the A/V device 210 is to include in the second data packet. The identifier that the A/V device 210 includes in the second data packet may include the identifier that the device the second data packet is intended for recognizes as the identifier identifying itself. In other words, the A/V device 210 may receive a first identifier in the first data packet (e.g., 12345), and may determine (e.g., from a lookup in a database) that the first identifier is associated with the light emitter 232, and may determine a second identifier (e.g., 67890) that is the identifier the light emitter 232 responds to, and/or may determine that the first identifier is associated with the second identifier, where the second identifier is the identifier the light emitter 232 responds to.

After generating the second data packet 446, the processor(s) 310 may transmit, using the second network interface 312 and over the second network, the second data packet 446. In some examples, while transmitting the second data packet 446, second network devices may receive at least a portion of the third data for synchronizing the A/V device 210 with the second network devices. In response, the second network devices may continue to activate respective network interfaces in order to receive the rest of the second data packet 446. After receiving the rest of the second data packet 446, the second network device associated with the identifier 440 may determine, based on the fourth data, that the second data packet 446 is directed to the second network device. The second network device may then determine that the fifth data represents the command 442 to be performed by the second network device. In response, the second network device may perform the command 442, which may be similar to one of the commands 420 described herein.

In some examples, the A/V device 210 may then receive, using the second network interface 312 and over the second network, data indicating a response 450 from the second network device. The response 450 may indicate whether the command 442 was performed by the second network device. Additionally, in some examples, if the command 442 was to provide information associated with the second network device, such as a current battery level associated with the second network device, the response 450 may include data representing the information (e.g., data representing the current battery level). The A/V device 210 may then transmit, using the first network interface 312 and over the first network, the data (and/or additional data) representing the response 450 to the backend server 224 and/or the client device 214, 216 (which may be via the backend server 224), as a third data packet.

In some examples, based on receiving the first data representing the identifier 440 and/or the second data representing the command 442 (e.g., receiving the first data packet 444), the processor(s) 310 may associate the identifier 440 and the command 442 with at least a touch surface 306 of the touch surface(s) 306 (similar to receiving the configuration data 438 described herein). In such examples, the processor(s) 310 may then receive, using the touch surface(s) 306, an input at the touch surface 306. Based on the input, the processor(s) 310 may generate input data 410 indicating that the input was received. The processor(s) 310 may then analyze the input data 410 to determine that the input occurred at the touch surface 306 associated with the identifier 440 and/or the command 442. In response, the processor(s) 310 may generate the second data packet 446. The processor(s) 310 may then transmit, using the second network interface 312 and over the second network, at least a portion of the second data packet 446 to the second network device.

In some examples, the A/V device 210 may transmit data using at least a first synchronization technique (e.g., coordinated network technique) and/or a second synchronization technique (e.g., an uncoordinated network technique). When communicating using the first synchronization technique, the A/V device 210 may transmit, using the network interface(s) 312 and over the second network, data (e.g., synchronization data 448) that is configured to synchronize the A/V device 210 with the second network devices, where the data is separate from the second data packet 446. For example, the data may indicate time(s) in which the second network devices are to transition from a deactivated mode, in which the second network devices are not receiving and/or transmitting data (e.g., network interfaces of the second network devices are deactivated), to an activated mode, in which the second network devices are capable of receiving and/or transmitting data (e.g., the network interfaces of the second network devices are activated). In some examples, the data may indicate different times(s) for different network devices. For example, the data may indicate that at least a first of the second network device is to be activated at first time(s), at least a second of the second network device(s) is to be activated at second time(s), and so forth. In some examples, the A/V device 210 may transmit the data at given time intervals. The given time intervals may include, but are not limited to, a millisecond, sixty-four milliseconds, two-hundred-fifty milliseconds, every second, every five seconds, every ten seconds, and/or the like.

While communicating using the first synchronization technique, the A/V device 210 may activate the network interface(s) 312 at the given time(s) to transmit data to and/or receive data from the second network devices. For example, if the A/V device 210 is storing data (e.g., the identifier 440 and/or the command 442) that is to be transmitted to a second network device, the A/V device 210 may activate the network interface(s) 312 for communicating over the second network at the time that is designated for synchronizing with the second network device. The A/V device 210 may then transmit the data over the second network to the second network device. Additionally, even if the A/V device 210 is not storing data that is to be transmitted to the second network device, the A/V device 210 may still activate the network interface(s) 312 for communicating over the second network at the time that designated for synchronizing with the second network device in order to receive data from the second network device (e.g., if the second network device transmits data).

When communicating using the second synchronization technique, the A/V device 210 may generate the second data packet t446 that includes the synchronization data 448, the identifier 440, and the command 442. As discussed herein, the A/V device 210 may generate the synchronization data 448 such that, when transmitting the second data packet 446, the length of time that it takes to transmit the synchronization data 448 is long enough for the second network devices to receive the synchronization data 448 while the second network devices are activated. For example, the second network devices may deactivate their network interfaces such that the second network devices are not able to receive data. At given time intervals (e.g., every 1 millisecond, one-hundred milliseconds, sixty-four milliseconds, two-hundred-fifty milliseconds, one second, five seconds, and/or the like), the second network devices may activate the network devices in order to determine if other network devices (e.g., the A/V device 210) are transmitting data. As such, the length of time that it takes for the A/V device 210 to transmit the synchronization data 448 should be at least the given time interval used by the second network devices. This way the second network devices receive the synchronization data 448 and stay activated in order to receive the rest of the second data packet 446.

In some examples, communicating using the first synchronization technique may consume more power than communicating using the second synchronization technique. As such, in some examples, the A/V device 210 may communicate using the first synchronization technique when the A/V device 210 is receiving power from an external power source and communicate using the second synchronization technique when the A/V device 210 is receiving power from the battery 342. Additionally, in some examples, the A/V device 210 may communicate using both the first synchronization technique and the second synchronization technique.

Figure 4B:
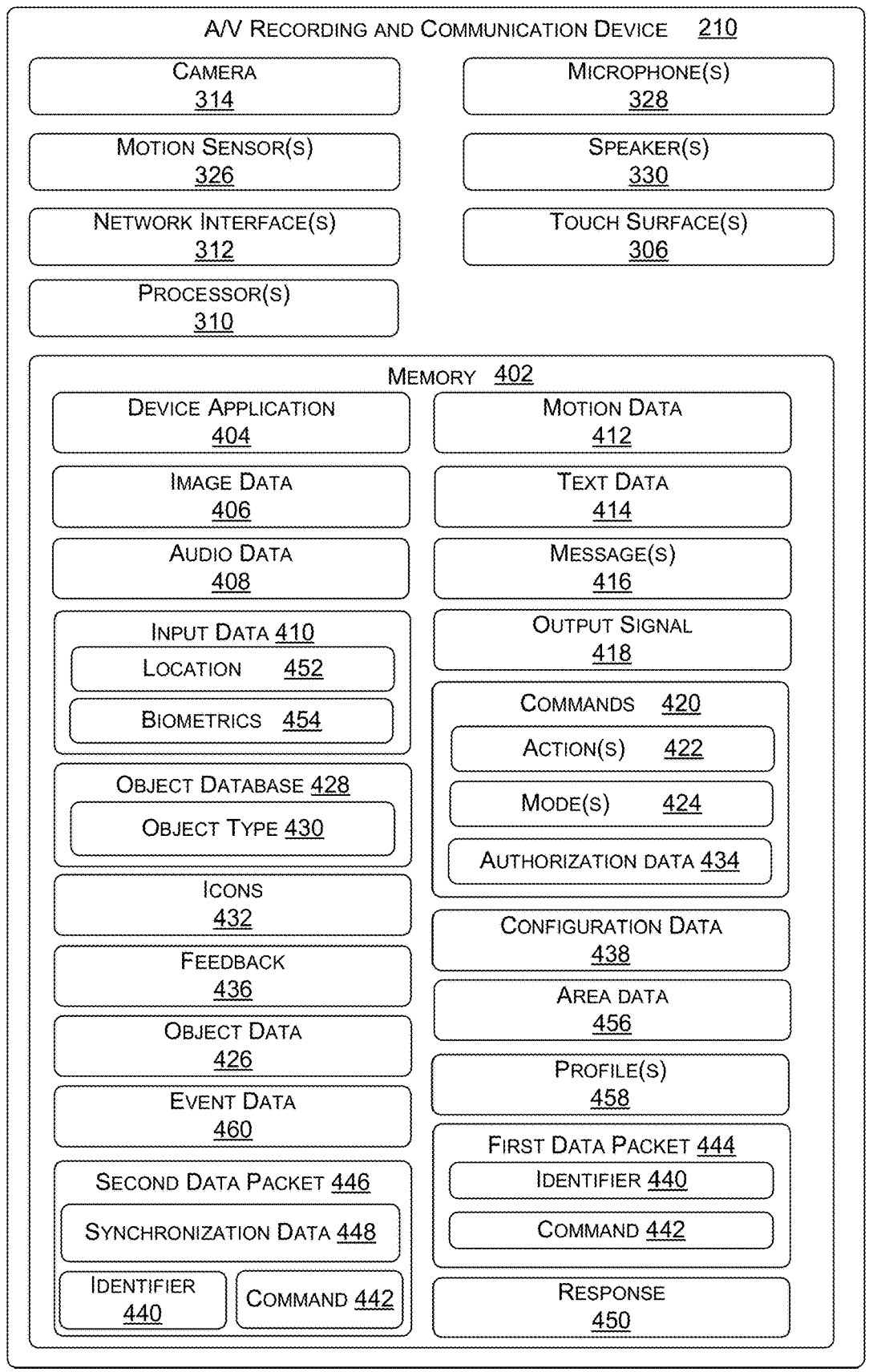
FIG. 4B is a functional block diagram illustrating an example embodiment of a multi-button A/V recording and communication device, according to various aspects of the present disclosure.

FIG. 4B is another functional block diagram illustrating an embodiment of the A/V device 210 according to various aspects of the present disclosure. In some embodiments, the A/V device 210 may represent, and further include one or more of the components from, the A/V recording and communication doorbell 210(*c*), the A/V recording and communication security camera 210(*a*), and/or the floodlight controller 210(*b*). Additionally, in some examples, the A/V device 210 discussed in FIG. 4B may include one or more of the components from the A/V device 210 discussed in FIG. 4A. In some embodiments, the A/V device 210 may omit one or more of the components shown in FIG. 4B and/or may include one or more additional components not shown in FIG. 4B. Furthermore, the A/V device 210 discussed in FIG. 4A may include one or more of the components discussed herein with regards to the A/V device 210 of FIG. 4B.

As shown in FIG. 4B, the A/V device 210 includes memory 402 storing the device application 404. As discussed above with regard to FIG. 4A, the device application 404 may configure the processor(s) 310 to capture, generate, and/or transmit image data 406, audio data 408, input data 410, and/or motion data 412, and/or text data 414. As described herein with regard to FIG. 4B, at least some of the processes of the backend server 224, the hub device 202, and/or the client device 214, 216 may be executed by the A/V device 210.

As noted above, the input data 410 may include data generated in response to touch input(s) received at the touch surface(s) 306. Compared to FIG. 4A, FIG. 4B illustrates that the input data 410 may also include location 452 and biometrics 454. The touch surface(s) 306 may be embodied as a multi-button capacitive touch surface divided into a plurality of touch surfaces capable of receiving touch input. To determine which touch surface the touch input was received, the processor(s) 310 may be configured to analyze the location 452. That is, because the multi-button capacitive touch surface may be configured and customized to include any number of touch surfaces, the location 452 of the touch input(s) may be analyzed to determine which touch surface(s) received touch input. For example, the processor(s) 310 may analyze the touch input received at the touch surface(s) 306 and associate the touch input with a location on the touch surface(s) 306. Alternatively, the touch surface(s) 306 may be configured to generate the location 452 corresponding to the touch inputs at the touch surface(s) 306. In some examples, the location 452 may be represented by X and Y coordinates associated with a coordinate system of the touch surface(s) 306. As such, the processor(s) 310 may be configured to analyze the touch input and associate the touch input with X and Y coordinates, thereby allowing the processor(s) 310 to determine the location 452 of the touch inputs on the touch surface(s) 306. In some examples, the location 452 may correspond to a point on a grid pattern of the touch surface 306. Additionally, when multiple touch inputs are received at the touch surface(s) 306, the processor(s) 310 may be configured to associate each touch input with a respective location 452.

With further reference to FIG. 4B, the input data 410 may also include biometrics 454. The biometrics 454 may be generated by the processor(s) 310 of the A/V device 210 in response to receiving input at the touch surface(s) 306 and/or in response to the processor(s) 310 detecting motion by the motion sensor(s) 326. For example, the A/V device 210 may include a fingerprint scanner/reader integrated into the touch surface(s) 306 and/or a retinal scanner integrated into the camera 314. Touch input received at the touch surface(s) 306 may cause the processor(s) 310 to generate the biometrics 454 associated with a user (e.g., a fingerprint of the user). Additionally, or alternatively, the processor(s) 310 may cause the camera 314 to generate the biometrics 454 when touch input is received at the touch surface(s) 306 and/or when motion is detected at the A/V device 210. Depending on the embodiment, the biometrics 454 may include images of the user at the A/V device 210 and/or features of the user which may be used for fingerprint recognition, iris recognition, retinal scans, gesture recognition, and/or facial recognition. In some examples, the biometrics 454 may represent speech uttered by a user and captured by the microphone(s) 328, such that the processor(s) 310 may use the biometrics 454 for voice recognition. In such examples, the biometrics 454 may be associated with the input data 410 such that the processor(s) 310 may analyze the biometrics 454 in relation to the input data 410 received at the touch surface(s) 306.

The processor(s) 310 may be configured to store area data 456 defining areas on the touch surface(s) 306. The area data 456 may represent an area (e.g., zone, portion, section, etc.) corresponding to individual touch surfaces of touch surface(s) 306. For example, the touch surface includes three touch surfaces in which touch input is capable of being received from a user of the A/V device 210. In this sense, the area data 456 defines the boundaries of the touch surface(s) on the multi-button capacitive touch surface. In some examples, the area data 456 may define X and Y coordinates of the touch surface(s) 306 or define a grid system of the touch surface(s) 306. For example, each area represented by the area data 456 may be associated with X and Y coordinates on the touch surface(s) 306 such that the processor(s) 310 are capable of determining which area touch input is received. Therefore, upon receiving touch input at the touch surface(s) 306, the location 452 may be used by the processor(s) 310 to determine and/or associate the location 452 with an area represented by the area data 456. That is, using the touch input received at the touch surface(s) 306 the processor(s) 310 may determine which touch surface of the touch surface(s) 306 the touch input was received. In some examples, the processor(s) 310 may analyze the input data 410 and compare the location 452 with the area data 456. In some examples, this may involve determining X and Y coordinates associated with the touch input of the touch surface(s) 306 and comparing these coordinates with X and Y coordinates represented by the area data 456. In some examples, the generated input data 410 may indicate which area the touch input was received.

The commands 420 may be associated with the areas of the touch surface(s) 306. That is, each area corresponding to the area data 456 may be associated with a command represented by the commands 420. In this sense, the A/V device 210 (or the network device(s)) may be configured to perform a variety of commands 420 based at least in part on which area of the touch surface(s) 306 touch input is received. To illustrate, after determining the location 452, the processors(s) 310 may determine which area of the touch surface(s) 306 the touch input was received and determine the command 420 associated with the area of the touch surface(s) 306. For example, the processor(s) 310 may store an indication that a first touch surface of the touch surface(s) 306 is defined by an area, as represented by the area data 456. Knowing this area, when touch input is received at the first touch surface of the touch surface(s) 306, the processor(s) 310 may then determine a command associated with the first touch surface of the touch surface(s) 306. As a result, the processor(s) 310 may cause the command 420 associated with the first touch surface of the touch surface(s) 306 to be performed. Therefore, using the location 452 and the area data 456, the processor(s) 310 determine which touch surface of the touch surface(s) 306 the touch input was received. However, in some examples, the processor(s) 310 may analyze a series of touch inputs at the touch surface(s) 306 to determine the commands 420. For example, the processor(s) 310 may analyze the input data 410 to determine the series of touch inputs across the touch surface(s) 306.

In some examples, the area corresponding to the area data 456 may be configured by the user of the A/V device 210. Additionally, in some examples, the user may configure the areas of the touch surface(s) 306 to have particular shapes. However, in some examples, the area data 456 may define an amount of the areas on the touch surface(s) as well as the shape of the areas on the touch surface(s) 306.

The commands 420 may also be associated with the actions 422 and/or the modes 424 such that performance of the command 420 causes actions 422 to be performed or the A/V device 210 or network device(s) to enter modes 424.

In some examples, the commands 420 may be associated with an authorization data 434. In authorizing the command 420, the processor(s) 310 may analyze the biometrics 454 to determine whether the user issuing the touch input is authorized to perform the command 420. Determining whether the user is authorized may involve the processor(s) 310 performing fingerprint recognition or facial recognition using the biometrics 454. As such, the biometrics 454 may be used to determine the identity of persons who interact with and/or are in the field of view of the A/V device 210 and whether the user is authorized to perform the command 420. However, as noted above with regard to FIG. 4A, the authorization data 434 may additionally, or alternatively, include receiving a pin associated with the touch input or the touch input representing touch over a threshold force level.

With further reference to FIG. 4B, the processor(s) 310 may be configured to store profile(s) 458 associated with authorized users. For example, the processor(s) 310 may store a profile of a homeowner at which the A/V device 210 is located. In some examples, the profile(s) 458 may indicate which commands 420 users are authorized to perform. For example, the profile 458 of the homeowner may indicate which commands 420 the homeowner is authorized to perform (e.g., disarming a security system). In response to the processor(s) 310 receiving the input data 410, using the biometrics 454 (or the pin), the processor(s) 310 may determine which profile 458 (if any) is associated with the touch input. For example, the processor(s) 310 may use the biometrics 454 to locate the profile(s) 458 and determine whether the command 420 associated is authorized. As an additional example, the processor(s) 310 may receive, using the network interface(s) 312, the fingerprints or other biometrics from third parties. For example, the processor(s) 310 may receive, using the network interface(s) 312, data representing fingerprints of employees associated with a carrier service. The processor(s) 310 may store a profile 458 associated with the carrier service such that when the processor(s) 310 receive the input data 410, the processor(s) 310 may be configured to compare the biometrics 454 with the biometrics received from the carrier service to determine whether the touch input is received from an authorized user (e.g., an employee of the carrier service). In another example, profile(s) 458 may be received from other third parties that provide services to the user/owner at the property (e.g., a house cleaning service). In such example, the user/owner of the property may verify the profile(s) of the third parties prior to the profile(s) 458 being stored by the processor(s) 310 in the memory 402. As another example, the user/owner of the A/V device 210 may store images of authorized persons, which the processor(s) 310 may use in authorizing commands 420.

The device application 404 may further configure the processor(s) 310 to receive, using the network interface(s) 312, the event data 460. The event data 460 may be received from the hub device 202, the backend server 224, the client device 214, 216, and/or another electronic device. Additionally, the event data 460 may be received by the processor(s) 310 from third parties, such as a carrier service (e.g., FedEx), online retailers, email services, or other third-party services and/or applications. In some examples, the event data 460 may represent events that are expected to occur at the A/V device 210. For example, the event data 460 may represent that a package is scheduled to be delivered at the home associated with the A/V device 210. In this scenario, the event data 460 may be tracking data (e.g., tracking number) associated with the package. Using the event data 460, the processor(s) 310 may determine events that are expected to occur at the A/V device 210 or commands 420 that are expected to be received at the A/V device 210. For example, using the tracking data, the processor(s) 310 may determine that a package is scheduled to arrive at the home and that the command associated with the carrier service may be forthcoming. In some examples, the event data 460 may be used by the processor(s) 310 to authorize the command 420. That is, because the A/V device 210 is expecting a package to be delivered, for example, when a command associated with the carrier service is selected, the processor(s) 310 may authorize the command based on receiving the event data 460. This authorization may be in addition to the processor(s) 310 authorizing the command 42 using biometrics 454. In other examples, the event data 460 may indicate that a particular visitor is expected at the A/V device 210 (e.g., food delivery personnel, family members, guests, etc.).

In performing the commands 420, or after causing the command 420 to be performed, the processor(s) 310 may be configured to generate and/or transmit the message(s) 416. Additionally, after identifying the command 420 and performing the command 420, the processor(s) 310 may be configured to output feedback 436.

With further reference to FIG. 4B, the processor(s) 310 may be configured to receive, using the network interface(s) 312, configuration data 438. The configuration data 438 may represent a configuration of the touch surface(s) 306 such that the A/V device 210 is configured and customized according to the configuration data 438. In response to receiving the configuration data 438, the device application 404 may configure the processor(s) 310 to use the configuration data 438 to configure the touch surface(s) 306. In this sense, as discussed above, the touch surface(s) 306 may be configurable to include a certain amount of areas as represented by the area data 456. Therefore, in some examples, the configuration data 438 may represent the locations on the touch surface(s) 306 corresponding to the area, an amount of the areas, the commands 420 associated with the areas, as well as the icons 432 associated with the areas. The configuration data 438 may also indicate the action(s) 422, the modes 424, and/or the authorization data 434 associated with the commands 420. Additionally, or alternatively, the configuration data 438 may include the feedback 436 to outputted by the A/V device 210. For example, the configuration data 438 may indicate that the touch surface(s) 306 is to include a first touch surface defined by a first area and associated with a first command, a second touch surface defined by a second area and associated with a second command, and a third touch surface defined by a third area and associated with a third command. The configuration data 438 may further include icons 432 associated with the touch surface(s) 306. Upon receiving the configuration data 438, the processor(s) 310 may use the configuration data 438 to configure the touch surface(s) 306. For example, the processor(s) 310 may configure a X and Y coordinate system of the touch surface(s) 306, or a grid pattern of the touch surface(s) 306, according to the configuration data 438. As such, when the input data 410 indicates touch input received at the first touch surface of the touch surface(s) 306, for example, the processor(s) 310 may cause the first command to be performed. While the above example discusses configuring the touch surface(s) 306 to have three touch surfaces, more or less touch surfaces may be included.

In some examples, and similar to the A/V device 210 described in FIG. 4A, the A/V device 210 of FIG. 4B may operate as a "bridge" between second network devices (e.g., remote network device, such as the backend server 224, the client device 214, 216, etc.) and second network devices (e.g., local network devices, such as sensors 204, automation devices 206, the electronic device 230, the light emitters 232, the hub device 202, etc.). For example, the processor(s) 310 may receive, using the first network interface 312 and over the first network, a first data packet 444 from a first network device, where the first data packet 444 is directed to a second network device. Based on the first data packet 444, the processor(s) 310 may generate a second data packet 446. The processor(s) 310 may then transmit, using the second network interface 312 and over the second network, the second data packet 446 to the second network device. Additionally, the processor(s) 310 may receive, using the second network interface 312 and over the second network, data representing a response 450 from the second network device. The processor(s) 310 may then transmit, using the first network interface 312 and over the first network, the data (and/or additional data) representing the response 450 to the first network device.

Figure 5:
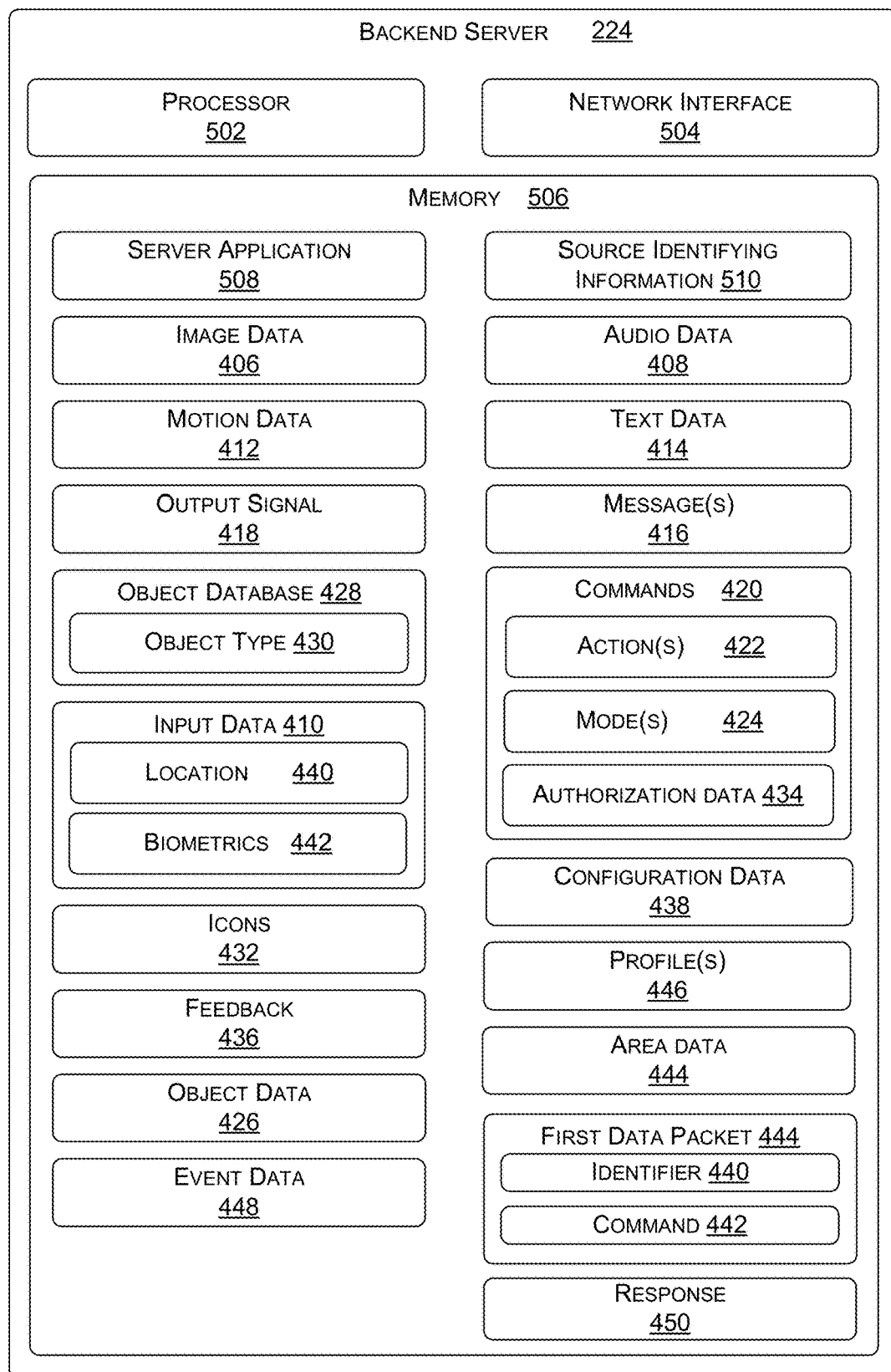
FIG. 5 is a functional block diagram illustrating an example embodiment of a backend device, according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a network interface 504 (which may be similar to, and/or include similar functionality as, the network interface(s) 312), and a memory 506 (which may be similar to, and/or include similar functionality as, the memory 402). The network interface 504 may allow the backend server 224 to access and communicate with devices connected to the network (Internet/PSTN) 212 (e.g., the A/V device 210, the hub device 202, the client devices 214, 216, a device controlled by the security monitoring service 228, the A/V devices 230, and/or the client devices 232).

The memory 506 may include a server application 508 that configures the processor(s) 502 to receive and/or retrieve the audio data 408, the text data 414, the input data 410, the messages 416, the image data 406, the motion data 412, the input data 410, which, in some examples, includes the location 452 and the biometrics 454, the commands 420, which may include the action(s) 422, the mode(s) 424, and the authorization data 434), the configuration data 438, the feedback 436, the data representing the response 450, and/or the profile(s) 458 from the A/V device 210 (e.g., in the output signal 418), the client device 214, 216, and/or the hub device 202. The server application 508 may also configure the processor(s) 502 to transmit (and/or forward) the audio data 408, the text data 414, the input data 410, the messages 416, the image data 406, the motion data 412, the input data 410 (including the location 452 and the biometrics 454), the commands 420 (including the action(s) 422, the mode(s) 424, the first data packet 444, and/or the authorization data 434), and/or the feedback 436 to the client devices 214, 216 using the network interface 504.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the backend server 224. For example, as discussed with reference to FIG. 4A, the processor(s) 502 may determine, using the input data 410, which touch surface(s) 306 the touch input was received and determine the command 420 associated with the touch surface(s) 306. For example, the processor(s) 502 may determine that the touch input was received at a second touch surface of the touch surface(s) 306. As discussed in FIG. 4B, the processor(s) 502 may be configured to analyze the location 452 of the input data 410 to associate the location 452 with an area of the touch surface(s) 306. Therein, the processor(s) 502 may determine the command 420 associated with the area of the touch surface(s) 306, for example. As an additional example, the processors 502 may be configured to analyze biometrics associated with the touch input (e.g., biometrics 454) and determine whether the command 420 is authorized. For examples, the processor(s) 502 may perform gesture recognition to authorize the command 420. In some examples, the processor(s) 502 may also store the profile(s) 458. Yet still, the processor(s) 502 may be configured to perform the commands 420 and/or portions of the commands 420.

The processor(s) 502 may also be configured to receive, using the network interface 504, the feedback 436 and the configuration data 438 from the client device 214, 216. Additionally, the processor(s) 502 may be configured to transmit, using the network interface 504, the feedback 436 and the configuration data 438 to the A/V device 210. The processor(s) 502 may also analyze the image data 406 to determine the existence of a package (or other objects) at the A/V device 210. To perform these operations, the processor(s) 502 may store the object database 428, including the object type 430, and/or the object data 426, as described with reference to FIG. 4A.

Furthermore, the processor(s) 502 may transmit, using the network interface 504, the first data packet 444 to the A/V device 210. In some examples, the processor(s) 502 transmit the first data packet 444 in response to receiving the first data packet 444 from the client device 214, 216. In some examples, the processor(s) 502 transmit the first data packet 444 in response to receiving data from the client device 214, 216, where the data represents the identifier 440 and the command 442 to be performed by the network device. In such examples, the processor(s) 502 may then generate the first data packet 444 using the data received from the client device 214, 216. After transmitting the first data packet 444, the processor(s) 502 may receive, using the network interface 504, data representing a response 450 from the A/V device 210. In some examples, the processor(s) 502 may then transmit, using the network interface 504, the data (and/or additional data) representing the response 450 to the client device 214, 216.

Figure 6:
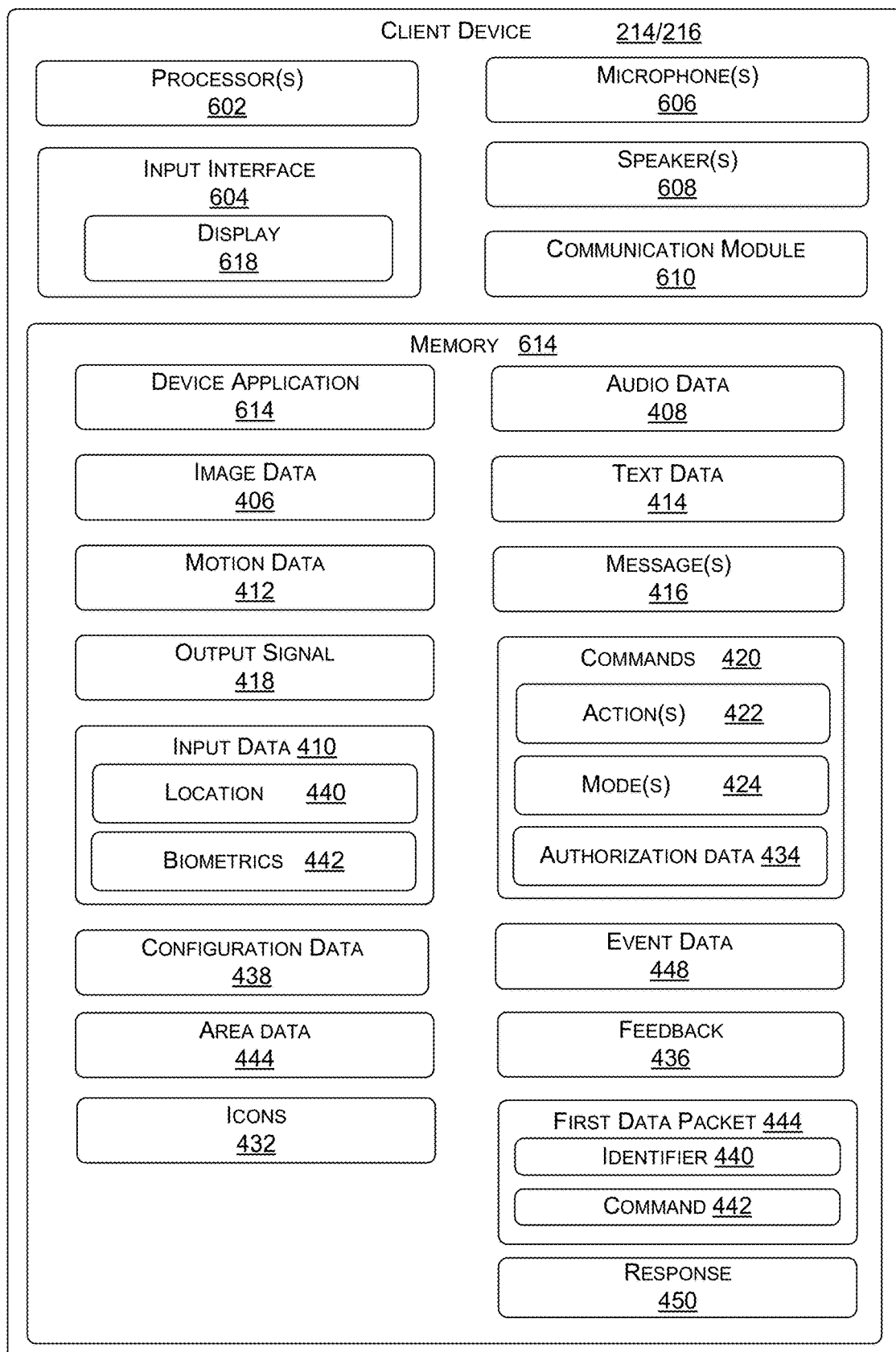
FIG. 6 is a functional block diagram illustrating an example embodiment of a client device, according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a network interface 610 (which may be similar to, and/or include similar functionality as, the network interface(s) 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604 (e.g., configuration data 438). In addition, the device application 614 may configure the processor(s) 602 to receive, using the network interface 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618 (e.g., configuration data 438). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received a touch input (e.g., at the touch surface(s) 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216. For example, the processor(s) 602 may be configured to generate the configuration data 438 according to a configuration of the touch surface(s) 306 of the A/V device 210. For example, the display 618 may display a representation of the touch surface(s) 306 and the user, via the user interface 604, may interact with the display to configure the touch surface(s) 306. For example, the user may select commands 420 (including the actions 422, the mode(s) 424, and/or icons 432) to be associated with the touch surface(s). After receiving the input, the processor(s) 602 may generate and transmit, using the network interface 610, the configuration data 438 to the A/V device 210. The user may also transmit, using the client device 214, 216, the feedback 436 to the A/V device 210.

Additionally, the processor(s) 602 may receive, using the input interface 604, at least a first input indicating an identifier 440 of a network device and a second input indicating a command 442 to be performed by the network device. In some examples, the processor(s) 602 may then generate the first data packet 444 based on the first input and the second input. The processor(s) 602 may then transmit, using the network interface 610, the first data packet 444 to the backend server 224, the hub device 202, and/or the A/V device 210. Additionally, or alternatively, in some examples, based on the first input and the second input, the processor(s) 602 may generate the first data representing the identifier 440 and the second data representing the command 442. The processor(s) 602 may then transmit, using the network interface 610, the first data and the second data to the backend server 224, the hub device 202, and/or the A/V device 210. In either of the examples above, when the network device performs the command 442, the processor(s) 602 may receive, using the network interface 610, data representing the response 450 from the backend server 224, the hub device 202, and/or the A/V device 210.

Figure 7A:
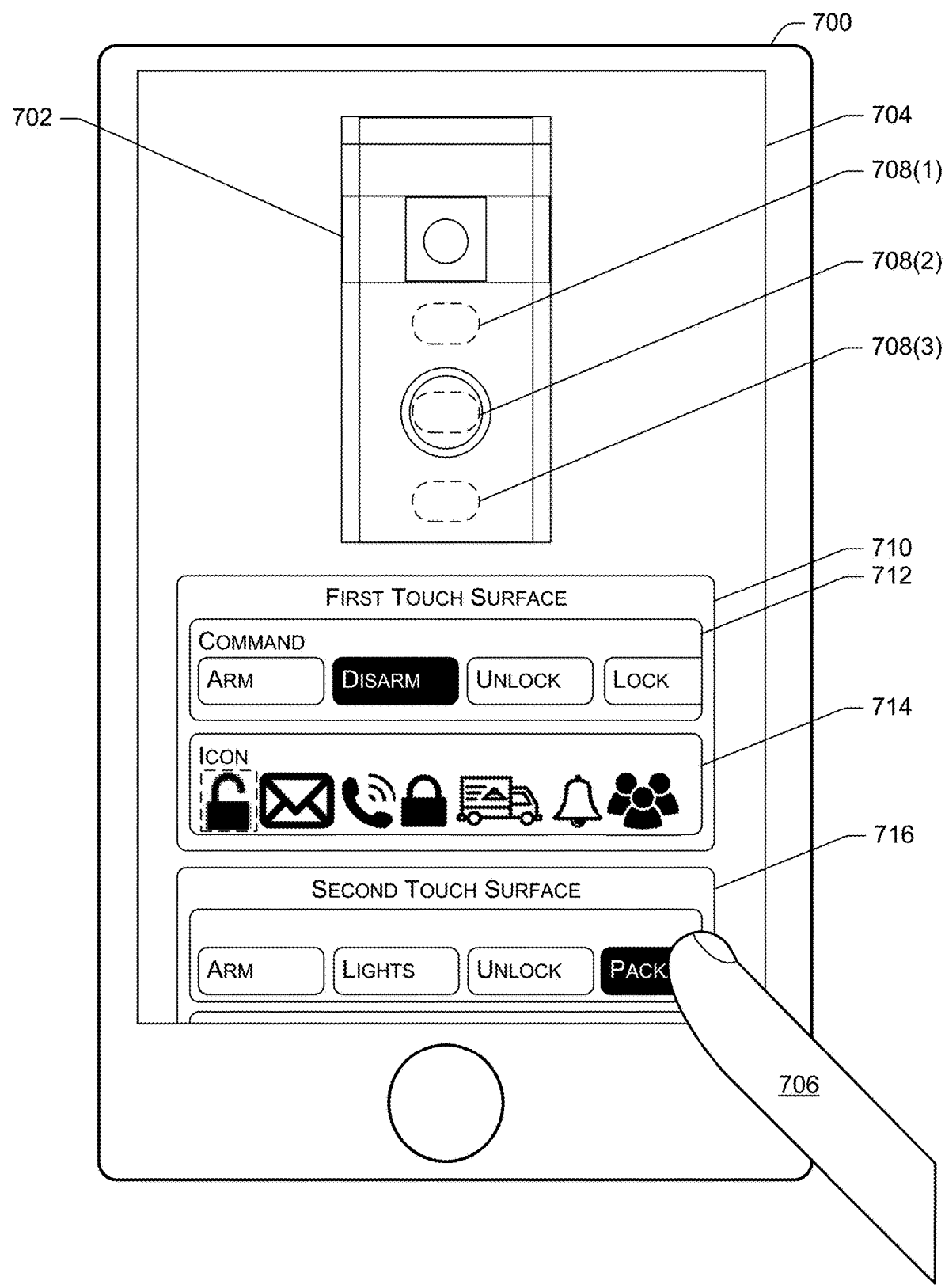
FIG. 7A illustrates an example client device to configure a multi-button A/V recording and communication doorbell, according to various aspects of the present disclosure.

FIG. 7A illustrates an example of using a client device 700 to configure an A/V device 702 according to various aspects of the present disclosure. In some examples, the client device 700 (which may be similar to, and represent the client device 214, 216) may be associated with the A/V device 702 (which may be similar to, and represent the A/V device 210). The client device 700 may include a display 704 that displays a representation of the A/V device 702. The client device 700 may be used to configure the A/V device 702. For example, a user 706 may interact with the display 704 (e.g., a user interface or graphical user interface) such that the user 706 is able to configure touch surfaces of the A/V device 702. For example, a device application (e.g., the device application 614) may conduct an out-of-box experience (OOBE) with the user 706 in order to associate the A/V device 702 with the client device 700 and configure the A/V device 702.

The representation of the client device 702 shown on the display 704 shows the A/V device 702 including a first touch surface 708(1), a second touch surface 708(2), and a third touch surface 708(3) (hereinafter, collectively "touch surfaces 708").

With further reference to FIG. 7A, the display 704 includes a portion 710 where the user 706 associates the first touch surface 708(1) with a command and, in some examples, an icon. For example, the portion 710 may include a command input field 712 and an icon input field 714. In the command input field 712, the user 706 may associate the first touch surface 708(1) with a command (e.g., the commands 420). For example, the command input field 712 indicates commands of "arm," "disarm," "unlock," and "lock." However, other commands may be presented in the command input field 712 and the user 706 may scroll, either vertically, horizontally, or otherwise through the commands within the command input field 712 to select a command to be associated with the first touch surface 708(1). To associate the first touch surface 708(1) with a command, the user 706 may select one of the commands within the command input field 712. Shown in FIG. 7A, the user 706 selected the first touch surface 708(1) to be associated with a "disarm" command.

In the icon input field 714, icons (e.g., icons 432) are displayed. The icons displayed in the icon input field 714 may associated with the commands in the command input field 712. The user 706 may select an icon within the icon input field 714 to associate with the command selected in the command input field 712. For example, because the user 706 has selected the command "disarm" in the command input field 712, FIG. 7A illustrates that the user 706 selected an unlocked-lock icon in the icon input field 714. In turn, after associating the first touch surface 708(1) with a command and an icon, the user 706 may proceed to associate the second touch surface 708(2) and the third touch surface 708(3) in a similar manner. For example, FIG. 7A illustrates the user 706 interacting with a portion 716 of the display 704 to configure the second touch surface 708(2). After configuring the touch surfaces 708 of the A/V device 702, the client device 700, the backend server 224, and/or another network device may transmit a request (e.g., the configuration data 438, the first data packet 444, etc.) that configures the A/V device 702. In some examples, the display 704 may also include portions to receive feedback associated with the feedback 436.

Figure 7B:
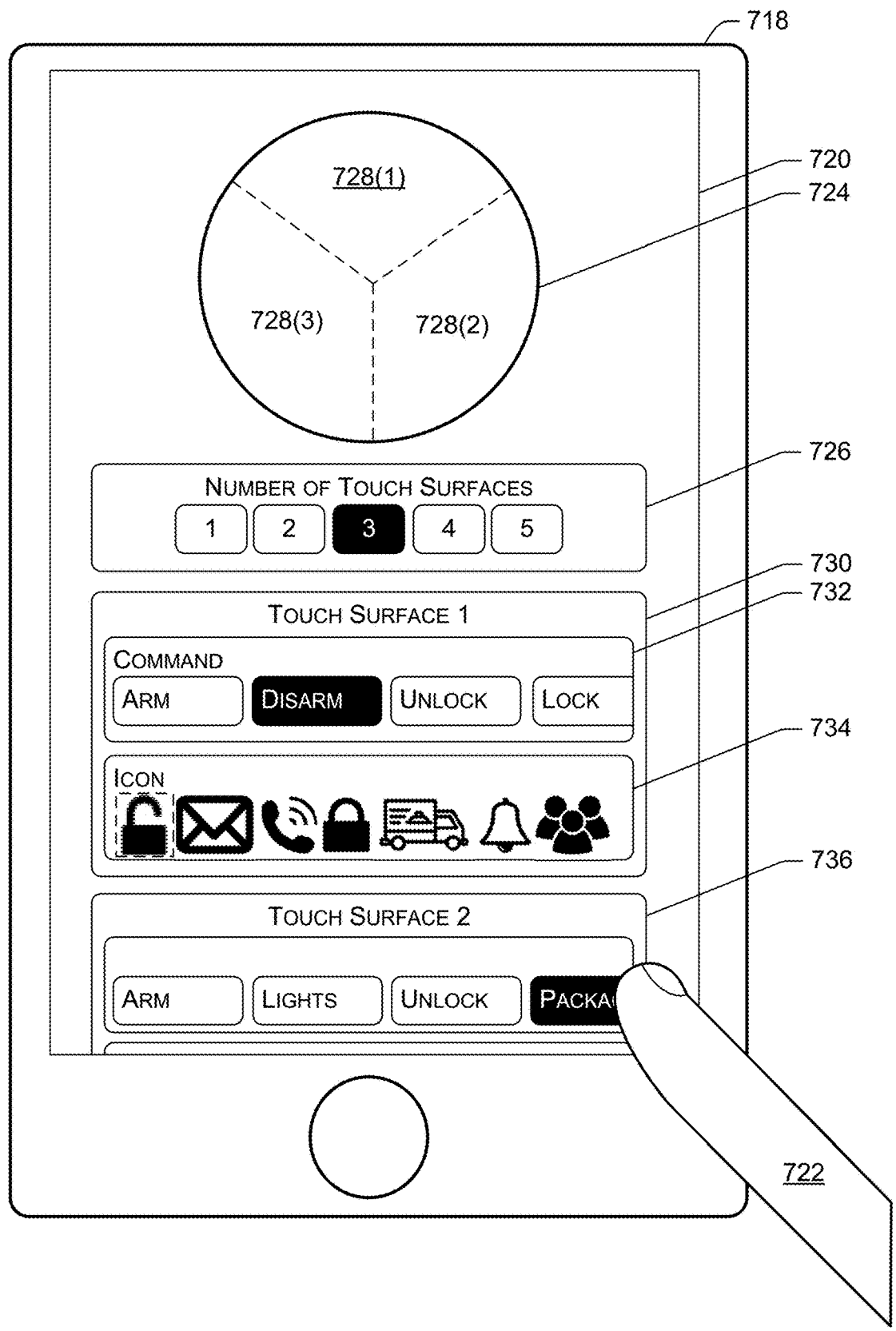
FIG. 7B illustrates an example client device to configure a multi-button A/V recording and communication doorbell, according to various aspects of the present disclosure.

FIG. 7B illustrates an example of using a client device 718 to configure an A/V device according to various aspects of the present disclosure. In some examples, the client device 700 (which may be similar to, and represent the client device 214, 216) may be associated with the A/V device 720 (which may be similar to, and represent the A/V device 210) having a multi-button capacitive touch surface 724. The client device 700 may include a display 720 that displays a representation of a touch surface of the A/V device. A user 722 may interact with the display 720 (e.g., a user interface or graphical user interface) such that the user 722 is able to configure touch surfaces of the A/V device 702. For example, a device application (e.g., the device application 614) may conduct an out-of-box experience (OOBE) with the user 722 in order to associate the A/V device with the client device 700 and configure the A/V device.

The user 722 may configure the multi-button capacitive touch surface 724 to have a plurality of touch surfaces. Each of the touch surfaces may be defined by an area on the multi-button capacitive touch surface 724. For example, a portion 726 of the display 720 may include an input field where the user 722 selects the number of touch surfaces on the multi-button capacitive touch surface 724. In response to receiving input, the portion 726 may indicate the amount of touch surfaces configured on the multi-button capacitive touch surface 724. For example, the portion 726 of the display 720 indicates that the multi-button capacitive touch surface 724 is configured to include three touch surfaces. Upon this selection, the multi-button capacitive touch surface 724 may be updated such that the multi-button capacitive touch surface 724 includes a first touch surface 728(1), a second touch surface 728(2), and a third touch surface 728(3) (hereinafter, collectively "touch surfaces 728"). However, the multi-button capacitive touch surface 724 may be configured to include any number of touch surfaces.

With further reference to FIG. 7B, the display 720 includes a portion 730 where the user 722 associates the first touch surface 728(1) with a command and an icon. For example, the portion 730 may include a command input field 732 and an icon input field 734. In the command input field 732, the user 722 may associate the first touch surface 728(1) with a command. For example, the command input field 732 indicates commands of "arm," "disarm," "unlock," and "lock." To associate the first touch surface 728(1) with a command, the user 722 may select one of the commands within the command input field 732. For example, FIG. 7B illustrates that the user 722 selected the first touch surface 728(1) to be associated with a "disarm" command. However, other commands may be presented in the command input field 732 and the user 722 may scroll, either vertically, horizontally, or otherwise through the commands within the command input field 732 to select a command associated with the first touch surface 728(1).

In the icon input field 734, icons are displayed. The icons displayed in the icon input field 734 may associated with the commands in the command input field 732. The user 722 may select an icon within the icon input field 734 to associate with the command selected in the command input field 732. For example, as the user 722 selected the command "disarm" in the command input field 732, FIG. 7B illustrates that the user 722 selected an unlocked-lock icon in the icon input field 734. Upon the selection of the icon in the icon input field 734 for the first touch surface 728(1), the first touch surface 728(1) of the multi-button capacitive touch surface 724 may be updated to show the selected icon. In turn, after associating the first touch surface 728(1) with a command and an icon, the user 722 may proceed to associate the second touch surface 728(2) and the third touch surface 728(3) in a similar manner. For example, FIG. 7B illustrates the user 722 interacting with a portion 736 of the display 720 to configure the second touch surface 728(2). After configuring the touch surfaces 728 of the multi-button capacitive touch surface 724, the client device 718, the backend server 224, and/or another network device may transmit a request (e.g., the configuration data 438, the first data packet 444, etc.) that configures the A/V device.

Figure 8A:
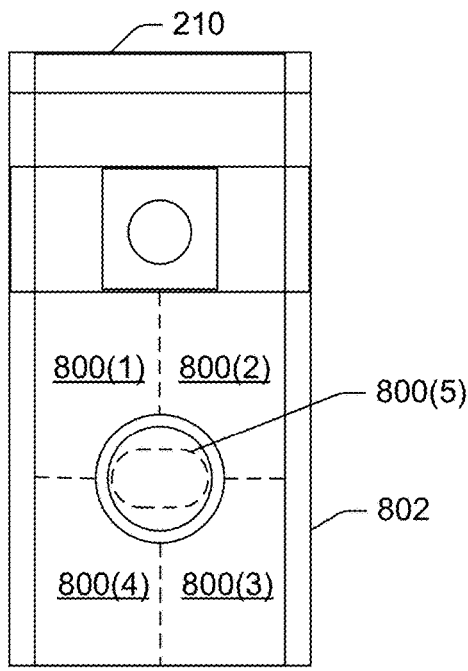
FIG. 8A is an example multi-button A/V recording and communication doorbell, according to various aspects of the present disclosure.

FIGS. 8A-8D illustrate different examples of an A/V device 210 having a multi-button front plate. Particularly, FIGS. 8A-8D illustrate different embodiments of the touch surfaces. For example, FIG. 8A illustrates the A/V device 210 including a first touch surface 800(1), a second touch surface 800(2), a third touch surface 800(3), a fourth touch surface 800(4), and a fifth touch surface 800(5) (hereinafter, collectively "touch surfaces 800"). In some embodiments, the touch surfaces 800 may be disposed on a front plate 802 of the A/V device 210. In other embodiments, the touch surfaces 800 may be separate component(s) from the front plate 802. In some embodiments, the front plate 802 may include one or more of the touch surfaces 800 and the one or more of the touch surfaces 800 may be separate components from the front plate 802. For example, the front plate 802 may include holes through which the touch surface(s) 800 protrude. In any embodiment, the components that make up the touch surfaces 800 may be disposed on the front plate 802, may be separate components, or may be a combination thereof.

Figure 8B:
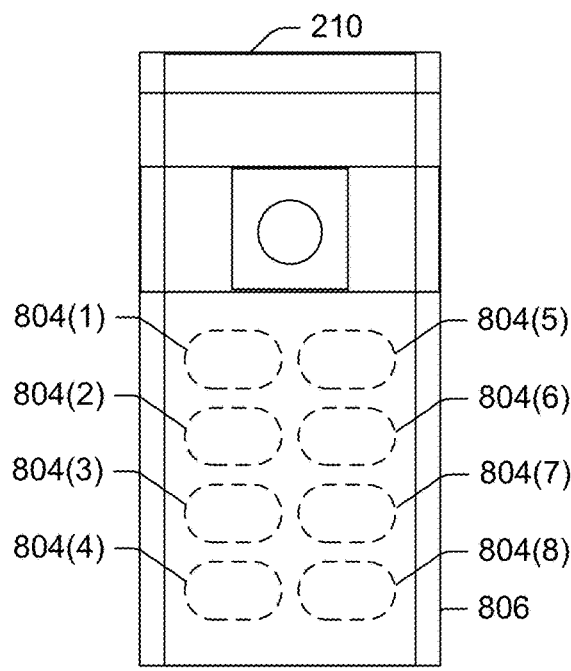
FIG. 8B is an example multi-button A/V recording and communication doorbell, according to various aspects of the present disclosure.

FIG. 8B illustrates the A/V device 210 including eight touch surfaces (a first touch surface 804(1), a second touch surface 804(2), a third touch surface 804(3), a fourth touch surface 804(4), a fifth touch surface 804(5), a sixth touch surface 804(6), a seventh touch surface 804(7), and an eighth touch surface 804(8) (hereinafter, collectively "touch surfaces 804")) disposed on a front plate 806 of the A/V device 210.

Figure 8C:
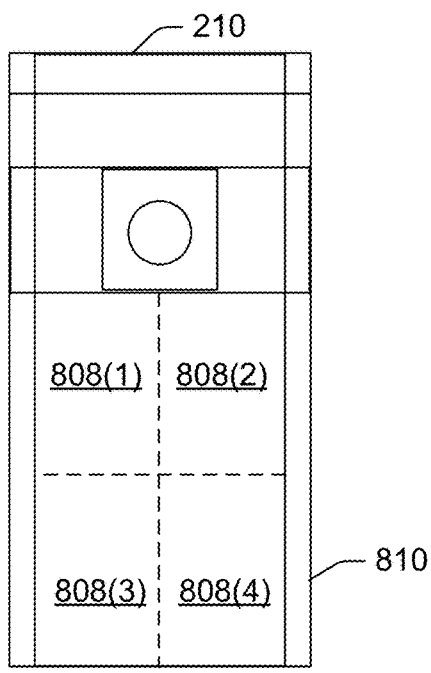
FIG. 8C is an example multi-button A/V recording and communication doorbell, according to various aspects of the present disclosure.

FIG. 8C illustrates the A/V device 210 including four touch surfaces (a first touch surface 808(1), a second touch surface 808(2), a third touch surface 808(3), and a fourth touch surface 808(4)) disposed on a front plate 810. Shown in FIG. 8C, the front plate 810 may be divided into four equally sized touch surfaces.

Figure 8D:
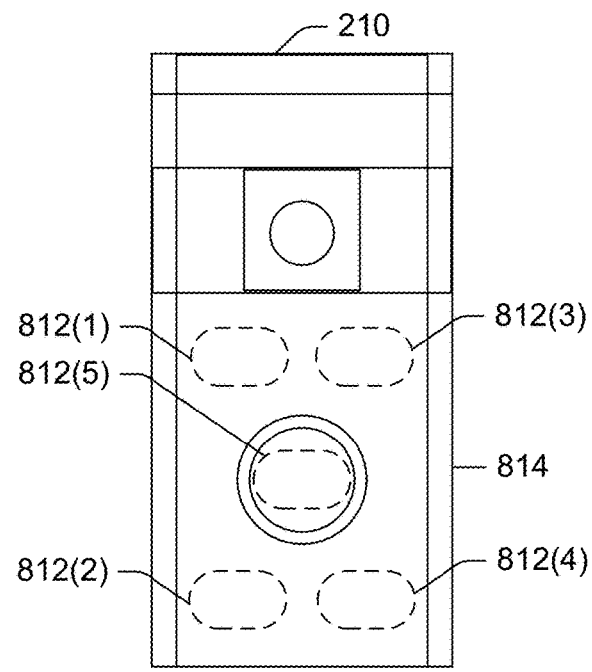
FIG. 8D is an example multi-button A/V recording and communication doorbell, according to various aspects of the present disclosure.

FIG. 8D illustrates the A/V device 210 including five touch surfaces (a first touch surface 812(1), a second touch surface 812(2), a third touch surface 812(3), a fourth touch surface 812(4), and a fifth touch surface 812(5)) disposed on a front plate 814 of the A/V device 210.

In some examples, the front plates 802, 806, 810, and/or 814 may be interchangeable such that the A/V device 210 includes different configurations of touch surfaces or a different amount of touch surfaces. In some examples, any number of touch surfaces may exist on the A/V device 210 as separate components from the front plate. For example, the A/V device 210 may include the four touch surfaces 808 that are separate components from the front plate 810 of FIG. 8C. In such an example, the front plate 810 may be positioned over, around, abutting, and/or otherwise with respect to the touch surface(s) 808 (e.g., to protect the internal components of the A/V device 210 while allowing inputs to be received by the one or more touch surfaces 808). The packaging of the A/V device 210 may come with two or more front plates, in some examples, and the two or more front plates 810 may differ based on the openings and/or touch surface(s) of the front plates 810. For example, a first front plate 802 may include openings for or otherwise be designed to allow use of the first touch surface 808(1) and the second touch surface 808(2), but may cover up or otherwise be designed not to allow use of the third touch surface 808(3) and the fourth touch surface 808(4). This may be useful where the user only wants to make use of two touch surfaces (e.g., a first touch surface 808(1) for traditional doorbell functionality, and a second touch surface 808(2) for unlocking/locking a door) and does not want the A/V device 210 to visibly include two non-useful or two inactive touch surfaces (e.g., the touch surfaces 808(3) and 808(4)). In such an example, a second front plate 810 may include openings for or otherwise be designed to allow use of each of the touch surfaces 808(1), 808(2), 808(3), and 808(4). Any combination of front plates 810 may be included with the packaging, or may be available separately (e.g., available for separate purchase) based on the needs and wants of the user of the A/V device 210. For example, a front plate designed for use of only one touch surface, a front plate designed for use of two touch surfaces, a front plate designed for use of seven touch surfaces, a front plate designed for use of ten touch surfaces, and so on may be included with the A/V device 210, may be sold or available separately from the A/V device 210, etc., based on the number of touch surfaces of the A/V device 210.

The touch surfaces 800, 804, 808, and 812 may be individually pressed and configured to receive touch input from a user and perform a command (e.g., commands 420, a command 442, etc.) associated with a respective touch surface of the touch surfaces 800, 804, 808, and 812. In some examples, the touch surfaces 800, 804, 808, and 812 may be associated with an area (e.g., the area data 456) of the front plates 802, 806, 810, and 814 and/or the touch surfaces 800 (e.g., a single touch surface may include more than one area) such that when the A/V device 210 receives touch input, the A/V device 210 is able to associate the touch input with one of the respective touch surfaces and/or a portion or area of one of the respective touch surfaces of the touch surfaces 800, 804, 808, and 812 (e.g., using the location 452 and the area data 456). Additionally, similar to the touch surface(s) 306, the touch surfaces 800, 804, 808, and 812 may include icons (e.g., icons 432) displayed in association with the respective touch surface of the touch surfaces 800, 804, 808, and 812.

With the above discussion of FIGS. 8A-8D, however, while certain examples are shown, the A/V device 210 may be configured to have any number of touch surfaces arranged in any size and shape. That is, embodiments shown in FIGS. 8A-8D are not limiting examples of a multi-button capacitive touch surface. As an additional example, the multi-button front plate and/or one or more of the touch surfaces may include a touch surface resembling a gradient slider. The user may input touch along the gradient slider to perform certain commands. For example, depending on where the touch input is received along the gradient slider, commands (e.g., commands 420, a command 442, etc.) may be performed.

Figure 9A:
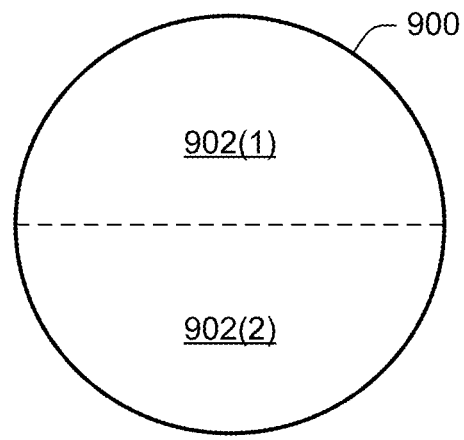
FIG. 9A is an example multi-button A/V recording and communication doorbell, according to various aspects of the present disclosure.
Figure 9B:
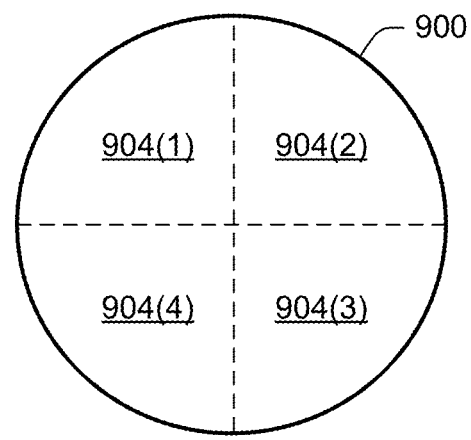
FIG. 9B is an example multi-button A/V recording and communication doorbell, according to various aspects of the present disclosure.
Figure 9C:
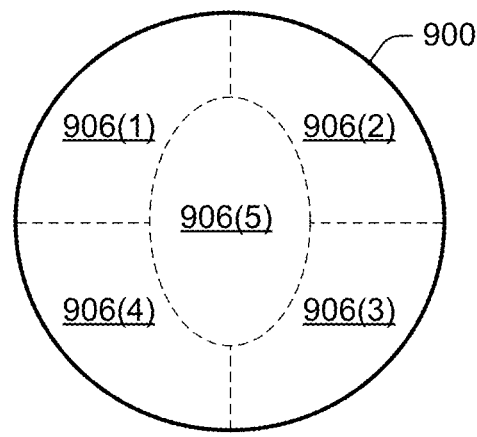
FIG. 9C is an example multi-button A/V recording and communication doorbell, according to various aspects of the present disclosure.
Figure 9D:
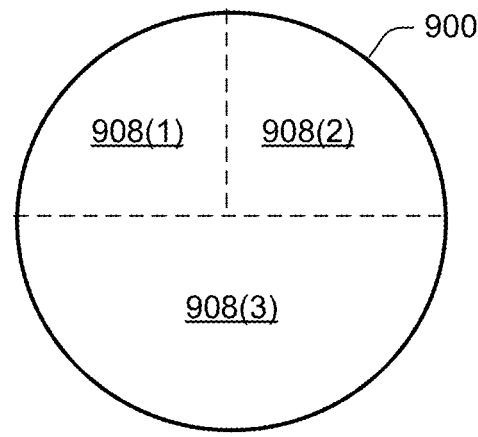
FIG. 9D is an example multi-button A/V recording and communication doorbell, according to various aspects of the present disclosure.

FIGS. 9A-9D illustrate different examples of a multi-button capacitive touch surface 900 of an A/V device 210. Particularly, in some examples, FIGS. 9A-9D illustrate different embodiments of configuring the multi-button capacitive touch surface 900 to include touch surfaces. For example, FIG. 9A illustrates the multi-button capacitive touch surface 900 including a first touch surface 902(1) and a second touch surface 902(2) (hereinafter, collectively "touch surfaces 902"). In some examples, the first touch surface 902(1) and the second touch surface 902(2) may represent half of the multi-button capacitive touch surface 900 along a horizontal axis of the multi-button capacitive touch surface 900. In some examples, as described herein, the first touch surface 902(1) and the second touch surface 902(2) may be separate touch surfaces (e.g., distinct components), while in other examples, the first touch surface 902(1) and the second touch surface 902(2) may be a single touch surface having multiple input regions or areas. FIG. 9B illustrates the multi-button capacitive touch surface 900 including a first touch surface 904(1), a second touch surface 904(2), a third touch surface 904(3), and a third touch surface 904(4) (hereinafter, collectively "touch surfaces 904"). FIG. 9C illustrates the multi-button capacitive touch surface 900 including a first touch surface 906(1), a second touch surface 906(2), a third touch surface 906(3), a fourth touch surface 906(4), and a fifth touch surface 906(5) (hereinafter, collectively "touch surfaces 906"). In some examples, the fifth touch surface 906(5) (and/or another touch surface) may include a finger print scanner configured to scan a fingerprint of a user issuing touch input on the multi-button capacitive touch surface 900. FIG. 9D illustrates the multi-button capacitive touch surface 900 including a first touch surface 908(1), a second touch surface 908(2), and a third touch surface 908(3) (hereinafter, collectively "touch surfaces 908"). Here, the third touch surface 908(3) is shown as being larger in size than the first touch surface 908(1) or the second touch surface 908(2), representing that the touch surfaces 908 may be equal or dissimilar in size and shape.

As discussed above, the multi-button capacitive touch surface 900 may be configured by a user to have a certain number of touch surfaces, where each touch surface represents a command (e.g., commands 420, a command 442, etc.) performed by the A/V device 210 or network device(s). The touch surfaces on the multi-button capacitive touch surface 900, in some examples, may be defined, in both shape and number, as illustrated by the different embodiments of the touch surfaces 902, 904, 906, and 908. As such, the user may configure the multi-button capacitive touch surface 900 to be associated with certain commands. The touch surfaces 902, 904, 906, and 908 may be individually touched and configured to receive touch input from a user and perform a command (e.g., commands 420, a command 442, etc.) associated with a respective touch surface of the touch surfaces 902, 904, 906, and 908. In some examples, the touch surfaces 902, 904, 906, and 908 may be associated with an area (e.g., the area data 456) of the multi-button capacitive touch surface 900 such that when the A/V device 210 receives touch input, the A/V device 210 is able to associate the touch input with one of the respective touch surfaces of the touch surfaces 902, 904, 906, and 908 (e.g., using the location 452 and the area data 456). Additionally, similar to the touch surface(s) 306, the touch surfaces 902, 904, 906, and 908 may include icons (e.g., icons 432) displayed in association with the respective touch surface of the touch surfaces 902, 904, 906, and 908.

With the above discussion of FIGS. 9A-9D, however, while certain examples are shown, the multi-button capacitive touch surface 900 may be configured to have any number of areas and the areas may include different shapes than those shown.

Figure 10:
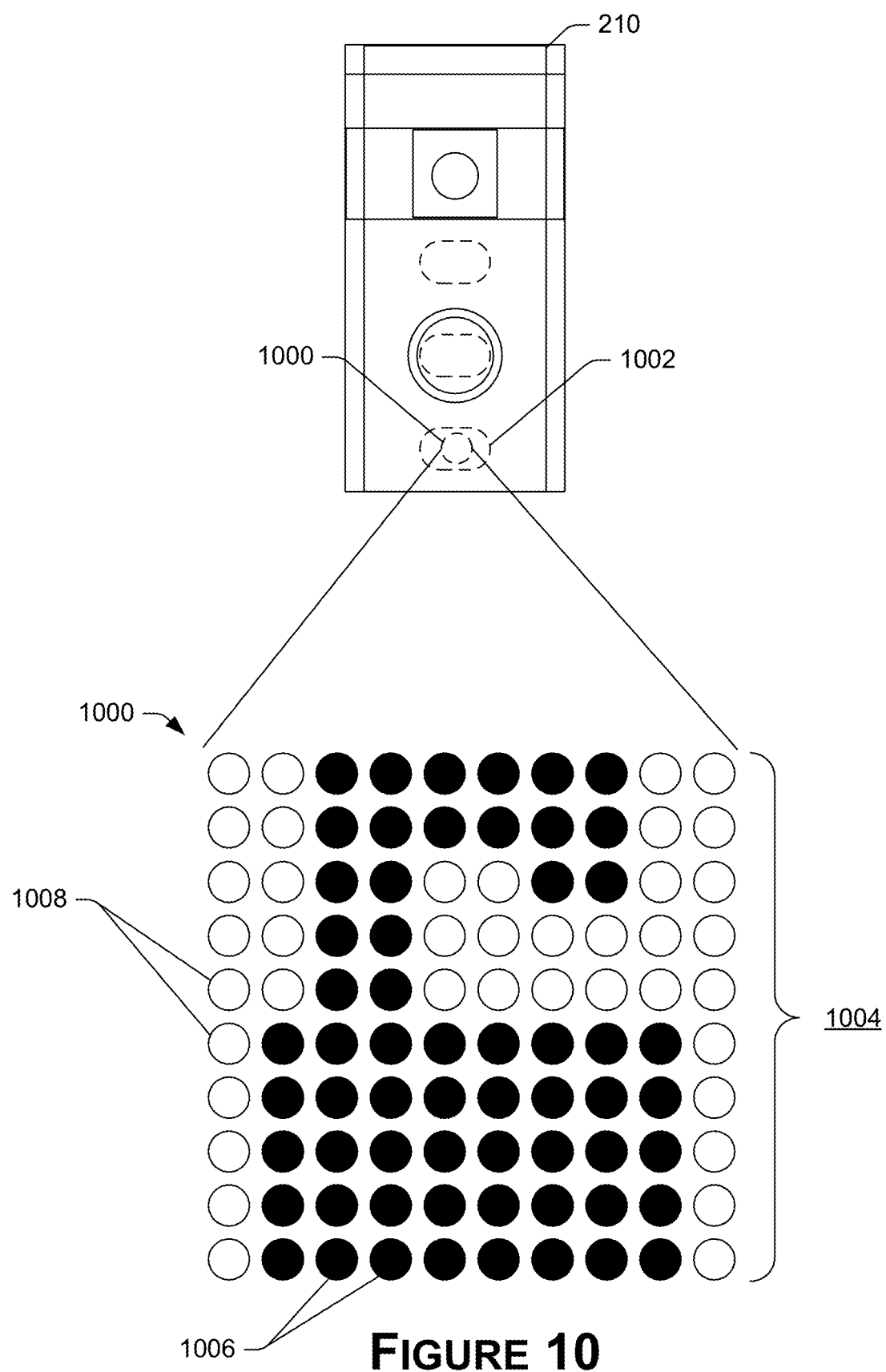
FIG. 10 is an example icon displayed in conjunction with a multi-button A/V recording and communication doorbell, according to various aspects of the present disclosure.

FIG. 10 illustrates an example embodiment of displaying an icon on the A/V device 210. Shown in FIG. 10, an icon 1000 may be display on a touch surface 1002 of the A/V device 210. To display the icon 1000, the touch surface 1002 may include a plurality of light emitting elements 1004, such as LEDs. The light emitting elements 1004 may reside beneath an exterior surface of the A/V device 210 so as to backlight the touch surface 1002. In some examples, however, the icon 1000 may be displayed via a diffuser diffusing light from the light emitting elements 1004. Additionally, while FIG. 10 illustrates a particular number of light emitting elements 1004, more or less light emitting elements may be included to display the icon 1000.

To display the icon 1000, certain light emitting elements 1004 may illuminate. For example, FIG. 10 illustrates light emitting elements 1006 being illuminated while light emitting elements 1008 are not illuminated. The light emitting elements 1004 may be configured to illuminate or not illuminate based on which icon is displayed. For example, FIG. 10 illustrates that light emitting elements 1006 are illuminated to illustrate an unlocked lock, representing that the touch surface 1002 is associated with an unlocking command. As discussed above, in some examples, the icon 1000 may be displayed based on receiving touch input at the touch surface 1002 or sensing motion at the A/V device 210.

Figure 11:
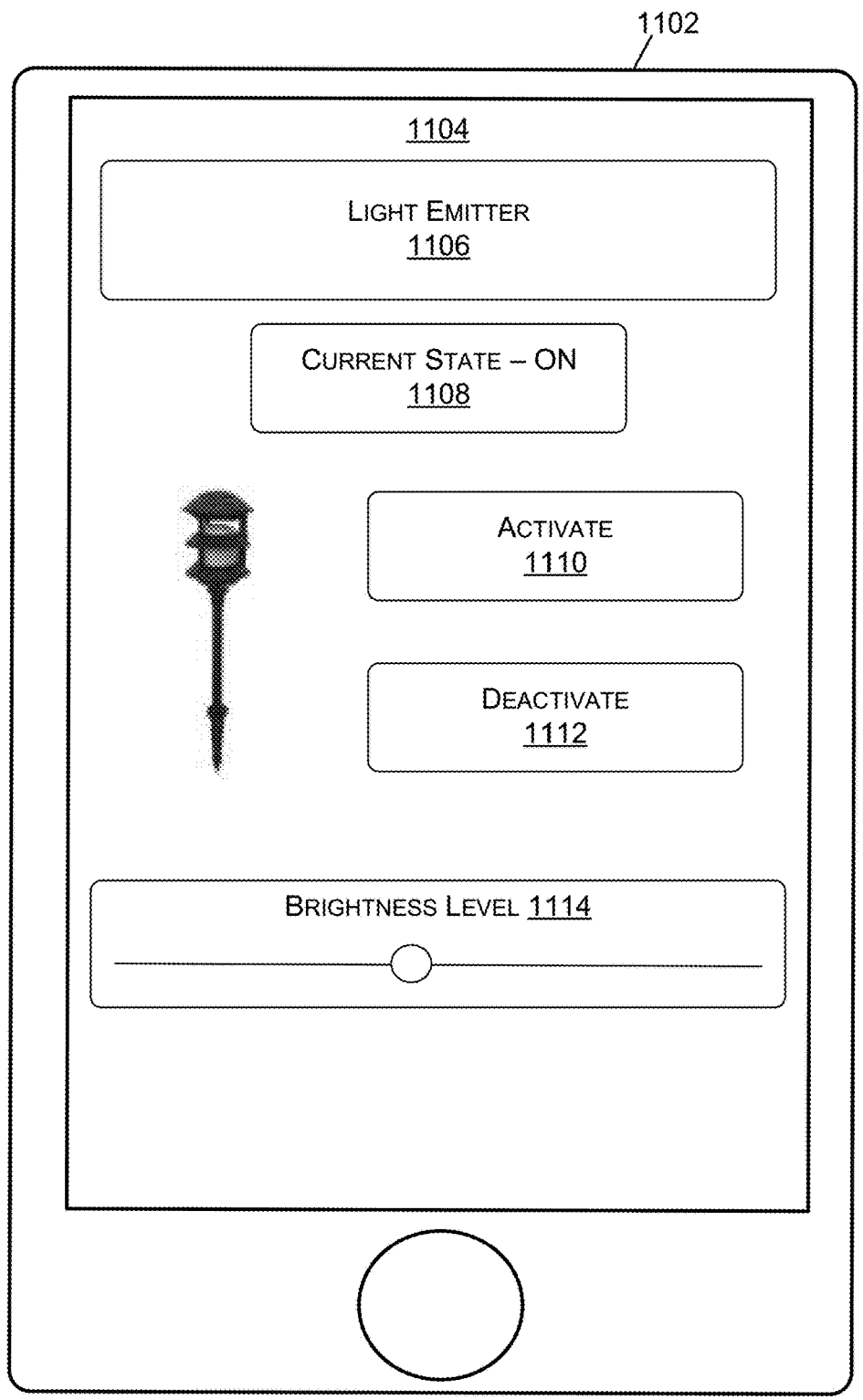
FIG. 11 illustrates an example client device providing a command to a network device, according to various aspects of the present disclosure.

FIG. 11 illustrates an example client device 1102 (which may be similar to, and/or represent, the client device 214, 216) providing a command 442 to a network device, according to various aspects of the present disclosure. For example, the client device 1102 may display a graphical user interface (GUI) 1104 for inputting the command 442. As shown, the GUI 1104 includes an indication 1106 of network device which, in the example of FIG. 11, includes a light emitter 232. The GUI 1104 further includes an indication 1108 of the current state of the light emitter 232 which, in the example of FIG. 11, includes an "ON" state (e.g., active, emitting light, etc.). Additionally, the GUI 1102 includes a first graphical input 1110 for activating the light emitter 232 (e.g., if the light emitter 232 is not already "ON"), a second graphical input 1112 for deactivating the light emitter 232, and a third graphical input 1114 for changing a brightness level for the light emitter 232.

In the example of FIG. 11, the client device 1102 may receive an input selecting one of the graphical inputs 1110, 1112, 1114. In response, the client device 1102 may transmit data representing an identifier 440 of the light emitter 232 and data representing a command 442 to be performed by the light emitter 232. For example, the client device 1102 may receive an input selecting the second graphical input 1112 for deactivating the light emitter 232. Based on the input, the client device 1102 may transmit, to the backend server 224 and/or the A/V device 210, data representing the identifier 440 of the light emitter 232 and data representing the command 442 (e.g., deactivate) to be performed by the light emitter 232.

Each of the processes described herein, including the processes 1200, 1300, 1400, 1500, 1600, 1700, 1800 and 1900, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 12:
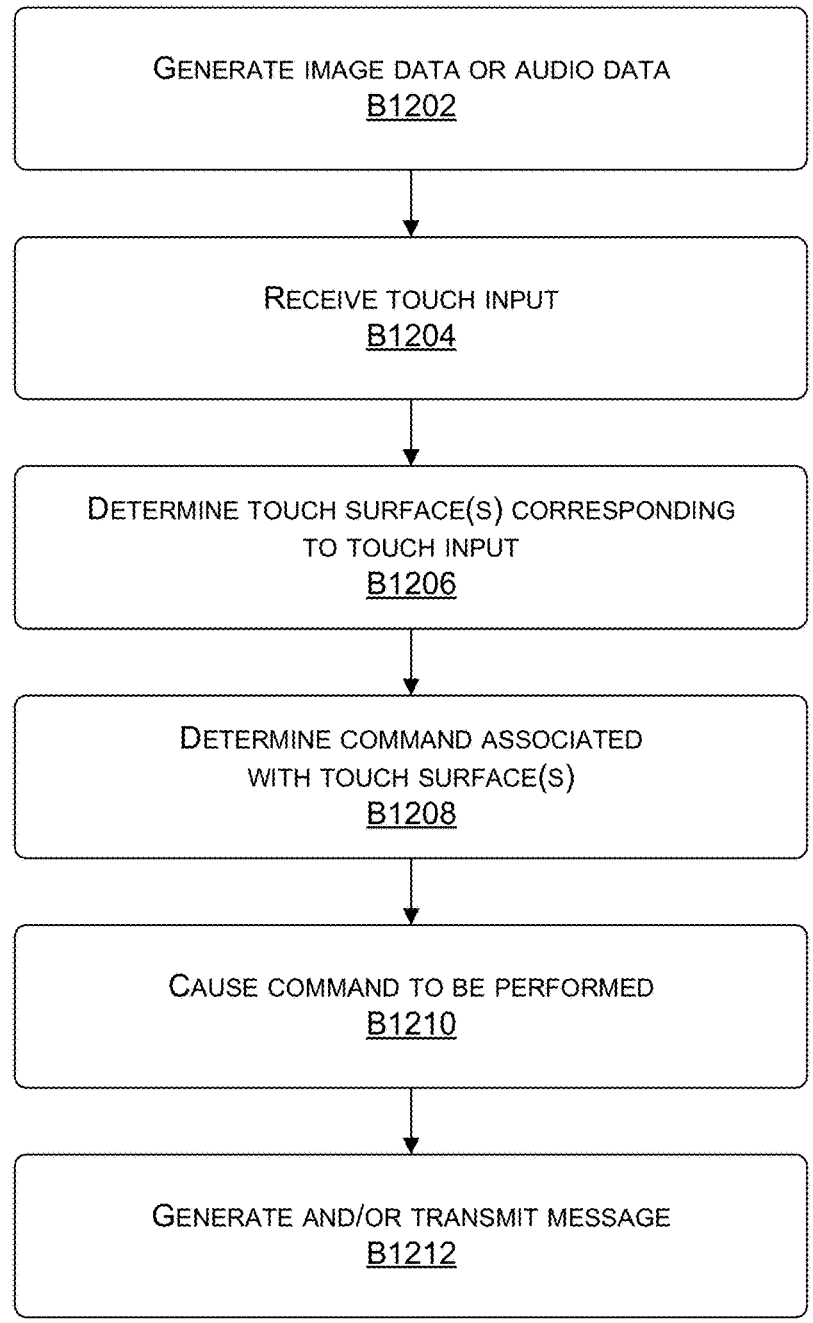
FIG. 12 is a flowchart illustrating an example process for performing a command associated with a multi-button A/V recording and communication doorbell, according to various aspects of the present disclosure.

FIG. 12 is a flowchart illustrating an example process 1200 for using touch surfaces of an A/V device according to various aspects of the present disclosure. The process 1200, at block B1202, generates image data depicting a person or audio data representing a speech of a user. For example, in response to detecting motion (e.g., by the motion sensors 326 and/or the camera 314) the processor(s) 310 may generate image data 406 or audio data 408. The image data 406 may depict (e.g., be representative of) a person and/or a physical environment within a field of view of the A/V device 210 (e.g., a field of view of the camera 314 and/or a field of view of the motion sensor(s) 326).

The process 1200, at block B1204, receives touch input at the A/V device. For example, the processor(s) 310 may receive input data 410 generated in response to receiving touch input at touch surface(s) 306 of the A/V device 210. In some examples, however, the processor(s) 310 may receive, via the touch surface(s) 306, an input representing touch input at the touch surface(s) 306 and generate the input data 410. The input data 410 may represent a single touch input or multiple touch inputs of the touch surface(s) 306, an amount of time corresponding to the touch input, an amount of force corresponding to the touch input, and/or a pattern of a touch inputs (e.g., a pattern may be press and release, press and hold for three seconds, then release, and press and release). In some examples, the touch input may include biometrics associated with a user providing the touch input at the touch surface(s) 306.

The process 1200, at block B1206, determines touch surface(s) corresponding to the touch input. For example, the processor(s) 310 may determine, using the input data 410 received at block B1204, at which touch surface(s) of the A/V device 210 the touch input was received. That is, as discussed herein, the A/V device 210 may include a plurality of touch surface(s) 306. Accordingly, each of the touch surface(s) 306 may be capable of receiving touch input and the processor(s) 310, at block B1206, may determine which touch surface(s) 306 received the touch input. For example, the processor(s) 310 may determine that the touch input was received at a first touch surface of the touch surface(s) 306. In some examples, as noted above, the processor(s) 310 may determine a pattern of touch inputs and associate the pattern of touch inputs with the touch surface(s) 306.

The process 1200, at block B1208, determines a command associated with the touch surface. For example, the processor(s) 310, upon determining the touch surface(s) 306 receiving the touch input, may determine a command associated with the touch surface(s) 306. In this sense, each touch surface of the touch surface(s) 306 may be associated with a respective command (e.g., command 420) to be performed by the A/V device 210 or a network device(s). For example, continuing with the above example, the first touch surface of the touch surface(s) 306 may be associated with a first command (e.g., unlocking a door), the second touch surface of the touch surface(s) 306 may be associated with a second command (e.g., outputting sound at a first device, such as a signaling device), and the third touch surface of the touch surface(s) 306 may be associated with a third command (e.g., outputting sound at a second device, such as by the speaker(s) 330 of the A/V device 210). As such, based on which touch surface(s) 306 the touch input is received, commands may be performed. Therefore, given that the touch surface(s) 306 are associated with commands, the processor(s) 310 may determine the commands (e.g., commands 420, a command 442, etc.) associated with the touch input. For example, the processor(s) 310 may determine that the command associated with the first touch surface is unlocking a front door at a property where the A/V device 210 is located. In some examples, as the touch input may be received across touch surface(s) 306, the processor(s) 310 may determine the command based on analyzing the pattern of touch inputs represented by the input data 410. For example, the processor(s) 310, upon analyzing the input data 410, may determine that touch input was received first at the first touch surface of the touch surface(s) 306, second at the third touch surface of the touch surface(s) 306, and third at the first touch surface of the touch surface(s) 306. With this pattern of touch input, the processor(s) 310 may determine a command associated with the pattern of touch input. For example, the pattern of touch input as identified above may be associated with a command to disarm a security system at the property where the A/V device 210 is located. This pattern of inputs may also enhance security features associated with the A/V device 210 (e.g., pin). In some examples, the first touch input may include a selection of one or more of the touch surfaces 306, and the next input may include a pattern of touch inputs, a biometric data capture (e.g., using a fingerprint scanner, a retina scanner, or the like), and/or a voice command or authentication that may be analyzed by the processor(s) 310 to determine if the first touch input was authorized (e.g., the pattern, the biometric data capture, and/or the voice command or authentication may be used to authorize the command associated with the first touch input).

The process 1200, at block B1210, causes the command to be performed. For example, in response to the processor(s) 310 determining the command (e.g., the command 420) associated with the touch surface(s) 306, the processor(s) 310 may cause the command to be performed. Causing the command to be performed may involve the A/V device 210 performing the command or a network device(s) (e.g., backend server 224, sensors 204, automation devices 206, the hub device 202, an electronic device 230, light emitter(s) 232, etc.) to perform the command. For example, to unlock the front door at the property where the A/V device 210 is located, the processor(s) 310 may transmit a request (e.g., output signal 418, a second data packet 446, etc.) using the network interface(s) 312 that causes an automation device (e.g., lock) to unlock the front door. The command 420 (and/or the command 442) may also be associated with action(s) 422 and/or modes 424 such that in some examples, causing the command 420 (and/or the command 442) to be performed may involve the processor(s) 310 performing actions 422 associated with the command 420 (and/or the command 442) or entering one or more modes 424 associated with the command 420 (and/or the command 442). For example, in the above unlocking command, the action may include unlocking the lock of the automation device 206. As an example of the modes 424, the command 420 (and/or the command 442) may be associated with a carrier service delivering a package. The mode associated with the command may involve the A/V device 210 entering a package protection mode where the A/V device 210 (or another device) monitors the package within a field of view of the camera 314 (e.g., through use of the object data 426, the object database 428, and the object type 430).

The process 1200, at block B1212, generates and/or transmits a message. For example, the processor(s) 310 may generate and/or transmit the message 416, using the network interface(s) 312, to the client device 214, 216, the sensor(s) 204, the automation device(s) 206, and/or the network devices associated with the command 420 (and/or the command 442). The message 416 may identify the command 420 (and/or the command 442) as well as the actions 422 and/or the modes 424. The message 416 may include other information as well, such as image data 406 of the user issuing the touch input. Upon receipt of the message 416, the client device 214, 216 may be configured to display information associated with the message 416, the automation device(s) 206 may be configured to perform one or more functions (e.g., turn on lights, unlock doors, etc.), the network device(s) may process, analyze, generate a new or updated version of the message 416 and transmit the new or updated version to one or more devices (e.g., the client devices 214, 216, the automation devices 206, the sensors 204, other network devices, etc.), forward the message 416, update or change settings at the network device(s), etc., and/or other devices may perform one or more functions.

As a result of the process 1200 of FIG. 12, a user of the A/V device 210 may be able to access the property where the A/V device 210 is installed without the use of a physical key, for example, though issuing the unlock command. This may prove useful if the user is the homeowner and forgot their key, or if the user is a guest that does not have a physical key but was given the access information by the homeowner for accessing the property, or if the person is a service provider who was given temporary access by the homeowner (in such example, command 420 (and/or the command 442) may be a temporary command 420 (and/or the command 442) for unlocking the door configured by the homeowner to allow the service provider temporary access). Additionally, in some examples, prior to causing the command to be performed, the processor(s) 310 may determine whether the user issuing the touch input is authorized to perform the command 420 (and/or the command 442). For example, the processor(s) 310 may analyze biometrics of the user issuing the touch input (e.g., fingerprint) or may receive a pin represented by the pattern of touch inputs at the A/V device 210. Accordingly, in some examples the command 420 (and/or the command 442) may only be executed by authorized persons, thereby contributing to the safety and security of the property where the A/V device 210 is installed.

Figure 13:
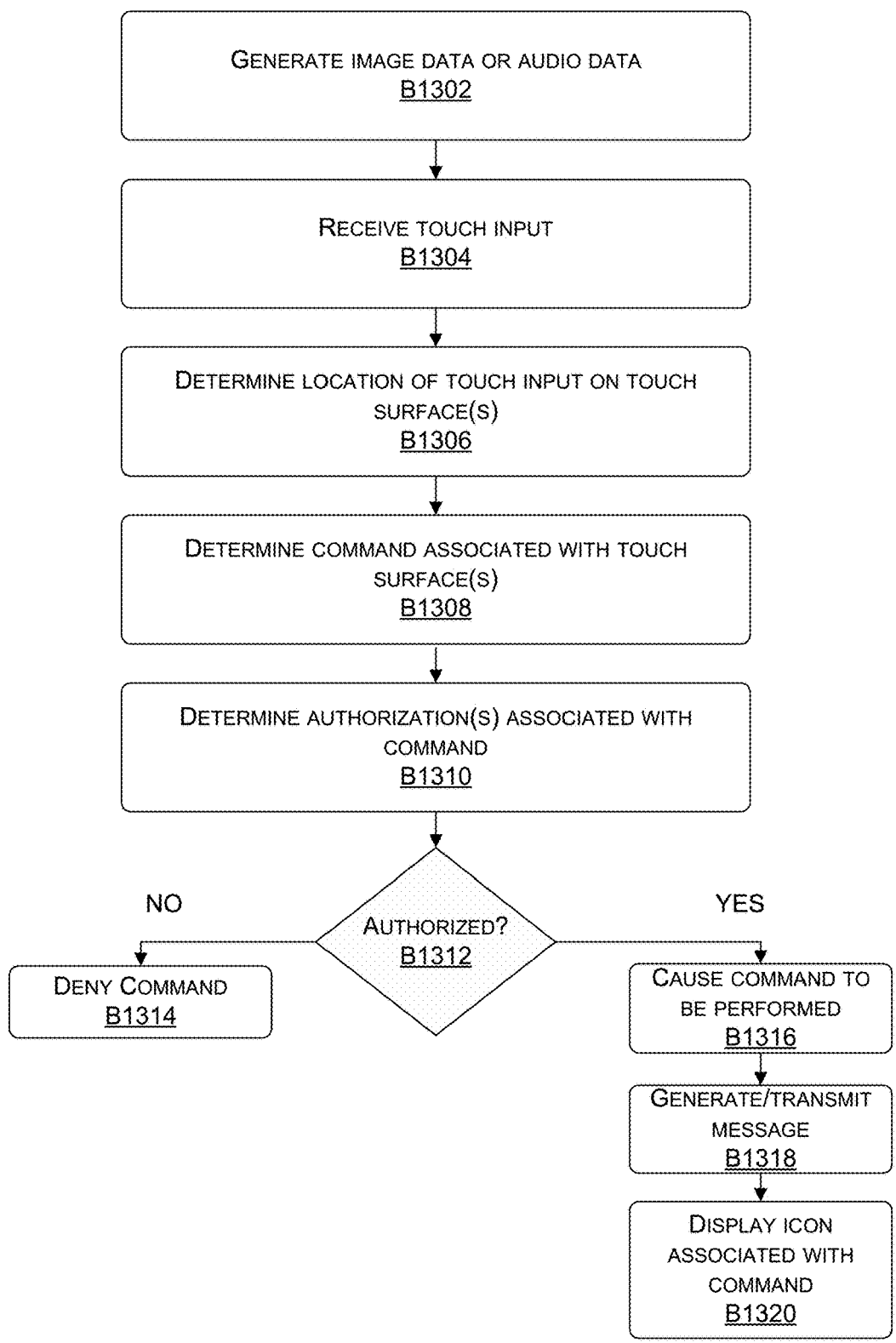
FIG. 13 is a flowchart illustrating an example process for performing a command associated with a multi-button A/V recording and communication doorbell, according to various aspects of the present disclosure.

FIG. 13 is a flowchart illustrating an example process 1300 for using touch surfaces of an A/V device according to various aspects of the present disclosure. The process 1300, at block B1302, generates image data depicting a person or audio data representing a speech of a user. For example, in response to detecting motion (e.g., by the motion sensors 326) the processor(s) 310 may generate image data 406 or audio data 408. The image data 406 may depict a person within a field of view of the A/V device 210 (e.g., a field of view of the camera 314 and/or a field of view of the motion sensor(s) 326).

The process 1300, at block B1304, receives touch input at the A/V device. For example, the processor(s) 310 may receive input data 410 generated in response to receiving touch input at touch surface(s) 306 of the A/V device 210. In some examples, however, the processor(s) 310 may receive, via the touch surface(s) 306, an input representing touch input at the touch surface(s) 306 and generate the input data 410. The input data 410 may represent a single touch input or multiple touch inputs of the touch surface(s) 306, an amount of time corresponding to the touch input, an amount of force corresponding to the touch input, and/or a pattern of a touch inputs. Discussed in detail herein, in some examples, the input data 410 may include a location (e.g., location 452) corresponding to the touch input (e.g., X and Y coordinates) and/or biometrics (e.g., biometrics 454) corresponding to the touch input.

The process 1300, at block B1306, determines a location of the touch input. For example, the processor(s) 310 may determine, using the input data 410 received at block B1304, a location on the touch surface(s) 306 at which the touch input was received (e.g., the location 452). That is, as discussed herein, the A/V device 210 may include a plurality of touch surface(s) 306. Accordingly, each of the touch surface(s) 306 may be capable of receiving touch input and the processor(s) 310, at block B1306, may determine which touch surface(s) 306 received touch input. For example, the processor(s) 310 may determine that the touch input was received at a first touch surface of the touch surface(s) 306. In some examples, the processor(s) 310 may analyze the input data 410 to determine a location (e.g., the location 452) on the touch surface(s) 306 corresponding to the touch input. In some examples, the processor(s) 310 may determine the location 452 of the touch input though using X and Y coordinates associated with the touch input and comparing the location 452 with area data 456 representing the touch surface(s) 306. In some examples, the processor(s) 310 may be configured to determine which touch surface(s) 306 the touch input was received though using X and Y coordinates of the location 452 and comparing these X and Y coordinates with X and Y coordinates associated with the area data 456. Using the location 452, for example, the processor(s) 310 may determine that the touch input was received at the first touch surface of the touch surface(s) 306. In analyzing the location 452 and the touch surface(s) 306, through the area data 456, the processor(s) 310 may determine that the touch input was received at the first touch surface of the touch surface(s) 306. In some examples, as noted above, the processor(s) 310 may determine a pattern of touch inputs and associate the pattern of touch inputs with the touch surface(s) 306.

Next, the process 1300, at block B1308, determines a command associated with the touch surface(s). For example, the processor(s) 310, upon determining the location 452 and the touch surface(s) 306 receiving the touch input, may determine a command 420 (and/or a command 442) associated with the touch surface(s) 306. Each touch surface of the touch surface(s) 306 may be associated with a respective command 420 (and/or a respective command 442) by the A/V device 210 or network device(s). For example, a first touch surface of the touch surface(s) 306 may be associated with a first command 420 (and/or a command 442), a second touch surface of the touch surface(s) 306 may be associated with a second command 420 (and/or a command 442), and a third touch surface of the touch surface(s) 306 may be associated with a third command 420 (and/or a command 442). As such, based on which touch surface(s) 306 the touch input is received, through analyzing the location 452, commands associated with the touch surface(s) 306 may be determined. Therefore, given that the touch surface(s) 306 are associated with commands 420 (and/or commands 442), the processor(s) 310 may determine the commands 420 (and/or the commands 442) associated with the touch input. For example, in determining that the location 452 of the touch input was at the first touch surface, the processor(s) 310 may determine that the command 420 (and/or the command 442) associated with the first touch surface is unlocking a front door at a property where the A/V device 210 is located. In some examples, as the touch input may be received across touch surface(s) 306, the processor(s) 310 may determine the command 420 (and/or the command 442) based on analyzing the pattern of touch input represented by the input data 410. With this pattern of touch input, the processor(s) 310 may determine a command 420 (and/or the command 442) associated with the pattern of touch input.

The process 1300, at block B1310, may determine authorization(s) associated with the command. For example, the processor(s) 310 may determine whether the command 420 (and/or the command 442) is associated with authorization data 434. That is, to perform certain commands 420 (and/or commands 442), the command 420 (and/or the command 442) may be associated with authorization data 434. Different commands 420 (and/or commands 442) represented by the commands 420 (and/or the commands 442) may be associated with authorization data 434. For example, upon determining the unlocking command 420 (and/or the command 442), the command 420 (and/or the command 442) may be associated with authorization data 434 to prevent unauthorized access to the property. As an additional example, performing a doorbell command 420 (and/or the command 442) may not be associated with authorization data 434. To determine the authorization data 434 associated with the command 420 (and/or the command 442), the processor(s) 310 may use the command 420 (and/or the command 442) to identify whether the command 420 (and/or the command 442) is associated with authorization data 434. For example, upon determining that the command 420 (and/or the command 442) is unlocking the door, the processor(s) 310 may determine that the command 420 (and/or the command 442) needs to be received from an authorized user.

The process 1300, at block B1312, determines whether the command is authorized. For example, the processor(s) 310 upon determining the authorization data 434 associated with the command 420 (and/or the command 442) (e.g., block B1310), may determine whether the touch input was received from an authorized user or whether the command 420 (and/or the command 442) is otherwise authorized. Whether the command 420 (and/or the command 442) is authorized may involve the processor(s) 310 analyzing the input data 410 to determine whether the touch input was received from an authorized user. For example, the processor(s) 310 may analyze the biometrics 454 to determine whether the input data 410 was received from an authorized user. As discussed above, analyzing the biometrics 454 (e.g., image data 406) may be done using computer vision or the like (e.g., facial recognition, facial detection, etc.). In some examples, the processor(s) 310 may analyze the image data 406 generated by the camera 314 to determine, using facial recognition and/or other computer vision technologies, whether the user is authorized by comparing the biometrics 454 of the user generated using facial recognition to a database of authorized persons (e.g., profiles 458). In this sense, the processor(s) 310 may compare the biometrics 454 with the profiles 458 to determine whether the touch input was received from a user authorized to perform the command 420 (and/or the command 442). For example, in response to determining the unlocking command 420 (and/or the command 442), the processor(s) 310 may analyze fingerprints represented by the biometrics 454 to determine whether the biometrics 454 are associated with a user who is authorized to perform the command 420 (and/or the command 442). In some examples, in order to authorize a command, the user may provide one or more touch inputs, such as in a pattern, to symbolize a code. For example, if the A/V device 210 includes a key pad (e.g., a ten-digit key pad), the user may input a code to authorize an input to one or more of the touch surfaces. In other examples, the user may use one or more of the touch surfaces to input the code. In some examples, authorizing the user may be done using voice recognition and/or speech recognition, such as by analyzing a spoken code that may include a key word or series of key words (e.g., key word(s) associated with the specific command, or key word(s) associated with authorizing any command of the A/V device 210).

In some examples, the code may correspond to a command 420 (and/or the command 442) performed. For example, in receiving the input data 410, the processor(s) 310 may analyze the input data 410 to determine the code, which may correspond to unlocking a door at the property. After determining the command 420 (and/or the command 442) (e.g., unlocking the door), the command 420 (and/or the command 442) may be performed. In one example, the A/V device 210 may be wirelessly connected (e.g., BLE, ZigBee, etc.) to a door lock that unlocks the door when the A/V device 210 transmits a command (and/or a second data packet 446) that causes the door lock to unlock. In this sense, the touch surface(s) 306 may function as a key pad to receive touch input and cause commands 420 to be performed.

In some examples, the determination of whether the person is authorized may be performed by the backend server 224. For example, the A/V device 210 may transmit the image data 406, the input data 410, and/or the command 420 to the backend server 224 over the user's network 218 and/or the network (Internet/PSTN) 213. The backend server 224 may then analyze the image data 406 to determine the biometrics 454 and/or compare the biometrics 454 generated by the A/V device 210 (e.g., facial recognition data, fingerprint recognition data, iris recognition data, retina recognition data, etc.) to the profile(s) 458 of authorized persons. Once a determination is made that the user is or is not authorized, the backend server 224 may transmit the result of the determination to the A/V device 210. In some examples, authorization may include inputs to the client device(s) 214, 216. For example, in response to an input to one of the touch surfaces that is associated with a command that requires authorization, the backend server 224 may transmit a message 416 to the client device 214, 216 asking for authorization of the command 420 (and/or the command 442). The authorization may be provided within an application on the client device 214, 216 (e.g., the device application 404, a mobile application, a web application, and/or the like). The authorization may include interacting with the message 416, such as by selecting "yes" or "no" when prompted as to whether the command is authorized, inputting a code to the client device 214, 216, providing biometric data to the client device 214, 216 (e.g., using facial recognition, iris scanning, a fingerprint reader, voice authentication, etc.), and/or the like. In some examples, there may be dual-factor authorization. For example, to disarm a security system (e.g., when the security system alarm has been triggered), the user may select a touch surface associated with disarming the security system, then facial recognition may be performed at the A/V device 210 (or by the backend server 224) and the message 416 may be transmitted to the client device 204, 206 requiring an authorization at the client device 214, 216. As such, dual-factor authorization may be used prior to performing one or more commands, such as the commands that relate to security of the property and persons at the property.

The process 1300, at block B1314, denies the command. For example, in response to the processor(s) 310 determining that the user is not authorized to perform the command 420 (and/or the command 442), the processor(s) 310 may deny the command 420 (and/or the command 442), resulting in the command 420 (and/or the command 442) not being performed. For example, if the command 420 (and/or the command 442) is unlocking the door, after determining that the user issuing the touch input is not a homeowner of the property, for example, the processor(s) 310 may deny the command 420 (and/or the command 442), thereby preventing unauthorized entry to the home.

The process 1300, at block B1316, causes the command to be performed. For example, in response to the processor(s) 310 determining that that the user is authorized to perform the command 420 (and/or the command 442), the processor(s) 310 may cause the command 420 (and/or the command 442) to be performed. For example, using the biometrics 454, the processor(s) 310 may determine that the command 420 (and/or the command 442) of unlocking the door was received from the homeowner. Therefore, because the homeowner is authorized to access the property, the processor(s) 310 may cause the command 420 (and/or the command 442) to be performed. Causing the command 420 (and/or the command 442) to be performed may involve the A/V device 210 performing the command 420 (and/or the command 442) or a network device(s) performing the command 420 (and/or the command 442). For example, to unlock the front door, the processor(s) 310 may transmit a request (e.g., output signal 418, second data packet 446, etc.), using the network interface(s) 312, that causes an automation device 206 (e.g., lock) to unlock the front door. In some embodiments, the command 420 (and/or the command 442) may be transmitted directly to the automation device 206, may be transmitted to the hub device 202 and forwarded onto the automation device 206, and/or may be transmitted to the backend server 224 and forwarded onto the hub device 202 and/or the automation device 206. The command 420 (and/or the command 442) may also be associated with action(s) 422 and/or modes 424. In some examples, causing the command 420 (and/or the command 442) to be performed may involve the processor(s) 310 performing actions 422 associated with the command 420 (and/or the command 442) or entering one or more modes 424 associated with the command 420 (and/or the command 442). For example, in the above unlocking command 420 (and/or the command 442), the action 422 may include unlocking the lock of the automation device 206. As an example of the modes 424, the command 420 (and/or the command 442) may be associated with a carrier service delivering a package. The mode 424 associated with causing the command 420 (and/or the command 442) to be performed may involve the A/V device 210 entering a package protection mode where the A/V device 210 monitors the package within a field of view of the camera 314 (e.g., though using the object data 426, the object database 428, and the object type 430).

In some examples, the commands 420 (and/or the commands 442) may not be associated with authorization data 434. Therefore, if the command 420 (and/or the commands 442) are not associated with authorization data 434 (e.g., ringing a doorbell command), the process 1300 may proceed from block B1310 to block B1316.

The process 1300, at block B1318, generates and/or transmits a message. For example, the processor(s) 310 may generate and/or transmit the message 416, using the network interface(s) 312, to the client device 214, 216. The message 416 may identify the command 420 (and/or the command 442) as well as the actions 422 and/or the modes 424. The message 416 may include other information as well, such as image data 406 of the user issuing the touch input. Upon receipt of the message 416, the client device 214, 216 may be configured to display information associated with the message 416.

The process 1300, at block B1320, displays an icon associated with the command. For example, the processor(s) 310 may cause the touch surface(s) 306 to display an indication of the icon 432 associated with the command 420 (and/or the command 442). For example, in response to causing the command 420 (and/or the command 442) associated with unlocking the door, the processor(s) 310 may cause the touch surface(s) 306 to display, illuminate, or otherwise make visible an icon representing an unlocked lock (e.g., backlighting). In this sense, the icon 432 may visually indicate the command 420 (and/or the command 442). In other examples, as described herein, the icon(s) 432 may be displayed, illuminated, or otherwise visible at all times, or the icon(s) 432 may be displayed, illuminated, or otherwise visible after motion is detected (e.g., while an entity or object is in a field of view of the A/V device 210) and/or after an input to one or more of the touch surfaces is received.

Figure 14:
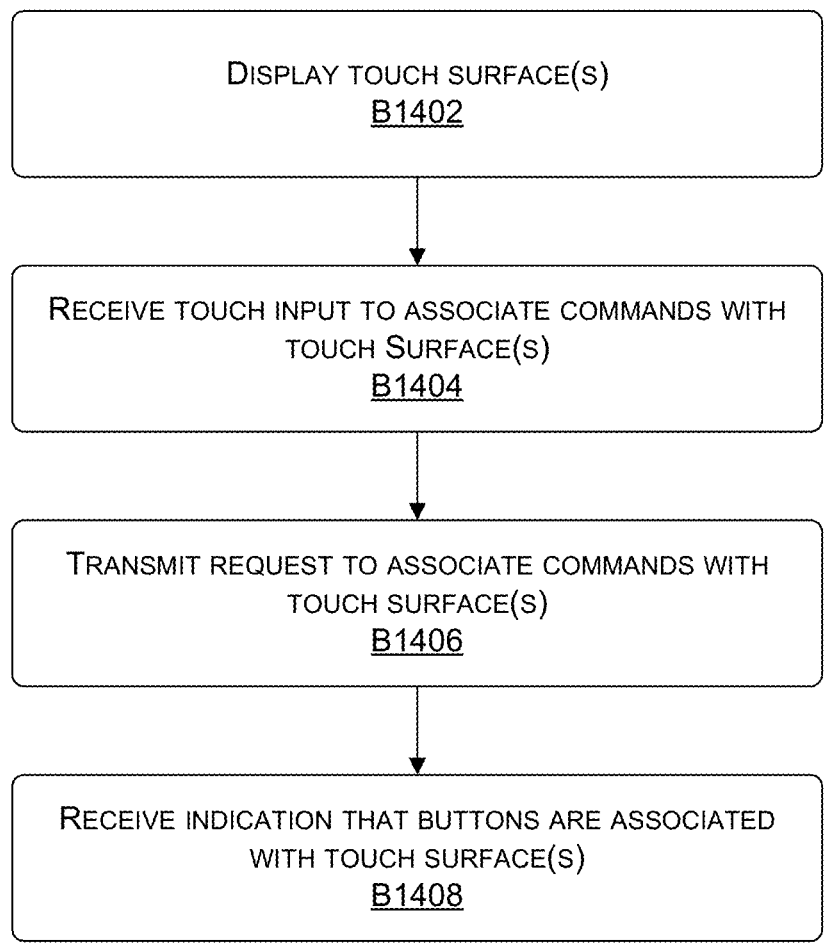
FIG. 14 is a flowchart illustrating an example process for using a client device for configuring a multi-button A/V recording and communication doorbell, according to various aspects of the present disclosure.

FIG. 14 is a flowchart illustrating an example process 1400 for configuring touch surface(s) of an A/V device according to various aspects of the present disclosure. In some examples, the process 1400 may be implemented by the client device 214, 216 to configure the touch surface(s) 306 of the A/V device 210. Additionally, the process 1400 may represent configuring touch surfaces of an A/V device, as visually illustrated in FIG. 7A and FIG. 7B.

The process 1400, at block B1402, displays touch surface(s) 306 (see e.g., FIGS. 7A and 7B). For example, the processor(s) 602 may display, on the display 618, touch surface(s) 306 that are configurable by a user. For example, referring to FIG. 7A, the processor(s) 602 may cause the display 618 to display the A/V device 710 and a first touch surface 708(1), a second touch surface 708(2), and a third touch surface 708(3). Referring to FIG. 7B, the processor(s) 602 may cause the display 618 to display the multi-button capacitive touch surface 724 having a first touch surface 728(1), a second touch surface 728(2), and a third touch surface 728(3).

The process 1400, at block B1404, receives touch input to associate commands with the touch surface(s). For example, the processor(s) 602 may receive, via user interactions with the input interface 604, touch input representing with commands 420 (and/or a command 442) to be associated with the touch surface(s) 306. In this sense, the user of the client device 214, 216 may select the commands 420 (and/or the command 442) by the touch surface(s) 306 when the touch surface(s) 306 receive touch input. For example, in reference to FIGS. 7A and 7B, the user may interact with a command input field (e.g., command input field 712 or command input field 732) to select the command 420 (and/or the command 442) to be associated with a first touch surface (e.g., first touch surface 708(1) or first touch surface 728(1)). In FIGS. 7A and 7B depict the user selecting to associate the first touch surface with a disarming command. Similarly, the processor(s) 602 may receive additional input to associate the second touch surface with a second command and the third touch surface with a third command.

In some examples, the process 1400, at block B1404, receives further input to associate with the touch surface(s) and/or the commands. For example, the processor(s) 602 may receive input representing icons 432 to associate with the touch surface(s) 306 (see FIGS. 7A and 7B), actions 422 to associate with the commands 420 (and/or the command 442), modes 424 to associate with the commands 420 (and/or the command 442), or feedback 436 to associate with the commands 420 (and/or the command 442).

The process 1400, at block B1406, transmits the request to associate the commands with the touch surface(s). For example, upon receiving the touch input at block B1404, the processors(s) 602, may generate and/or transmit, using the network interface 610, a request (e.g., configuration data 438, a first data packet 444, etc.) to the A/V device 210 representing the commands 420 (and/or the command 442) (or other associations) to be associated with the touch surface(s) 306. The request (e.g., the configuration data 438, the first data packet 444, etc.) may indicate, for example, that the first touch surface of the touch surface(s) 306 is to be associated with the disarming command. In some examples, the processor(s) 602 may transmit the request to the backend server 224 and the backend server 224 may then transmit (e.g., forward), the request to the A/V device 210. Upon receiving the request, as discussed above, the A/V device 210 may configure the touch surface(s) 306 according to the request (e.g., the configuration data 438, the first data packet 444, etc.).

The process 1400, at block B1408, receives an indication that the touch surface(s) are associated with the commands. For example, the processor(s) 602 may receive, using the network interface 610, an indication that the A/V device 210 has configured the touch surface(s) 306 according to the transmitted request (e.g., block B1406). The indication, for example, may indicate that the first touch surface is associated with the disarming command. In some examples, the processor(s) 602 may display other information associated with the indication on the display 618 (e.g., configuration of the touch surface(s) 306 and/or the A/V device 210).

Accordingly, the process 1400 may increase the functionality and usefulness of the A/V device 210 by enabling the user (e.g., homeowner) to configure the touch surface(s) 306 and functionality of the A/V device 210 according to user preferences.

Figure 15:
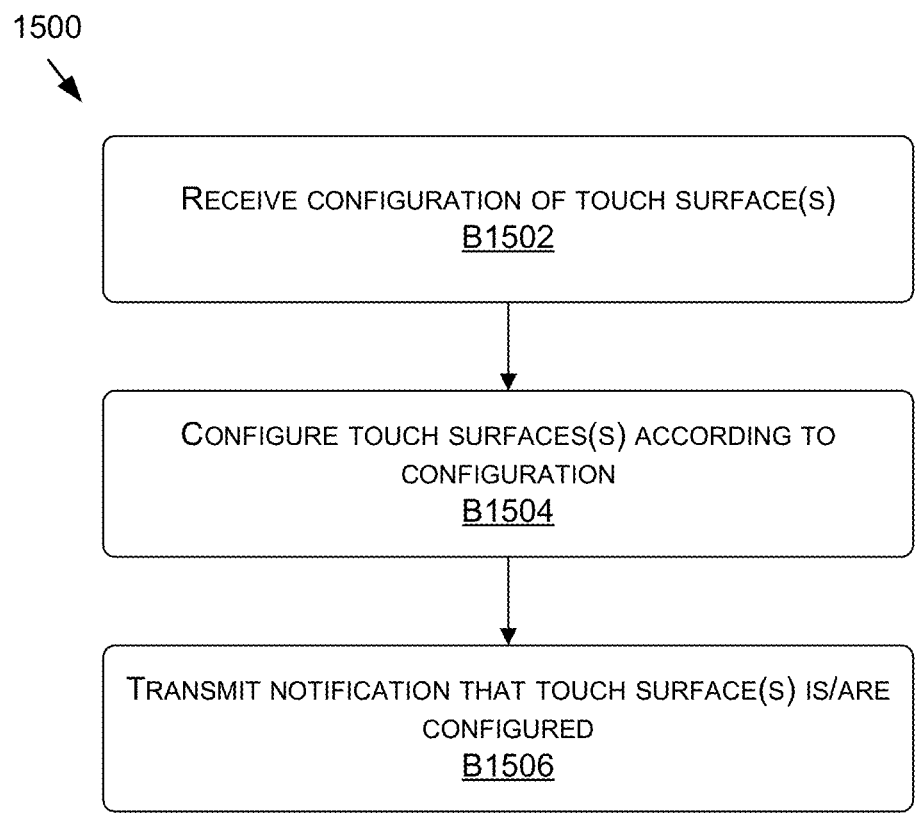
FIG. 15 is a flowchart illustrating an example process for configuring a multi-button A/V recording and communication doorbell, according to various aspects of the present disclosure.

FIG. 15 is a flowchart illustrating an example process 1500 for configuring touch surface(s) of an A/V device according to various aspects of the present disclosure. The process 1500, at block B1502, may receive a configuration of touch surface(s) of an A/V device. For example, the processor(s) 310, may receive, using the network interface(s) 312, configuration data 438 representing a configuration of the touch surface(s) 306 of the A/V device 210. In some examples, the configuration data 438 may represent commands 420 (and/or the command 442) to be associated with the touch surface(s) 306, icons 432 to be associated with the touch surface(s) 306, and/or area data 456 represented by the touch surface(s) 306. For example, the configuration data 438 may indicate that a first touch surface of the touch surface(s) 306 is to be associated with a command to unlock a door at a property where the A/V device 210 is located. In some examples, the configuration data 438 may correspond to respective commands associated with the touch surfaces of the A/V device 210 that are performable by certain users. Additionally, the configuration data 438 may correspond to a number of touch surfaces on A/V device 210 capable of receiving touch input. For example, the configuration data 438 may indicate that for a first user (e.g., homeowner), the A/V device 210 is to include three touch surfaces associated with the commands 420 (and/or the command 442). For a second user (e.g., visitor), the configuration data 438 may indicate that the A/V device 210 is to include one touch surface associated with the command 420 (and/or the command 442). In this sense, the A/V device 210 may be configured to update, using the configuration data 438 and an identity of the user, the A/V device 210.

The process 1500, at block B1504, configures the touch surface(s) of the A/V device according to the configuration. For example, the processor(s) 310 may configure the touch surface(s) 306 according to the configuration data 438. Additionally, using the configuration data 438, the processor(s) 310 may configure the touch surface(s) 306 to be associated with the icons 432 and/or the feedback 436. In some examples, configuring the touch surface(s) 306 may involve the processor(s) 310 mapping the area data 456 to the touch surface(s) 306. For example, the processor(s) 310 may configure the touch surface(s) 306 to include three touch surfaces through associating the touch surfaces with to the area data 456. Therefore, upon receiving input on the touch surface(s) 306, the processor(s) 310 may analyze the input (e.g., input data 410) to determine which touch surface(s) 306 received the touch input.

The process 1500, at block B1506, transmits a notification that the touch surface(s) are configured. For example, the processor(s) 310, may transmit, using the network interface(s) 312, a notification that the A/V device 210 is configured according to the configuration data 438. The notification may notify a user that the touch surface(s) 306 have been successfully configured according to the configuration data 438. For example, the notification may indicate that the first touch surface is associated with the disarming command.

Figure 16A:
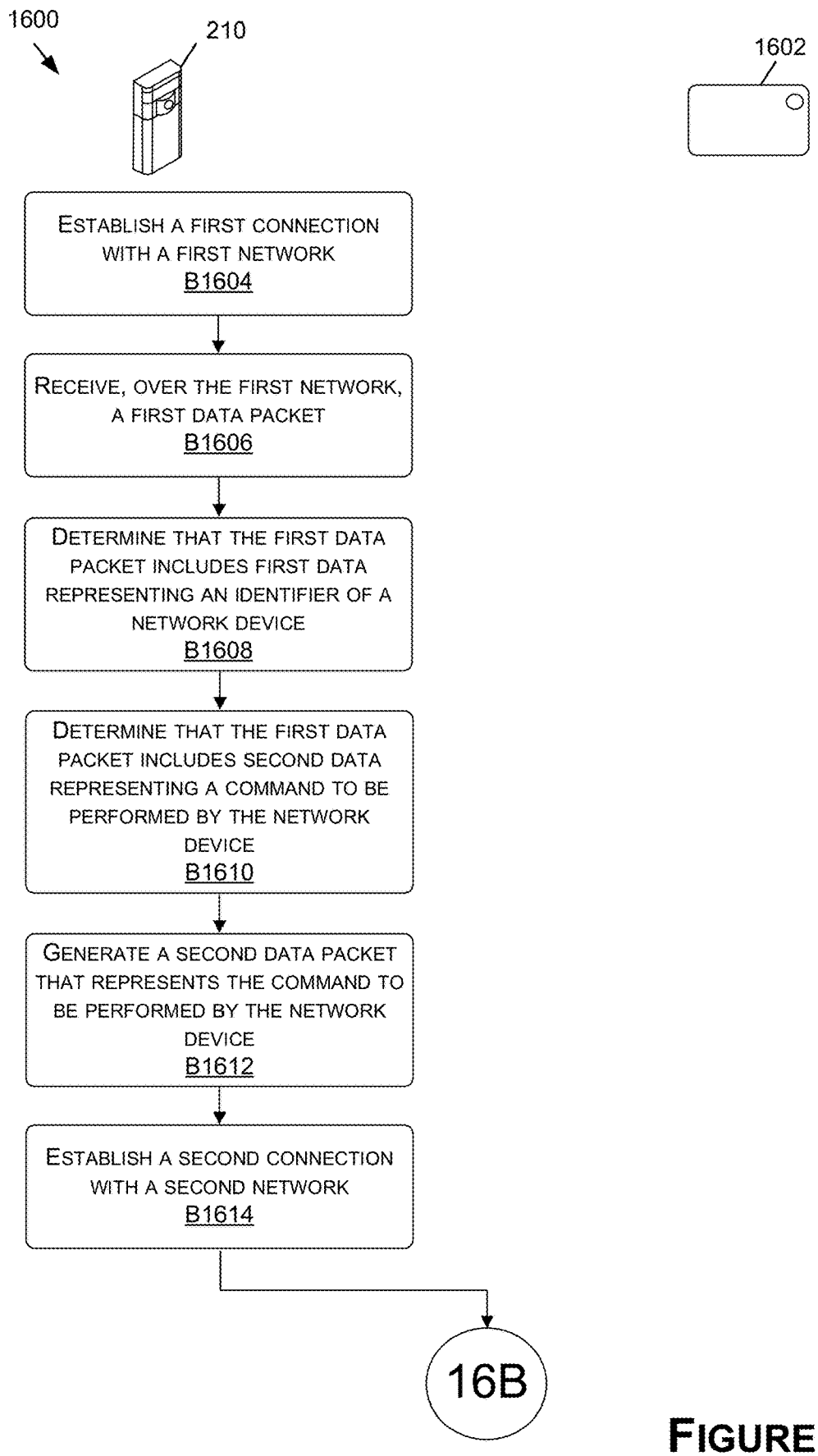
FIGS. 16A-16B are a flowchart illustrating an example process for an A/V device using multiple network connections to transmit and receive data with a remote network device and a local network device, according to various aspects of the present disclosure.
Figure 16B:
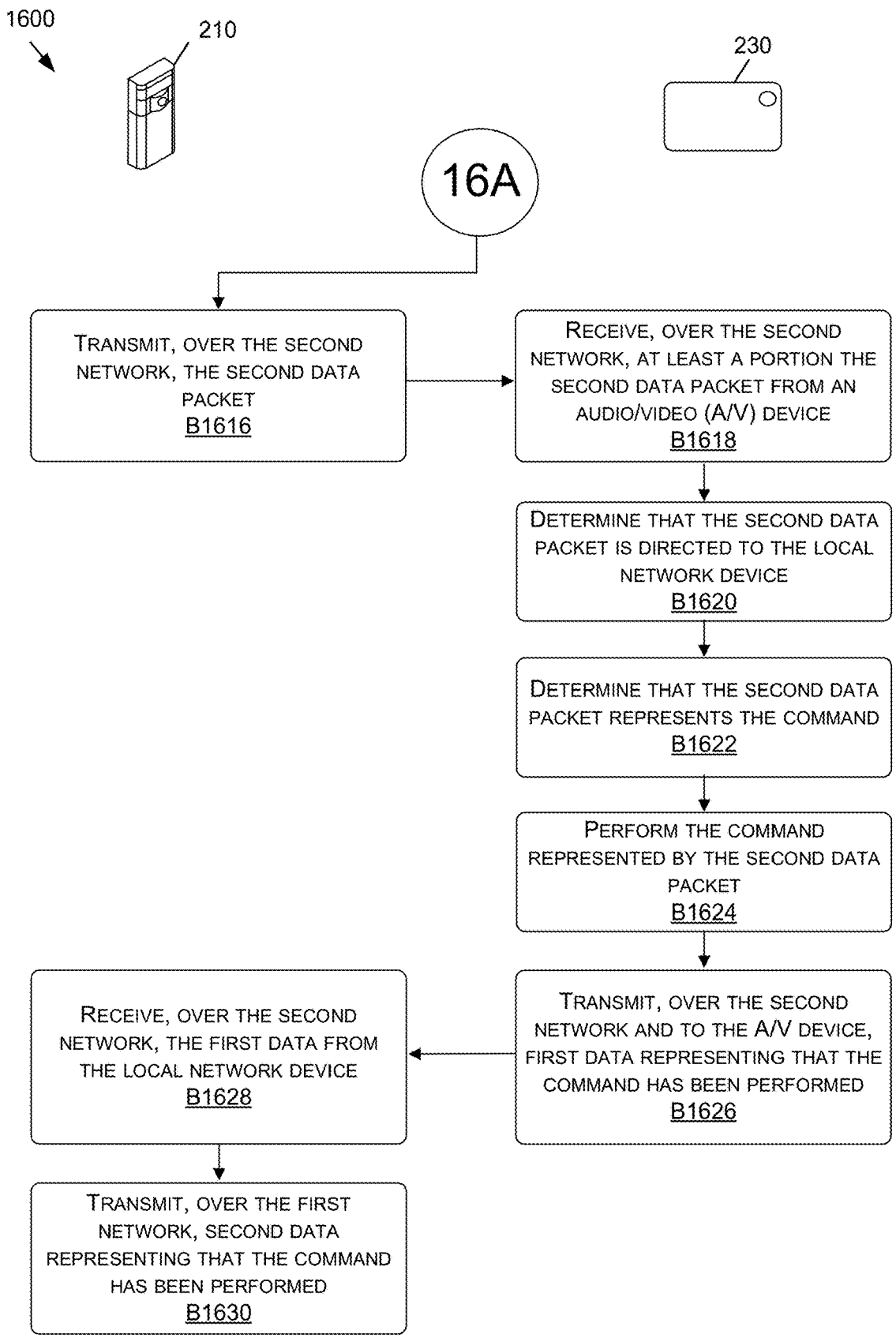

FIGS. 16A-16B are a flowchart illustrating an example process 1600 for an A/V device 210 using multiple network connections to transmit and receive data with a remote network device (e.g., the backend server 224, the client device 214, 216, etc.) and a network device 1602, according to various aspects of the present disclosure. In the example process 1600 of FIGS. 16A-16B, the blocks on the left may be performed by the A/V device 210 while the blocks on the right may be performed by the network device 1602. Additionally, even though the A/V device 210 is illustrated as including an A/V doorbell 210(*c*), in other examples, the A/V device 210 may include a security camera 210(*a*), a light camera 210(*b*) (e.g., floodlight cameras, spotlight cameras, etc.), and/or other devices capable of recording audio data and/or image data. Furthermore, although the network device 1602 is illustrated as including an electronic device 1602, in other examples, the network device 1602 may include a sensor 204, an automation device 206, a light emitter 232, the hub device 202, the VA device 208, and/or another other network device.

The process 1600, at block B1604, establishes a first network connection with a first network. For example, the A/V device 210 may use a first network interface 312 to establish the first connection with the first network. In some examples, the first network may include a wireless area network, such as, but not limited to, the Internet, a local intranet, a PAN, a LAN, a WAN, and/or the like. In some examples, the A/V device 210 may activate the first network interface 312 to establish the first connection with the first network. For example, the A/V device 210 may deactivate (e.g., turn off, cease providing power to, etc.) the first network interface 312 to conserve power. The A/V device 210 may then activate (e.g., turn on, provide power to, etc.) the first network interface 312 to connect to the first network in order to receive data from other devices. In some examples, the A/V device 210 activates the first network interface 312 at the elapse of given time intervals. In some examples, the A/V device activates the first network interface 312 based on receiving data from a network device over a second network.

The process 1600, at block B1606, receives, over the first network, a first data packet. For example, the A/V device 210 may receive, using the first network interface 312 and over the first network, the first data packet 444 generated by the remote network device. In some examples, the first data packet 444 may include at least first data representing an identifier 440 of the network device 1602 and second data representing a command 442 to be performed by the network device 1602.

The process 1600, at block B1608, determines that the first data packet includes first data representing an identifier of a network device. For example, the A/V device 210 may analyze the first data packet 444 to determine that the first data packet 444 includes first data representing the identifier 440 of the network device 1602. As described herein, the identifier 440 may include an IP address, a MAC address, a numerical identifier, an alphabetic identifier, a mixed numerical and alphabetic identifier, and/or any other type of identifier that may be used to identify the network device 1602.

The process 1600, at block B1610, determines that the first data packet includes second data representing a command to be performed by the network device. For example, the A/V device 210 may analyze the first data packet 444 to determine that the first data packet 444 includes second data representing the command 442 to be performed by the network device 1602. As described herein, the command 442 may include, but is not limiting to, arming/disarming a security system and/or a home-automation system, ringing a doorbell, unlocking and/or locking a door (e.g., causing an automation device 206 to unlock and/or lock a door), activating the light cameras 210(*b*) (e.g., floodlight cameras, spotlight cameras, etc.), changing brightness levels or output types (e.g., pulse, chirp, flash, constant, etc.) for the light cameras 210(*b*), initiating communication with a homeowner at which the A/V device 210 is located (e.g., push to talk), transmitting the message(s) 416 to homeowners, person(s), etc., transmitting messages/notifications to electronic devices (e.g., speakers), causing the electronic device 230 to activate (turn on, provide power to, etc.) and/or deactivate (e.g., turn off, cease providing power to, etc.) the light emitters 232, cause the light emitters 232 to activate and/or deactivate, determine battery levels (e.g., request battery level then receive battery level in response), adjust settings of devices, such as thresholds (e.g., ambient light thresholds for activating the light emitters 232, motion sensitivity thresholds for turning on the cameras of A/V devices 210, etc.), and/or the like.

The process 1600, at block B1612, generates a second data packet that represents the command to be performed by the network device. For example, the A/V device 210 may generate the second data packet 446. The second data packet 446 may include at least third data (e.g., synchronization data 448) for synchronizing the A/V device 210 with the network device 1602, fourth data representing the identifier 440 of the network device 1602, and fifth data representing the command 442 to be performed by the network device 1602.

The process 1600, at block B1614, establishes a second connection with a second network. For example, the A/V device 210 may use a second network interface 312 to establish the second connection with the second network. In some examples, the second network may include a low-power wide-area network (LPWAN), such as, but not limited to, a chirp spread spectrum (CSS) modulation technology network (e.g., LoRaWAN), an Ultra Narrow Band modulation technology network (e.g., Sigfox, Telensa, NB-IoT, etc.), RingNet, and/or the like. In some examples, the second network interface 312 may include, and/or be similar to, the first network interface 312. In some examples, the second network interface 312 may be different than the first network interface 312.

The process 1600, at block B1616, transmits, over the second network, the second data packet. For example, the A/V device 210 may transmit, using the second network interface 312, the second data packet 446 over the second network. In some examples, the A/V device 210 begins transmitting the third data for synchronizing the A/V device 210 with the network device 1602 before transmitting either the fourth data representing the identifier 440 or the fifth data representing the command 442 to be performed by the network device 1602.

The process 1600, at block B1618, receives, over the second network, at least a portion of the second data packet from an audio/video (A/V) device. For example, the network device 1602 may receive at least a portion of the second data packet 446 from the A/V device 210. In some examples, to receive the at least the portion of the second data packet 446, the network device 1602 may activate a network interface in order to receive data. While the network interface is activated, the network device 1602 may receive at least a portion of the third data included in the second data packet 446. Based on receiving the at least the portion of the third data, the network device 1602 may determine that the A/V device 210 is about to transmit additional data. As such, the network device 1602 may continue to activate the network device in order to receive the remaining portion of the second data packet 446 (e.g., the fourth data and the fifth data) from the A/V device 210.

The process 1600, at block B1620, determines that the second data packet is directed to the network device. For example, the network device 1602 may analyze the fourth data included in the second data packet 446 and, based on the analysis, determine that the fourth data represents the identifier 440 of the network device 1602. In response, the network device 1602 may determine that the second data packet 446 is directed to the network device 1602.

The process 1600, at block B1622, determines that the second data packet represents the command. For example, the A/V device 210 may analyze the fifth data included in the second data packet 446 and, based on the analysis, determine that the fifth data represents the command 442.

The process 1600, at block B1624, performs the command represented by the second data packet. For example, the network device 1602 may perform the command 442 represented by the second data packet 446. For example, and without limitation, if the command 442 is to activate light emitters 232, the network device 1602 may activate the light emitters 232 by providing power to the light emitters 232.

The process 1600, at block B1626, transmits, over the second network and to the A/V device, first data representing that the command has been performed. For example, based on performing the command 442, the network device 1602 may transmit the first data to the A/V device 210, where the first data represents that the first command 442 has been performed.

The process 1600, at block B1628, receives, over the second network, the first data from the network device. For example, the A/V device 210 may receive, using the second network interface 312 and over the second network, the first data from the network device 1602.

The process 1600, at block B1630, transmits, over the first network, second data representing that the command has been performed. For example, the A/V device 210 may transmit, using the first network interface 312 and over the first network, the second data (which may also be represented by, and/or include, the first data) to the remote network device. The remote network device may then use the second data to determine that the command 442 has been performed by the network device 1602.

The process 1600 of FIG. 16 may be implemented in a variety of embodiments, including those discussed above. However, the below-detailed embodiments are not intended to be limiting, and are provided merely as example embodiments of the present disclosure. Other embodiments similar to those outlined herein may also fall within the scope of the present disclosure.

For example, and referring to the example of FIG. 1, the A/V doorbell 102 may use a first network interface 104 to establish a first connection with the first network 106, which may include a wireless local area network (e.g., block B1604). The A/V doorbell 102 may then receive, over the first connection, a first data packet from the backend server 108 (e.g., block B1606). In response, the A/V doorbell 102 may determine that the first data packet includes data representing an identifier 122 of the electronic device 114 (e.g., block B1608) and data representing a command 124 for the electronic device 114, which may include activating the light emitters 116 (e.g., block B1610). The A/V doorbell 102 may then generate a second data packet that includes data to synchronize the A/V doorbell 102 with the electronic device 114, data that represents the identifier 122 of the electronic device 114, and data that represents the command 124 for the electronic device 114 (e.g., block B1612).

The A/V doorbell 102 may then use a second network interface 104 to establish a second connection with a second network, which may include a low-power wide-area network (e.g., block B1614). The A/V doorbell 102 may then transmit at least a portion of the second data packet to the electronic device 114 (e.g., block B1616). The electronic device 114 may receive the at least the portion of the second data packet from the A/V doorbell 102 (e.g., block B1618). In response, the electronic device 114 may use the data representing the identifier 122 to determine that the second data packet is directed to the electronic device 114 (e.g., block B1620). Additionally, the electronic device 114 may determine that the second data packet includes the data representing the command 124 (e.g., block B1622). The electronic device 114 may then activate the light emitters 116, such as by providing power to the light emitters 116 (e.g., block B1624).

The electronic device 114 may then transmit first data to the A/V doorbell 102, where the first data represents that the command 224 was performed by the electronic device 114

(e.g., block B1626). In some examples, such as where the command 224 is a request (e.g., a request for battery levels, a request for signal strength, etc.), the first data transmitted may include the battery level, the signal strength, and/or the like. The A/V doorbell 102 may receive the first data from the electronic device 114 (e.g., block B1628). In response, the A/V doorbell 102 may transit second data to the backend server 108, where the second data represents that the command 124 was performed by the electronic device 114, and/or represents the answer to the request (e.g., the battery level, the signal strength, etc.) (e.g., block B1630).

Figure 17:
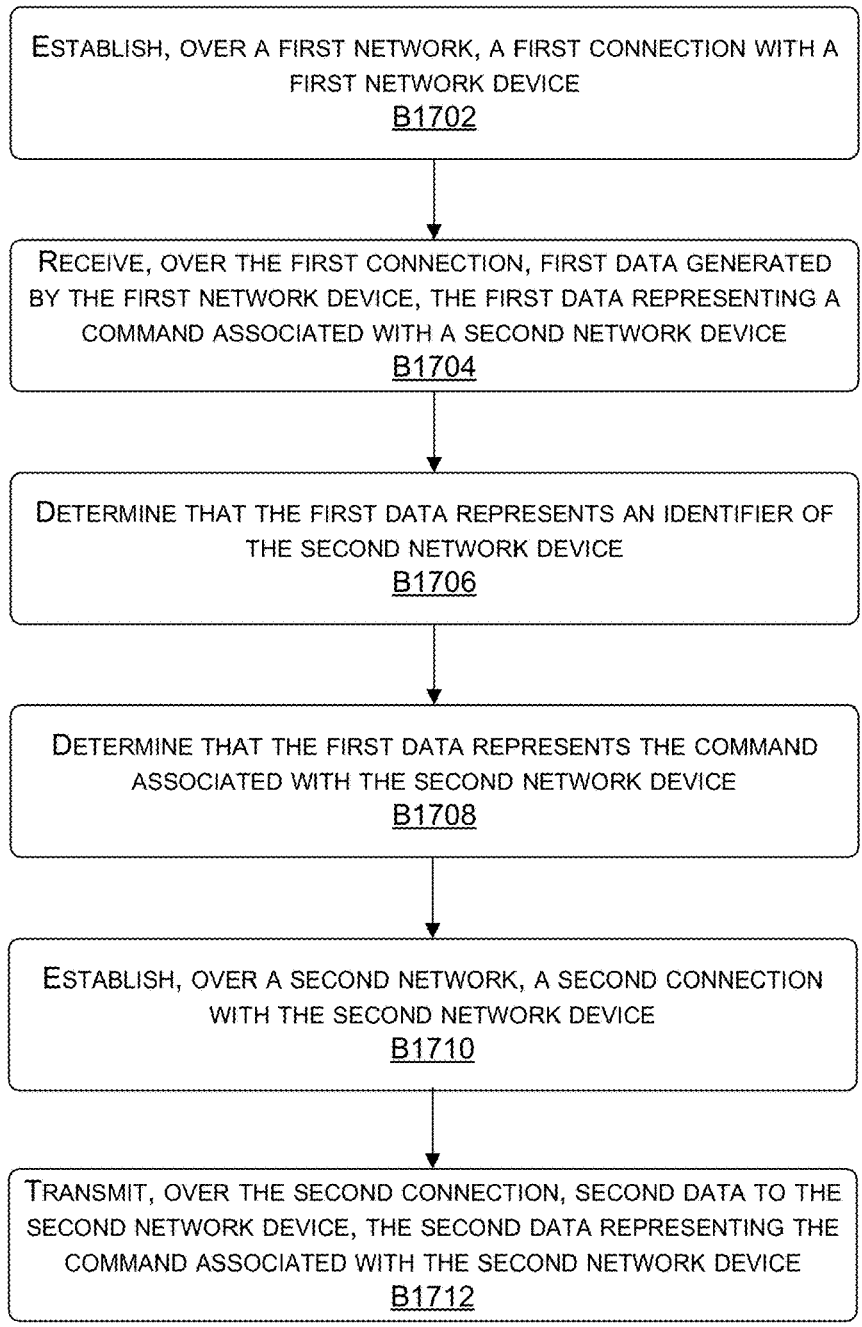
FIG. 17 is a flowchart illustrating an example process for an A/V device communicating over multiple networks, according to various aspects of the present disclosure.

FIG. 17 is a flowchart illustrating an example process 1700 for an A/V device 210 communicating over multiple networks, according to various aspects of the present disclosure. The process 1700, at block B1702, establishes, over a first network, a first connection with a first network device. For example, the A/V device 210 may use a first network interface 312 to establish, over the first network, the first connection with the first network device. In some examples, the first network may include a wireless area network, such as, but not limited to, the Internet, a local intranet, a PAN, a LAN, a WAN, and/or the like. In some examples, the first network device may include a remote network device. For example, the first network device may include, but is not limited to, the backend server 224, the client device 214, 216, and/or the like.

The process 1700, at block B1704, receives, over the first connection, first data generated by the first network device, the first data representing a command associated with a second network device. For example, the A/V device 210 may receive, over the first connection, the first data generated by the first network device, the first data representing the command 442 associated with the second network device. In some examples, the first data may include a first data packet 444 that includes data representing the identifier 440 of the second network device and data representing the command 442 to be performed by the second network device. In some examples, the second network device may include a local network device. For example, the second network device may include, but is not limited to, a sensor 204, an automation device 206, an electronic device 230, a light emitter 232, and/or the like.

The process 1700, at block B1706, determines that the first data represents an identifier of the second network device. For example, the A/V device 210 may analyze the first data to determine that the first data represents the identifier 440 of the second network device. For example, based on the analysis, the A/V device 210 may determine that the first data represents an IP address, a MAC address, a numerical identifier, an alphabetic identifier, a mixed numerical and alphabetic identifier, and/or any other type of identifier 440 that may be used to identify the second network device.

The process 1700, at block B1708, determines that the first data represents the command associated with the second network device. For example, the A/V device 210 may analyze the first data to determine that the first data represents the command 442 associated with the second network device.

The process 1700, at block B1710, establishes, over a second network, a second connection with the second network device. For example, the A/V device 210 may use a second network interface 312 to establish, over the second network, the second connection with the second network device. In some examples, the second network may include a low-power wide-area network (LPWAN), such as, but not limited to, a chirp spread spectrum (CSS) modulation technology network (e.g., LoRaWAN), an Ultra Narrow Band modulation technology network (e.g., Sigfox, Telensa, NB-IoT, etc.), RingNet, and/or the like. In some examples, the second network interface 312 may include, and/or be similar to, the first network interface 312. In some examples, the second network interface 312 may be different than the first network interface 312.

In some examples, the establish the second connection, the A/V device 210 may transmit data (e.g., synchronization data 448) that is used to synchronize the A/V device 210 with the second network device. For example, the data may cause the second network device to continue to activate a network interface in order to receive additional data that is about to be transmitted by the A/V device 210. Based on the data, and to establish the second connection, the A/V device 210 may begin transmitting the additional data while the network interface of the second network device is activated to receive the additional data. In some examples, the data may be included in a second data packet 446 generated by the A/V device 210.

The process 1700, at block B1712, transmits, over the second connection, second data to the second network device, the second data representing the command associated with the second network device. For example, the A/V device 210 may transmit, over the second connection, the second data to the second network device, where the second data represents the command 442 to be performed by the second network device. In some examples, to transmit the second data, the A/V device 210 may generate the second data packet 446 to include at least data representing the identifier 440 of the second network device and data representing the command 442 to be performed by the second network device. The A/V device 210 may then transmit, over the second connection, the second data packet 446 to the second network device.

Figure 18:
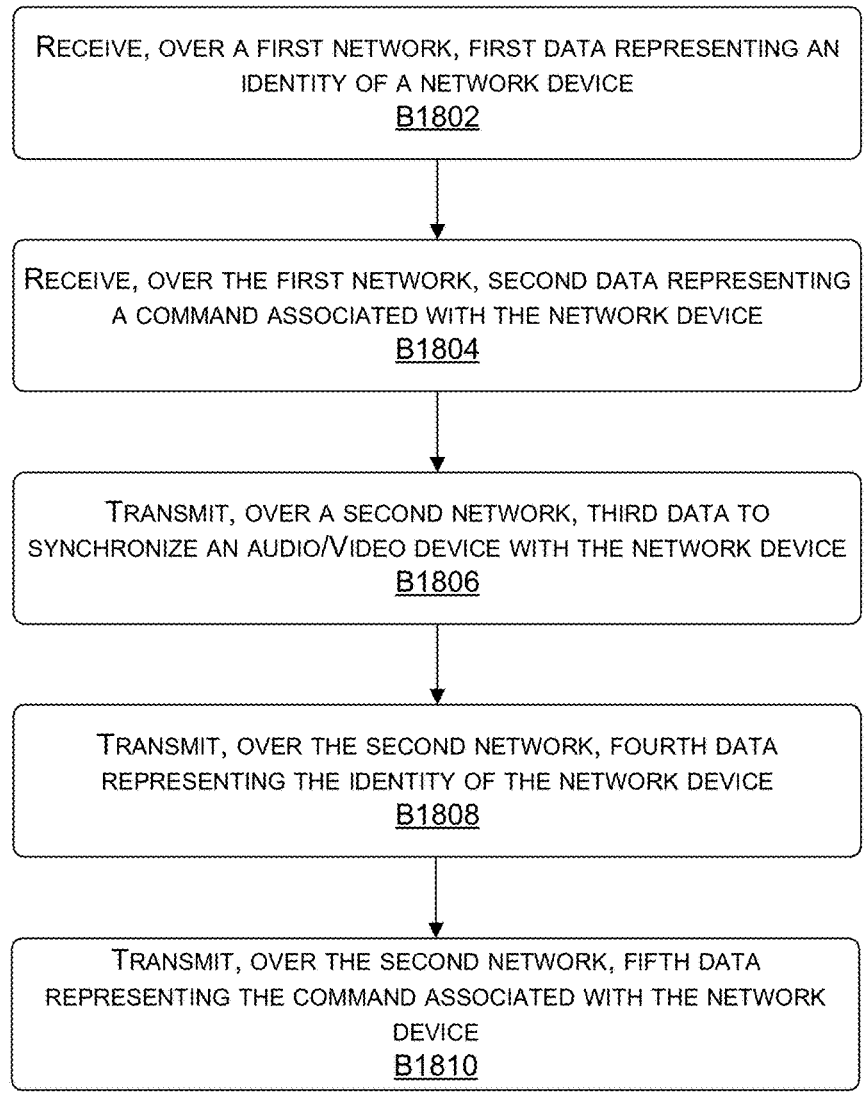
FIG. 18 is a flowchart illustrating an example process for an A/V device communicating over multiple networks with network devices, according to various aspects of the present disclosure.

FIG. 18 is a flowchart illustrating an example process 1800 for an A/V device communicating over multiple networks with network devices, according to various aspects of the present disclosure. The process 1800, at block B1802, receives, over a first network, first data representing an identifier of a network device. For example, the A/V device 210 may receive, using a first network interface 312 and over a first network, the first data representing the identifier 440 of the network device. In some examples, the first network may include a wireless area network, such as, but not limited to, the Internet, a local intranet, a PAN, a LAN, a WAN, and/or the like. In some examples, the A/V device 210 may receive the first data from a remote network device. For example, the A/V device 210 may receive the first data from the backend server 224, the client device 214, 216, and/or the like. In some examples, the network device may include a local network device. For example, the network device may include, but is not limited to, a sensor 204, an automation device 206, an electronic device 230, a light emitter 232, and/or the like. In some examples, the first data may be included in a first data packet 444 generated by the A/V device 210.

The process 1800, at block B1804, receives, over the first network, second data representing a command associated with the network device. For example, the A/V device 210 may receive, using the first network interface 312 and over the first network, the second data representing the command 442 associated with the network device. In some examples, the second data may be included in the first data packet 444 generated by the A/V device 210.

The process 1800, at block B1806, transmits, over a second network, third data to synchronize an audio/video device with the network device. For example, the A/V device 210 may transmit, using a second network interface 312 and over a second network, the third data (e.g., the synchronization data 448) for synchronizing with the network device. In some examples, the third data may be included in a second data packet 446 generated by the A/V device 210. In some examples, the third data may include an identifier associated with a network of devices, where the network of devices includes the network device.

The process 1800, at block B1808, transmits, over the second network, fourth data representing the identifier of the network device. For example, A/V device 210 may transmit, using the second network interface 312 and over the second network, the fourth data representing the identifier 440 of the network device. In some examples, the fourth data may be included in the second data packet 446 generated by the A/V device 210. In some examples, the fourth data may include the first data converted from a first format for transmitting using a first protocol associated with the first network to a second format for transmitting using a second protocol associated with the second network.

The process 1800, at block B1810, transmits, over the second network, fifth data representing the command associated with the network device. For example, the A/V device 210 may transmit, using the second network interface 312 and over the second network, the fifth data representing the command 442 associated with the network device. In some examples, the fifth data may be included in the second data packet 446 generated by the A/V device 210. In some examples, the fifth data may include the second data converted from the first format for transmitting using the first protocol associated with the first network to the second format for transmitting using the second protocol associated with the second network.

Figure 19:
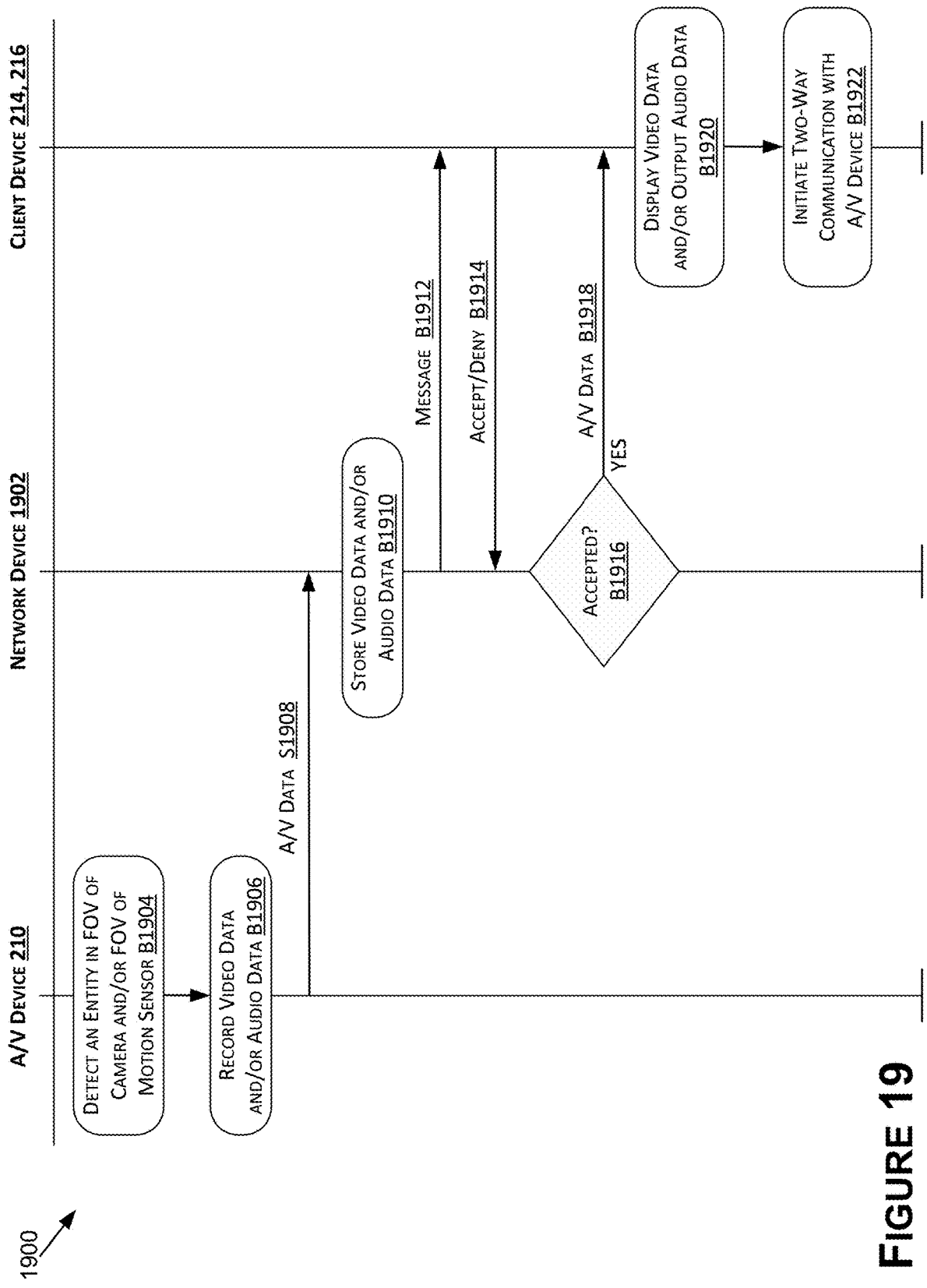
FIG. 19 is a signal diagram of a process for streaming and/or storing A/V content from an A/V recording and communication device according to various aspects of the present disclosure.

FIG. 19 is a signal diagram of a process 1900 for streaming and storing A/V content from the A/V device 210 according to various aspects of the present disclosure. The network device 1902 may include one or more of the hub device 202, the VA device 208, and/or any of the components of the network(s) of servers/backend devices 220 (e.g., the backend server 224, the backend API 226, the storage devices 222, etc.).

The process 1900, at block B1904, detects an object in a field of view of a camera and/or a field of view of a motion sensor. For example, the A/V device 210 may detect the presence of an object within a field of view of view of the motion sensor(s) 326 (e.g., a motion sensor field of view) and/or a field of view of the camera 314 (e.g., a camera field of view). To detect motion using the motion sensor(s) 326, the data type (e.g., voltage for PIR sensors) from the output signal of the motion sensor(s) 326 may be analyzed, by the processor(s) 310 of the A/V device 210, to determine whether the output signal is indicative of motion of an object that should prompt the recording of the image data 406 and/or audio data 408 at block B1906 and signal S1908. To detect motion using the camera 314, the processor(s) 310 of the A/V device 210 may analyze the image data 406 by performing, for example, a frame by frame comparison of a change in pixels, to determine whether the image data 406 is indicative of motion of an object that should prompt the recording and transmission of image data 406 and/or audio data 408 at block B1906 and signal S1908.

The process 1900, at block B1906, records video data and/or audio data. For example, the processor(s) 310 of the A/V device 210 may cause the camera 314 to begin generating the image data 406 and/or the microphone(s) 328 to being recording the audio data 408.

The process 1900, at signal S1908, transmits the video data and/or the audio data to a network device 1902. For example, the processor(s) 310 of the A/V device 210, using the communication module 312, may transmit the image data 406 and/or the audio data 408 to the network device 1902. In response, the network device 1902 may receive, by respective processor(s) and using respective communication module(s), the image data 406 and/or the audio data 408. In some embodiments, the image data 406 and/or the audio data 408 is transmitted to the hub device 202 and/or the VA device 208, and the hub device 202 and/or the VA device 208 may transmit (or forward) the image data 406 and/or the audio data 408 to one or more components of the network(s) of servers/backend devices 220. In either embodiment, the network device 1902 may transmit the image data 406 and/or the audio data 408 to a client device(s) 214, 216. In other embodiments, the image data 406 and/or the audio data 408 may be transmitted to the hub device 202 and/or the VA device 208, and the hub device 202 and/or the VA device 208 may transmit (or forward) the image data 406 and/or the audio data 408 to the client device(s) 214, 216. Still, in some embodiments, the image data 406 and/or the audio data 408 may be transmitted directly to the client device(s) 214, 216 from the A/V device 210.

The process 1900, at block B1910, stores the video data and/or the audio data. For example, the network device 1902 may store the image data 406 and/or the audio data 408. The image data 406 and/or the audio data 408 may be stored for future access by the user(s) of the A/V device 210 (e.g., as Cloud storage). In some embodiments, the A/V device 210 may store the image data 406 and/or the audio data 408 locally (e.g., in the memory 402). In some embodiments, the image data 406 and/or the audio data 408 may not be stored, except during buffering, compression, and/or live (or near-live) streaming of the image data 406 and/or the audio data 408 to the client device(s) 214, 216. In such embodiments, at the conclusion of a motion event (e.g., when an object is no longer in the camera field of view and/or the motion sensor field of view), the video data and/or the audio data may be deleted from the network device 1902.

The process 1900, at signal S1912, transmits a user alert to the client device. For example, the network device 1902 may transmit, by the respective processor(s) and using the respective communication module(s), a user alert 416 to the client device(s) 214, 216. In some embodiments, the user alert 416 may be generated and transmitted, by the processor(s) 310 and using the communication module 312, directly to the client device(s) 214, 216 from the A/V device 210. The user alert 416 may be a notification (e.g., a push notification, a message, (e.g., a short-message-service (SMS) message), an email, a phone call, a signal, and/or another type of user alert. The user alert 416 may be configured to provide a user of the client device(s) 214, 216 with an indication that an object is present at the A/V device 210. In some embodiments, the user alert 416 may be informative as to the type of motion detected and/or object present at the A/V device 210. For example, if a person, an animal, a parcel, or a vehicle is present, the user alert 416 may include an indication of such. As another example, if the person and/or animal detected are known to be dangerous and/or are acting suspicious (as determined using computer vision processing, image processing, behavioral analysis, third party source(s), etc.), the user alert 416 may include an indication of such.

The process 1900, at signal S1914, transmits an acceptance or denial of the user alert. For example, the client device(s) 214, 216 may transmit, by the processor(s) 702 and using the communication module 710, an acceptance or denial of the user alert 416. In various embodiments, acceptance of the user alert 416 includes an acknowledgement of receipt of the user alert 416 from the client device(s) 214, 216. In yet other embodiments, the acceptance includes the user interacting with (e.g., selecting through a user interface a user interface element of a modal window displayed by a display device the client device(s) 214, 216) the user alert 416. Furthermore, denial of the user alert 416 may include a variety of different actions and/or information. In one example, a denial includes a failure of the client device(s) 214, 216 to provide a response to the user alert 416 within an interval of time. In yet another example, the denial includes the user interacting with the user alert 416 by at least selecting an "ignore" user interface element of a GUI 718 of the client device(s) 214, 216. In response, the hub device 202, the VA device 208, and/or one or more components of the network(s) of servers/backend devices 220 may receive, by the respective processors and using the respective communication modules, the acceptance or denial of the user alert 416 from the client device(s) 214, 216.

The process 1900, at block B1916, determines whether the user alert was accepted or denied. For example, the network device 1902 may determine, by the respective processors, whether the user alert 416 was accepted or denied. In some embodiments, the processor(s) 310 of the A/V device 210, using the communication module 312, may determine whether the user alert 416 was accepted or denied (e.g., in embodiments where the A/V device 210 and the client device(s) 214, 216 communicate directly). When the user alert 416 is denied, the process 1900 may end, or another transmission type of the user alert may be generated (e.g., if a user denies a push notification, an SMS message may be transmitted). When the user alert 416 is accepted, the image data 406 and/or the audio data 408 may be transmitted to the client device(s) 214, 216 that accepted the user alert 416.

The process 1900, at signal S1918, transmits the video data and/or the audio data to the client device(s) 214, 216. For example, network device 1902, by the respective processor(s) and using the respective communication module(s), may transmit the image data 406 and/or the audio data 408 to the client device(s) 214, 216. In response, the client device(s) 214, 216, by the processor(s) 702 and using the communication module 710, may receive the image data 406 and/or the audio data 408. In some embodiments, the image data 406 and/or the audio data 408 may be transmitted by the processor(s) 310 of the A/V device 210, using the communication module 312, directly to the client device(s) 214, 216.

The process 1900, at block B1920, displays the video data and/or outputs the audio data. For example, the processor(s) of the client device(s) 214, 216 may cause display, on the display 716 of the client device(s) 214, 216, the image data 406 and/or may cause output, by the speaker(s) 708 of the client device(s) 214, 216, the audio data 408. In addition to displaying the image data 406 and/or outputting the audio data 408, a GUI 718 may be displayed on the client device(s) 214, 216 that may allow a user of the client device(s) 214, 216 to perform one more actions. The one or more actions may include outputting a siren, or alarm, by selecting a siren/alarm icon, changing camera settings (e.g., pan, tilt, zoom, brightness, contrast, etc.) by selecting one or more camera settings icons, activating one or more modes by selecting a mode activation icon (e.g., for activating a parcel protection mode for monitoring a package in the camera field of view), arming or disarming a security system by selecting an arm/disarm icon, unlocking a door by selecting a door lock icon, etc. In some embodiments, the GUI 718 may further include a talk icon for initiating a two-way communication session between the client device(s) 214, 216 and the A/V device 210, as described below with respect to block B1922.

The process 1900, at block B1922, initiates a two-way communication with the A/V device. For example, the processor(s) 702 of the client device(s) 214, 216, using the communication module 710, may initiate a two-way communication session with the A/V device 210. In response, the A/V device 210 and/or the network device 1902 may receive the two-way communication request from the client device(s) 214, 216. Once the two-way communication session is established, the voice/sound input at the client device(s) 214, 216, as captured by the microphone(s) 706 of the client device(s) 214, 216, may be transmitted as audio data to the A/V device 210 for output by the speaker(s) 330. Additionally, the voice/sound input at the A/V device 210, as captured by the microphone(s) 328 of the A/V device 210, may be transmitted as audio data 408 to the client device 214, 216 for output by the speaker(s) 708 of the client device(s) 214, 216.

Figure 20:
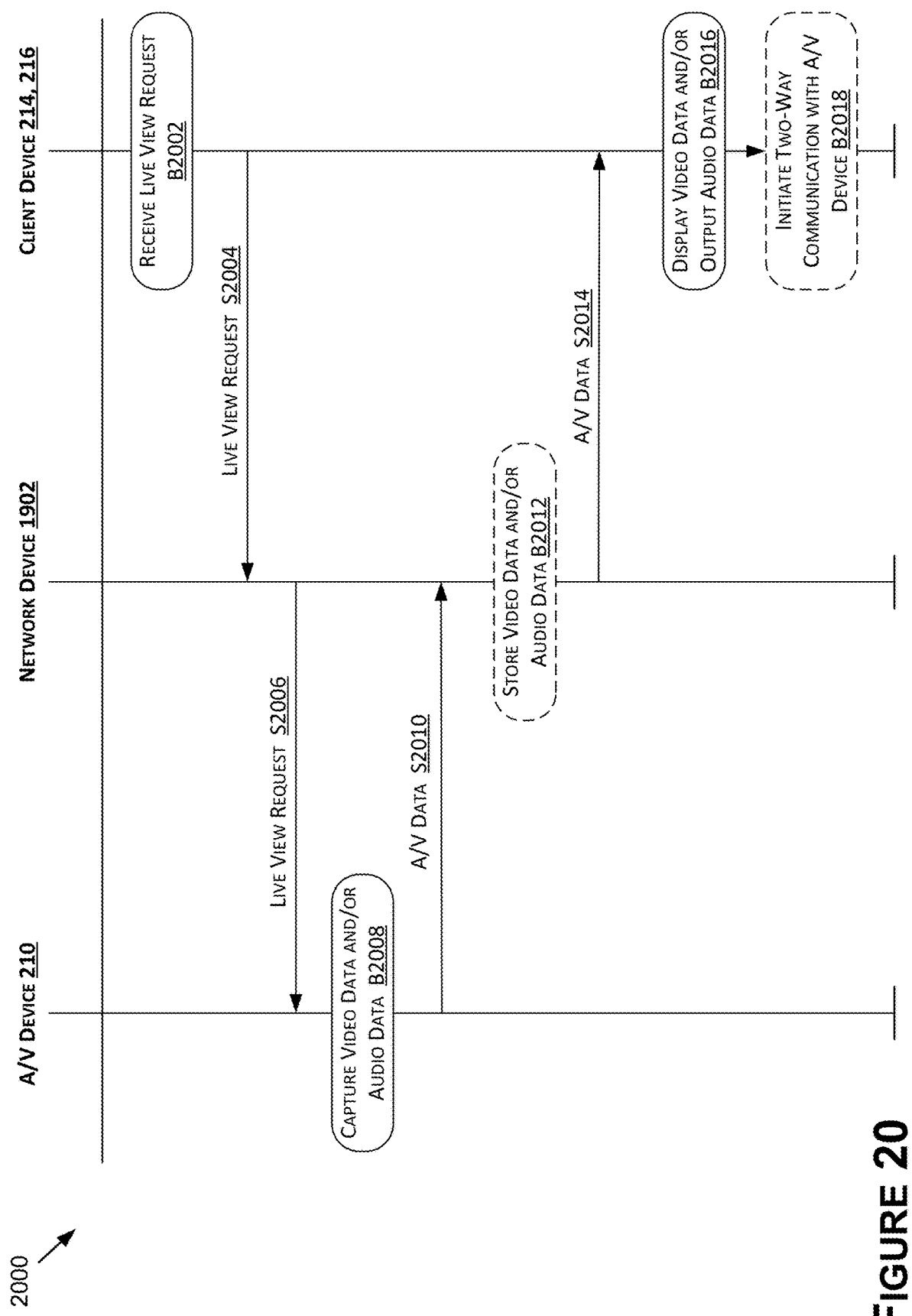
FIG. 20 is a signal diagram of a process for initiating a video-on-demand session for A/V content from an A/V recording and communication device according to various aspects of the present disclosure.

FIG. 20 is a signal diagram of a process 2000 for initiating a video-on-demand session for A/V content from an A/V device 210 according to various aspects of the present disclosure. The network device 2002 may include one or more of the hub device 202, the VA device 208, and/or any of the components of the network(s) of servers/backend devices 220 (e.g., the backend server 224, the backend API 226, the storage devices 222, etc.).

The process 2000, at block B2002, receives a live view request. For example, the processor(s) 702 of the client device 214, 216 may receive a live view request from a user of the client device 214, 216. The live view request may include an input to user interface (e.g., the display 716, such as within a GUI 718 on the display 716, one or more physical buttons of the client device 214, 216, etc.).

The process 2000, at signal S2004, transmits a live view request. For example, the live request may be transmitted, by the processor(s) 702 and using a communication module 710 of the client device 214, 216, to the network device 2002. In response, network device 2002 may receive, by the respective processor(s) and using the respective communication module(s), the live view request. In some embodiments, the live view request may be transmitted directly to the A/V device 210 from the client device 214, 216.

The process 2000, at signal S2006, transmits the live request. For example, network device 2002 may transmit (or forward), by the respective processor(s) and using the respective communication module(s), the live view request to the A/V device 210. In response, the processor(s) 310 of the A/V device 210, using the communication module 312, may receive the live view request.

The process 2000, at block B2008, captures video data and/or audio data. For example, in response to receiving the live view request, the processor(s) 310 of the A/V device 210 may cause the camera 314 to record the image data 406 and/or the microphone(s) 328 to record the audio data 408.

The process 2000, at signal S2010, transmits the video data and/or the audio data. This process may be similar to that of signal S1908 of the process 1900, described above.

The process 2000, at block B2012, stores the video data and/or the audio data. This process may be similar to that of block B1910 of the process 1900, described above.

The process 2000, at block S2014, transmits the video data and/or the audio data to the client device. This process may be similar to that of signal S1918 of the process 1900, described above.

The process 2000, at block B2016, displays the video data and/or outputs the audio data. This process may be similar to that of block B1920 of the process 1900, described above.

The process 2000, at block B2018, initiates two-way communication with the A/V device 210. This process may be similar to that of block B1922 of the process 1900, described above.

The processes described herein enable an A/V device 210 to communicate with network devices over different types of networks. For example, the A/V device 210 may communicate with remote network devices over a first network and local network devices over a second network. Based on the communicating, the A/V device 210 may act as a "bridge" device, such that the remote network devices are able to communicate with the local network devices. For example, the A/V device 210 may receive, over the first network, a first data packet from the backend server 224, where the first data packet 444 includes a command 442 for a local network device. In response, the A/V device 210 may generate a second data packet 446 that includes at least the command 442 for the local network device. The A/V device 210 may then transmit, over the second network, the second data packet 446 to the local network device, which may then perform the command 442. In other words, by using the A/V device 210 as the "bridge" device, the A/V device 210 is capable to integrating the local network devices use for home automation and/or a security system with remote network devices that may help control the local network devices.

Figure 21:
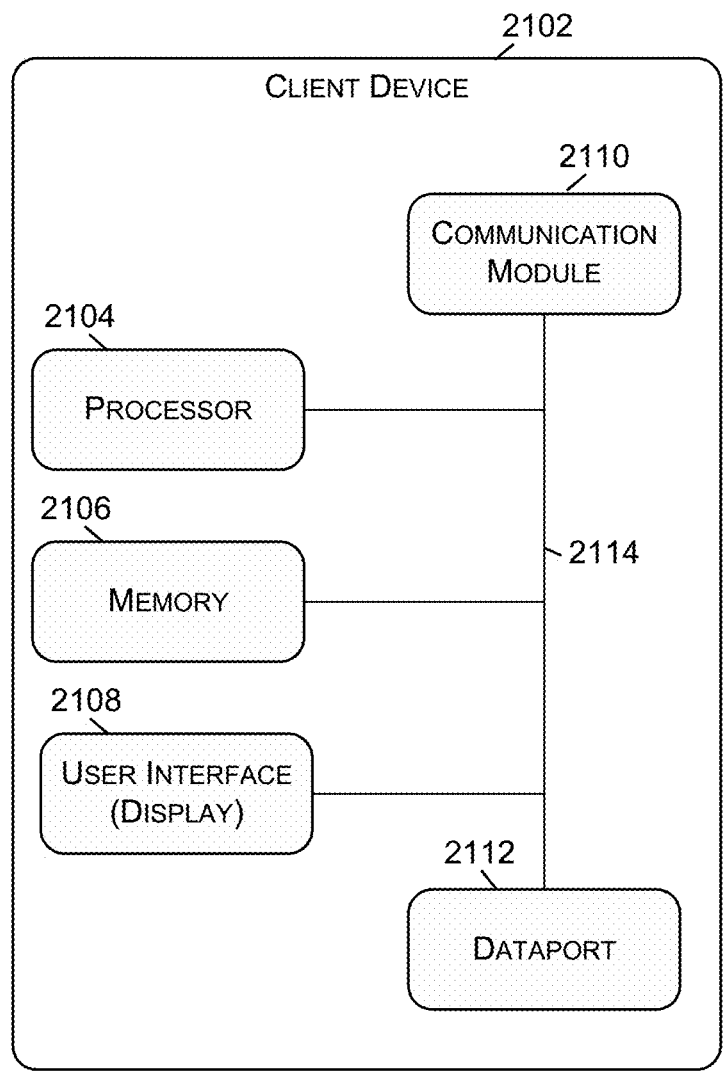
FIG. 21 is a functional block diagram of a client device on which the present embodiments may be implemented according to various aspects of the present disclosure.

FIG. 21 is a functional block diagram of a client device 2102 on which the present embodiments may be implemented according to various aspects of the present disclosure. The client device(s) 214, 216 described with reference to FIG. 2 may include some or all of the components and/or functionality of the client device 2102. The client device 2102 may comprise, for example, a smartphone.

With reference to FIG. 21, the client device 2102 includes a processor 2104, a memory 2106, a user interface 2108, a communication module 2110, and a dataport 2112. These components are communicatively coupled together by an interconnect bus 2114. The processor 2104 may include any processor used in smartphones and/or portable computing devices, such as an ARM processor (a processor based on the RISC (reduced instruction set computer) architecture developed by Advanced RISC Machines (ARM)). In some embodiments, the processor 2004 may include one or more other processors, such as one or more conventional microprocessors, and/or one or more supplementary co-processors, such as math co-processors.

The memory 2106 may include both operating memory, such as random-access memory (RAM), as well as data storage, such as read-only memory (ROM), hard drives, flash memory, or any other suitable memory/storage element. The memory 2106 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 2104 and the memory 2106 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 2104 may be connected to the memory 2106 via the dataport 2112.

The user interface 2108 may include any user interface or presentation elements suitable for a smartphone and/or a portable computing device, such as a keypad, a display screen, a touchscreen, a microphone, and a speaker. The communication module 2110 is configured to handle communication links between the client device 2102 and other, external devices or receivers, and to route incoming/outgoing data appropriately. For example, inbound data from the dataport 2112 may be routed through the communication module 2110 before being directed to the processor 2104, and outbound data from the processor 2104 may be routed through the communication module 2110 before being directed to the dataport 2112. The communication module 2110 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 2112 may be any type of connector used for physically interfacing with a smartphone and/or a portable computing device, such as a mini-USB port or an IPHONE®/IPOD® 30-pin connector or LIGHTNING® connector. In other embodiments, the dataport 2112 may include multiple communication channels for simultaneous communication with, for example, other processors, servers, and/or client terminals.

The memory 2106 may store instructions for communicating with other systems, such as a computer. The memory 2106 may store, for example, a program (e.g., computer program code) adapted to direct the processor 2104 in accordance with the present embodiments. The instructions also may include program elements, such as an operating system. While execution of sequences of instructions in the program causes the processor 2104 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 22:
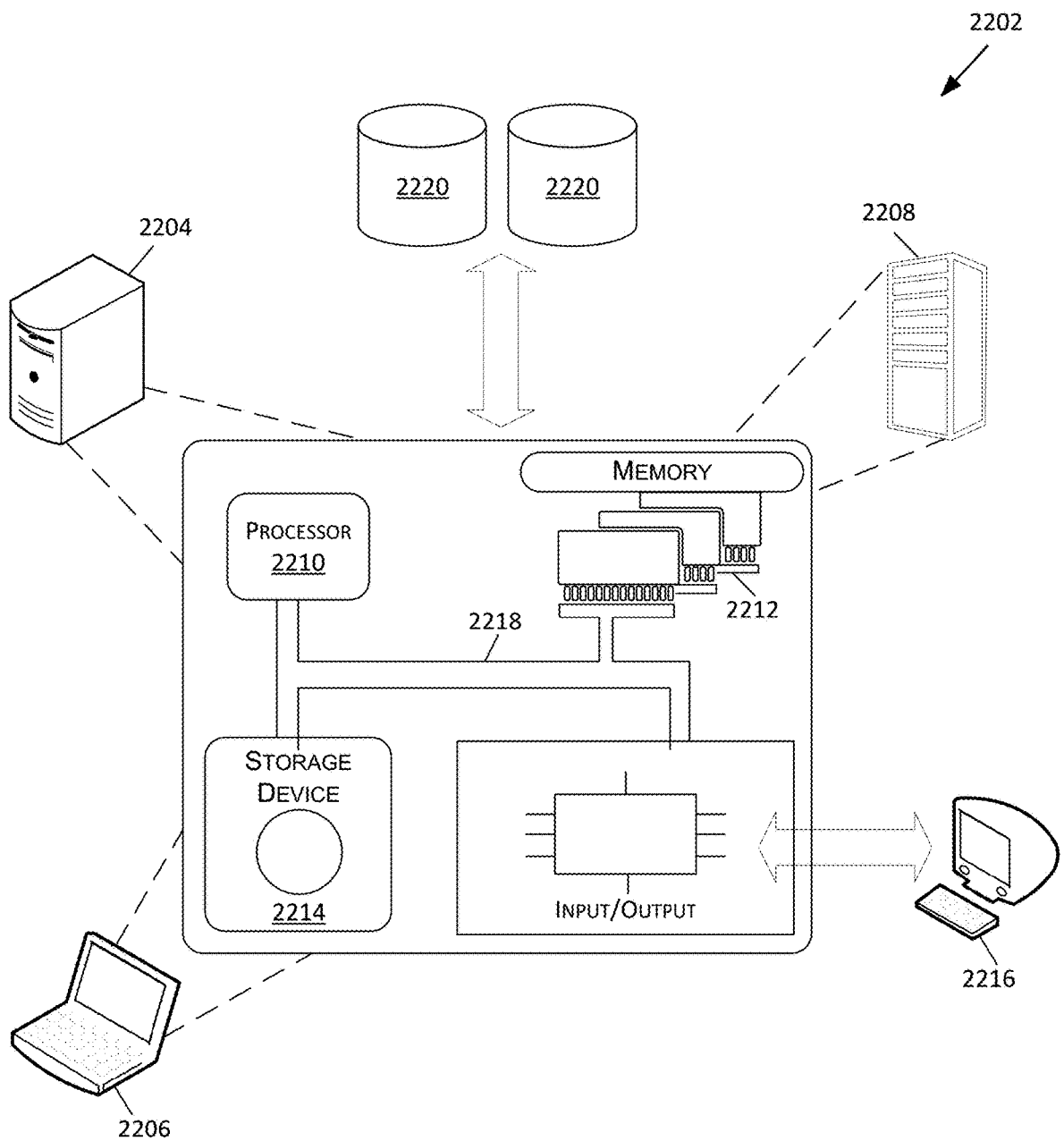
FIG. 22 is a functional block diagram of a general-purpose computing system on which the present embodiments may be implemented according to various aspects of present disclosure.

FIG. 22 is a functional block diagram of a general-purpose computing system on which the present embodiments may be implemented according to various aspects of the present disclosure. The computer system 2202 may be embodied in at least one of a personal computer (also referred to as a desktop computer) 2204, a portable computer (also referred to as a laptop or notebook computer) 2206, and/or a server 2208 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 2202 may execute at least some of the operations described above. The computer system 2102 may include at least one processor 2210, memory 2212, at least one storage device 2214, and input/output (I/O) devices 2216. Some or all of the components 2210, 2212, 2214, 2216 may be interconnected via a system bus 2218. The processor 2210 may be single- or multi-threaded and may have one or more cores. The processor 2210 execute instructions, such as those stored in the memory 2212 and/or in the storage device 2214. Information may be received and output using one or more I/O devices 2216.

The memory 2212 may store information, and may be a computer-readable medium, such as volatile or non-volatile memory. The storage device(s) 2214 may provide storage for the system 2102 and, in some embodiments, may be a computer-readable medium. In various aspects, the storage device(s) 2214 may be a flash memory device, a hard disk device, an optical disk device, a tape device, or any other type of storage device.

The I/O devices 2216 may provide input/output operations for the system 2202. The I/O devices 2216 may include a keyboard, a pointing device, and/or a microphone. The I/O devices 2216 may further include a display unit for displaying graphical user interfaces, a speaker, and/or a printer. External data may be stored in one or more accessible external databases 2220.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

EXAMPLE CLAUSES

In a first aspect, an audio/video (A/V) recording and communication doorbell comprises: a battery; a camera; a speaker; a microphone; at least one input interface; a first network interface for communicating over a wireless local area network; a second network interface for communicating over a low-power wide-area network; one or more processors; and one or more computer-readable media storing instructions that, when executed by the one or more processors, cause the one or more processors to perform operations comprising: receiving, using the first network interface and over the wireless local area network, a first data packet from a remote system; determining that the first data packet includes first data representing an identifier of an electronic device; determining that the first data packet includes second data representing a command for the electronic device; generating a second data packet, the second data packet including: third data for synchronizing the A/V recording and communication doorbell with the electronic device; fourth data representing the identifier of the electronic device; and fifth data representing the command for the electronic device; and transmitting, using the second network interface and over the low-power wide-area network, at least a portion of the second data packet to the electronic device.

In an embodiment of the first aspect, further comprising instructions that, when executed by the one or more processors, cause the one or more processors to perform operations comprising: determining that the first data packet includes sixth data representing a value associated with the command, the second data packet further includes seventh data representing the value.

In another embodiment of the first aspect, the command is to adjust a setting of the electronic device and the value is the value the setting is to be adjusted to.

In another embodiment of the first aspect, wherein: the setting includes at least one of brightness level, a threshold ambient light level, a motion sensitivity level, an auto-shutoff delay time, a light output mode, a peer-to-peer communication channel, a peer-to-peer network link key, a peer-to-peer broadcast network key, or a group identifier; and the value includes at least one of the brightness level, the threshold ambient light level, the motion sensitivity level, the auto-shutoff delay time, a value associated with the light output mode, the peer-to-peer communication channel, the peer-to-peer network link key, the peer-to-peer broadcast network key, or the group identifier.

In another embodiment of the first aspect, further comprising instructions that, when executed by the one or more processors, cause the one or more processors to perform operations comprising: receiving, using the second network interface and over the low-power wide-area network, a third data packet including sixth data from the electronic device; based at least in part on the sixth data, determining that the command was performed by the electronic device; generating a fourth data packet including seventh data indicating that the command was performed by the electronic device; and transmitting, using the first network interface and over the wireless local area network, the fourth data packet to the remote system.

In another embodiment of the first aspect, further comprising instructions that, when executed by the one or more processors, cause the one or more processors to perform operations comprising: receiving, using the second network interface and over the low-power wide-area network, sixth data from an additional electronic device, the sixth data including an additional command to establish a connection with the remote system over the wireless local area network; and establishing, using the first network interface, the connection with the remote system over the wireless local area network, the receiving of the first data packet from the remote system is based at least in part on the establishing of the connection with the remote system over the wireless local area network.

In another embodiment of the first aspect, further comprising instructions that, when executed by the one or more processors, cause the one or more processors to perform operations comprising: determining that a time interval has elapsed; and based at least in part on the time interval elapsing, establishing, using the first network interface, a connection with the remote system over the wireless local area network, the receiving of the first data packet from the remote system is based at least in part on the establishing of the connection with the remote system over the wireless local area network.

In another embodiment of the first aspect, further comprising instructions that, when executed by the one or more processors, cause the one or more processors to perform operations comprising: determining that a first time interval has elapsed; based at least in part on the first time interval elapsing, transmitting, using the first network interface and over the wireless local area network, a first signal to a router; determining that a second time interval has elapsed; and based at least in part on the second time interval elapsing, transmitting, using the second network interface and over the low-power wide-area network, a second signal to at least one of the electronic device or an additional electronic device.

In another embodiment of the first aspect, the first time interval is greater than the second time interval.

In another embodiment of the first aspect, further comprising instructions that, when executed by the one or more processors, cause the one or more processors to perform operations comprising: receiving an input using the at least one input interface; based at least in part on the input, generating image data using the camera; and transmitting, using the first network interface and over the wireless local area network, the image data to at least one of the remote system or a client device.

In another embodiment of the first aspect, further comprising a motion sensor and instructions that, when executed by the one or more processors, cause the one or more processors to perform operations comprising: detecting, using at least one of the camera or the motion sensor, motion of an object; based at least in part on the motion, generating image data using the camera; and transmitting, using the first network interface and over the wireless local area network, the image data to at least one of the remote system or a client device.

In another embodiment of the first aspect, further comprising instructions that, when executed by the one or more processors, cause the one or more processors to perform operations comprising: receiving, using the second network interface and over the low-power wide-area network, sixth data from at least one of the electronic device or an additional electronic device; based at least in part on the sixth data, generating image data using the camera; and transmitting, using the first network interface and over the wireless local area network, the image data to at least one of the remote system or a client device.

In another embodiment of the first aspect, the at least one input interface includes a first input interface associated with a doorbell and a second input interface, and further comprising instructions that, when executed by the one or more processors, cause the one or more processors to perform operations comprising: based at least in part on the first data packet, associating the identifier of the electronic device and the command with the second input interface; and receiving an input using the second input interface, the generating of the second data packet is based at least in part on the input.

In another embodiment of the first aspect, communicating over the wireless local area network using the first network interface uses a first amount of power from the battery and communicating over the low-power wide-area network using the second network interface uses a second amount of power from the battery, the first amount of power being greater than the second amount of power.

In another embodiment of the first aspect, the third data further includes an additional identifier associated with a local network of devices, the local network of devices including the electronic device.

In another embodiment of the first aspect, the at least one input interface comprises: a first input interface associated with a first command; a second input interface associated with a second command; and a third input interface associated with a third command.

In another embodiment of the first aspect, the electronic device is a light emitter and the command is to emit light.

In another embodiment of the first aspect, the electronic device is a transformer and the command is to cause a light emitter to emit light.

In another embodiment of the first aspect, the electronic device is a locking mechanism and the command is one of locking the locking mechanism or unlocking the locking mechanism.

In another embodiment of the first aspect, further comprising instructions that, when executed by the one or more processors, cause the one or more processors to perform operations comprising transmitting the second data packet using a high data rate, the high data rate being equal to or greater than 50 kilobytes per second.

In another embodiment of the first aspect, further comprising instructions that, when executed by the one or more processors, cause the one or more processors to perform operations comprising transmitting the second data packet using a low data rate, the low data rate being less than 50 kilobytes per second.

In a second aspect, a method comprises: establishing, by an audio/video (A/V) recording and communication doorbell and using a first network interface, a first type of network connection with a remote system; receiving, by the A/V recording and communication doorbell via the first type of network connection, first data from the remote system, the first data indicating a command to be performed by an electronic device; determining, by the A/V recording and communication doorbell, that the first data represents an identifier of the electronic device; determining, by the A/V recording and communication doorbell, that the first data indicates the command to be performed by the electronic device; transmitting, by the A/V recording and communication doorbell and using a second network interface, second data for synchronizing the A/V recording and communication doorbell with the electronic device; based at least in part on the second data, establishing, by the A/V recording and communication doorbell and using the second network interface, a second type of network connection with the electronic device; transmitting, by the A/V recording and communication doorbell via the second type of network connection, third data to the electronic device, the third data representing the identifier of the electronic device; and transmitting, by the A/V recording and communication doorbell via the second type of network connection, fourth data to the electronic device, the fourth data indicating the command to be performed by the electronic device.

In an embodiment of the second aspect, the method further comprising: receiving, by the A/V recording and communication doorbell and via the second type of network connection, fifth data from the electronic device, the fifth data indicating that the command was performed by the electronic device; and transmitting, by the A/V recording and communication doorbell and via the first type of network connection, sixth data to the remote system, the sixth data indicating that the command was performed by the electronic device.

In another embodiment of the second aspect, the method further comprising: receiving, by the A/V recording and communication doorbell and using the second network interface, fifth data from an additional electronic device, the fifth data including an additional command to establish the first type of network connection with the remote system, the establishing of the first type of network connection with the remote system is based at least in part on the fifth data.

In another embodiment of the second aspect, the method further comprising: determining, by the A/V recording and communication doorbell, that a time interval has elapsed, the establishing of the first type of network connection with the remote system is based at least in part on the time interval elapsing.

In another embodiment of the second aspect, the method further comprising: determining, by the A/V recording and communication doorbell, that a first time interval has elapsed; based at least in part on the first time interval elapsing, transmitting, by the A/V recording and communication doorbell and using the first network interface, a first signal to a router; determining, by the A/V recording and communication doorbell, that a second time interval has elapsed; and based at least in part on the second time interval elapsing, transmitting, by the A/V recording and communication doorbell and using the second network interface, a second signal to at least one of the electronic device or an additional electronic device.

In another embodiment of the second aspect, the first time interval is greater than the second time interval.

In another embodiment of the second aspect, the method further comprising: receiving, by the A/V recording and communication doorbell, an input using an input interface; based at least in part on the input, generating, by the A/V recording and communication doorbell, image data using a camera; and transmitting, by the A/V recording and communication doorbell and using the first network interface, the image data to at least one of the remote system or a client device.

In another embodiment of the second aspect, the method further comprising: detecting, by the A/V recording and communication doorbell, motion of an object; based at least in part on the motion, generating, by the A/V recording and communication doorbell, image data using a camera; and transmitting, by the A/V recording and communication doorbell and using the first network interface, the image data to at least one of the remote system or a client device.

In another embodiment of the second aspect, the method further comprising: receiving, by the A/V recording and communication doorbell and using the second network interface, fifth data from at least one of the electronic device or an additional electronic device; based at least in part on the fifth data, generating, by the A/V recording and communication doorbell, image data using a camera; and transmitting, by the A/V recording and communication doorbell and using the first network interface, the image data to at least one of the remote system or a client device.

In another embodiment of the second aspect, the method further comprising: based at least in part on receiving the first data, associating, by the A/V recording and communication doorbell, the identifier of the electronic device and the command with an input interface; and receiving, by the A/V recording and communication doorbell, an input using the input interface, at least one of the transmitting of the third data or the transmitting of the fourth data is based at least in part on the input.

In another embodiment of the second aspect, communicating over the first network interface uses a first amount of power and communicating over the second network interface uses a second amount of power less than the first amount of power.

In another embodiment of the second aspect, the second data further includes an additional identifier associated with a local network of devices, the local network of devices including the electronic device.

In another embodiment of the second aspect, the electronic device is a light emitter and the command is to emit light.

In another embodiment of the second aspect, the electronic device is a transformer and the command is to cause a light emitter to emit light.

In another embodiment of the second aspect, the electronic device is a locking mechanism and the command is one of locking the locking mechanism or unlocking the locking mechanism.

In another embodiment of the second aspect, at least one of the transmitting of the third data to the electronic device or the transmitting of the transmitting of the fourth data to the electronic device uses a high data rate, the high data rate being equal to or greater than 50 kilobytes per second.

In another embodiment of the second aspect, at least one of the transmitting of the third data to the electronic device or the transmitting of the transmitting of the fourth data to the electronic device uses a low data rate, the low data rate being less than 50 kilobytes per second.

In a third aspect, an audio/video (A/V) recording and communication doorbell comprises: a camera; a speaker; a microphone; at least one input interface; a network interface; one or more processors; one or more computer-readable media storing instructions that, when executed by the one or more processors, cause the one or more processors to perform operations comprising: receiving, using the at least one network interface and over a first network connection, first data from a remote system, the first data representing a command associated with an electronic device; based at least in part on receiving the first data, generating a data packet, the data packet including: second data representing an identifier of the electronic device; and third data representing the command for the electronic device; and transmitting, using the at least one network interface and over a second network connection, at least a portion of the data packet to the electronic device.

In an embodiment of the third aspect, the first data comprises an additional data packet, the additional data packet including: fourth data representing the identifier of the electronic device; and fifth data representing the command associated with the electronic device.

In another embodiment of the third aspect, the data packet further includes fourth data for synchronizing the A/V recording and communication doorbell with the electronic device.

In another embodiment of the third aspect, the third data further includes an additional identifier associated with a local network of devices, the local network of devices including the electronic device.

In another embodiment of the third aspect, further comprising instructions that, when executed by the one or more processors, cause the one or more processors to perform operations comprising, before the transmitting of the data packet, transmitting, using the at least one network interface and over the second network connection, fourth data for synchronizing the A/V recording and communication doorbell with the electronic device.

In another embodiment of the third aspect, the at least one network interface comprises: a first network interface for communicating over the first network connection; and a second network interface for communicating over the second network connection.

In another embodiment of the third aspect, the first network connection includes a wireless local area network and the second network connection includes a low-power wide-area network.

In another embodiment of the third aspect, further comprising instructions that, when executed by the one or more processors, cause the one or more processors to perform operations comprising: receiving, using the second network interface and over the second network connection, fourth data from the electronic device, the fourth data indicating that the command was performed by the electronic device; and transmitting, using the first network interface and over the first network connection, fifth data to the remote system, the fifth data indicating that the command was performed by the electronic device.

In another embodiment of the third aspect, further comprising instructions that, when executed by the one or more processors, cause the one or more processors to perform operations comprising: receiving, using the second network interface and over the second network connection, fourth data from an additional electronic device, the fourth data including an additional command to establish the first network connection with the remote system; and based at least in part on the fourth data, establishing, using the first network interface, the first network connection with the remote system, the receiving of the first data from the remote system is based at least in part on the establishing of the first network connection with the remote system.

In another embodiment of the third aspect, further comprising instructions that, when executed by the one or more processors, cause the one or more processors to perform operations comprising: determining that a time interval has elapsed; and based at least in part on the time interval elapsing, establishing, using the first network interface, the first network connection with the remote system, the receiving of the first data from the remote system is based at least in part on the establishing of the first network connection with the remote system.

In another embodiment of the third aspect, further comprising instructions that, when executed by the one or more processors, cause the one or more processors to perform operations comprising: determining that a first time interval has elapsed; based at least in part on the first time interval elapsing, transmitting, using the first network interface, a first signal to a router; determining that a second time interval has elapsed; and based at least in part on the second time interval elapsing, transmitting, using the second network interface, a second signal to at least one of the electronic device or an additional electronic device.

In another embodiment of the third aspect, the first time interval is greater than the second time interval.

In another embodiment of the third aspect, further comprising instructions that, when executed by the one or more processors, cause the one or more processors to perform operations comprising: receiving an input using the at least one input interface; based at least in part on the input, generating image data using the camera; and transmitting, using the at least one network interface, the image data to at least one of the remote system or a client device.

In another embodiment of the third aspect, further comprising a motion sensor and instructions that, when executed by the one or more processors, cause the one or more processors to perform operations comprising: detecting, using at least one of the camera or the motion sensor, motion of an object; based at least in part on the motion, generating image data using the camera; and transmitting, using the at least one network interface, the image data to at least one of the remote system or a client device.

In another embodiment of the third aspect, further comprising instructions that, when executed by the one or more processors, cause the one or more processors to perform operations comprising: receiving, using the second network interface, fourth data from at least one of the electronic device or an additional electronic device; based at least in part on the fourth data, generating image data using the camera; and transmitting, using the at least one network interface, the image data to at least one of the remote system or a client device.

In another embodiment of the third aspect, the at least one input interface includes a first input interface associated with a signaling device and a second input interface, and further comprising instructions that, when executed by the one or more processors, cause the one or more processors to perform operations comprising: based at least in part on first data, associating the identifier of the electronic device and the command with the second input interface; and receiving an input using the second input interface, the generating of the data packet is based at least in part on the input.

In another embodiment of the third aspect, communicating over the first network connection using the first network interface uses a first amount of power and communicating over the second network connection using the second network interface uses a second amount of power from the battery, the first amount of power being greater than the second amount of power.

In another embodiment of the third aspect, the at least one input interface comprises: a first input interface associated with a first command; a second input interface associated with a second command; and a third input interface associated with a third command.

In another embodiment of the third aspect, the electronic device is a light emitter and the command is to emit light.

In another embodiment of the third aspect, the electronic device is a transformer and the command is to cause a light emitter to emit light.

In another embodiment of the third aspect, the electronic device is a locking mechanism and the command is one of locking the locking mechanism or unlocking the locking mechanism.

In a fourth aspect, a method comprises: receiving, by an audio/video (A/V) recording and communication doorbell via a first type of network connection, first data from a remote system; determining, by the A/V recording and communication doorbell, that the first data represent an identifier of an electronic device; determining, by the A/V recording and communication doorbell, that the first data represents a command to be performed by the electronic device; transmitting, by the A/V recording and communication doorbell via a second type of network connection, second data to the electronic device, the second data representing the identifier of the electronic device; and transmitting, by the A/V recording and communication doorbell via the second type of network connection, third data to the electronic device, the third data representing the command to be performed by the electronic device.

In an embodiment of the fourth aspect, the method further comprising: establishing, by the A/V recording and communication doorbell and using a first network interface, the first type of network connection with the remote system; and establishing, by the A/V recording and communication doorbell and using a second network interface, the second type of network connection with the electronic device.

In another embodiment of the fourth aspect, the method further comprising: transmitting, by the A/V recording and communication doorbell, fourth data for synchronizing the A/V recording and communication doorbell with the electronic device; and based at least in part on the fourth data, establishing, by the A/V recording and communication doorbell, the second type of network connection with the electronic device.

In another embodiment of the fourth aspect, the fourth data further includes a sync word identifying a local network of devices, the local network of devices including at least the electronic device.

In another embodiment of the fourth aspect, the method further comprising: receiving, by the A/V recording and communication doorbell and via the second type of network connection, fourth data from the electronic device, the fourth data indicating that the command was performed by the electronic device; and transmitting, by the A/V recording and communication doorbell and via the first type of network connection, fifth data to the remote system, the fifth data indicating that the command was performed by the electronic device.

In another embodiment of the fourth aspect, the command is a request for information, and the method further comprising: receiving, by the A/V recording and communication doorbell and via the second type of network connection, fourth data from the electronic device, the fourth data indicating that the command was performed by the electronic device; receiving by the A/V recording and communication doorbell and via the second type of network connection, fifth data from the electronic device, the fifth data representative of the response to the request; transmitting, by the A/V recording and communication doorbell and via the first type of network connection, sixth data to the remote system, the sixth data indicating that the command was performed by the electronic device; and transmitting, by the A/V recording and communication doorbell and via the first type of network connection, seventh data to the remote system, the seventh data representative of the response to the request.

In another embodiment of the fourth aspect, at least one of: the request is for a battery level of the electronic device and the response includes the battery level; or the request is for a received signal strength identifier (RSSI) for the electronic device based on at least one received signal from the A/V recording and communication doorbell over the second type of network connection and the response includes the RSSI.

In another embodiment of the fourth aspect, the method further comprising: receiving, by the A/V recording and communication doorbell, fourth data from an additional electronic device, the fourth data including an additional command to establish the first type of network connection with the remote system; and based at least in part on the fourth data, establishing, by the A/V recording and communication doorbell, the first type of network connection with the electronic device.

In another embodiment of the fourth aspect, the method further comprising: determining, by the A/V recording and communication doorbell, that a time interval has elapsed; and based at least in part on the time interval elapsing, establishing, by the A/V recording and communication doorbell, the first type of network connection with the electronic device.

In another embodiment of the fourth aspect, the method further comprising: determining, by the A/V recording and communication doorbell, that a first time interval has elapsed; based at least in part on the first time interval elapsing, transmitting, by the A/V recording and communication doorbell, a first signal to a router; determining, by the A/V recording and communication doorbell, that a second time interval has elapsed; and based at least in part on the second time interval elapsing, transmitting, by the A/V recording and communication doorbell, a second signal to at least one of the electronic device or an additional electronic device.

In another embodiment of the fourth aspect, the first time interval is greater than the second time interval.

In another embodiment of the fourth aspect, the method further comprising: receiving, by the A/V recording and communication doorbell, an input using an input interface; based at least in part on the input, generating, by the A/V recording and communication doorbell, image data using a camera; and transmitting, by the A/V recording and communication doorbell, the image data to at least one of the remote system or a client device.

In another embodiment of the fourth aspect, the method further comprising: detecting, by the A/V recording and communication doorbell, motion of an object; based at least in part on the motion, generating, by the A/V recording and communication doorbell, image data using a camera; and transmitting, by the A/V recording and communication doorbell, the image data to at least one of the remote system or a client device.

In another embodiment of the fourth aspect, the method further comprising: receiving, by the A/V recording and communication doorbell, fourth data from at least one of the electronic device or an additional electronic device; based at least in part on the fourth data, generating, by the A/V recording and communication doorbell, image data using a camera; and transmitting, by the A/V recording and communication doorbell, the image data to at least one of the remote system or a client device.

In another embodiment of the fourth aspect, the method further comprising: based at least in part on receiving the first data, associating, by the A/V recording and communication doorbell, the identifier of the electronic device and the command with an input interface; and receiving, by the A/V recording and communication doorbell, an input using the input interface, at least one of the transmitting of the second data or the transmitting of the third data is based at least in part on the input.

In another embodiment of the fourth aspect, communicating over the first type of network connection uses a first amount of power and communicating over the second type of network connection uses a second amount of power less than the first amount of power.

In another embodiment of the fourth aspect, the electronic device is a light emitter and the command is to emit light.

In another embodiment of the fourth aspect, the electronic device is a transformer and the command is to cause a light emitter to emit light.

In another embodiment of the fourth aspect, the electronic device is a locking mechanism and the command is one of locking the locking mechanism or unlocking the locking mechanism.

In a fifth embodiment, a system comprises: an audio/video (A/V) recording and communication doorbell, the A/V recording and communication doorbell configured to: receive, over a first wireless network, a first data packet from a remote system; determine that the first data packet includes first data representing an identifier of an electronic device; determine that the first data packet includes second data representing a command for the electronic device; generate a second data packet, the second data packet including: third data for synchronizing the A/V recording and communication doorbell with the electronic device; fourth data representing the identifier of the electronic device; and fifth data representing the command for the electronic device; and transmit, over a second wireless network, at least a portion of the second data packet to the electronic device; and the electronic device, the electronic device configured to: transition from operating in a deactivated mode to an active mode; receive, while operating in the active mode, at least a portion of the third data from the data packet; based at least in part on the at least the portion of the third data, determine to continue to operate in the active mode; receive, while operating in the active mode, the fourth data and the fifth data from the data packet; determine, based at least in part on the fourth data, that the data packet is for the electronic device; and perform the command represented by the fifth data.

In an embodiment of the fifth aspect, the first wireless network includes a wireless area local network and the second wireless network includes a low-power wide-area network.

In another embodiment of the fifth aspect, the A/V recording and communication doorbell communicates over the first wireless network using a first network interface and communicates over the second wireless network using a second network interface.

In another embodiment of the fifth aspect, communicating over the first wireless network uses a first amount of power and communicating over the second wireless network uses a second amount of power, the first amount of power being greater than the second amount of power.

In another embodiment of the fifth aspect, the electronic device is a light emitter, and to perform the command represented by the fifth data comprises causing a light source to emit light.

In another embodiment of the fifth aspect, the electronic device is a transformer, and to perform the command represented by the fifth data comprises causing a light emitter to emit light.

In another embodiment of the fifth aspect, the electronic device is a locking mechanism, and to perform the command represented by the fifth data comprises one of unlocking an entrance or locking an entrance.

In a sixth aspect, a method comprises: receiving, by an audio/video (A/V) recording and communication doorbell over a first wireless network, a first data packet from a remote system; determining, by the A/V recording and communication doorbell, that the first data packet includes first data representing an identifier of an electronic device; determining, by the A/V recording and communication doorbell, that the first data packet includes second data representing a command for the electronic device; generating, by the A/V recording and communication doorbell, a second data packet, the second data packet including: third data for synchronizing the A/V recording and communication doorbell with the electronic device; fourth data representing the identifier of the electronic device; and fifth data representing the command for the electronic device; and transmitting, by the A/V recording and communication doorbell and over a second wireless network, at least a portion of the second data packet to the electronic device; transitioning, by the electronic device, from operating in a deactivated mode to an active mode; receiving, by the electronic device and while operating in the active mode, at least a portion of the third data from the data packet; based at least in part on the at least the portion of the third data, determining, by the electronic device, to continue to operate in the active mode; receive, by the electronic device and while operating in the active mode, the fourth data and the fifth data from the data packet; determining, by the electronic device and based at least in part on the fourth data, that the data packet is for the electronic device; and performing, by the electronic device, the command represented by the fifth data.

In a seventh aspect, a system comprises: an audio/video (A/V) recording and communication doorbell, the A/V recording and communication doorbell configured to: receive, over a first wireless network, a first data from a remote system, the first data representing a command associated with an electronic device; based at least in part on receiving the first data, generating a data packet, the data packet including: second data representing an identifier of the electronic device; and third data representing the command for the electronic device; and transmitting, using over a second wireless network, at least a portion of the data packet to the electronic device. the electronic device, the electronic device configured to: receive, over the second wireless network, the at least the portion of the data packet from the A/V recording and communication device; determine, based at least in part on the second data, that the data packet is for the electronic device; and perform the command represented by the third data.

In an eighth aspect, an audio/video recording and communication device (A/V device) comprises: a camera; a speaker; a microphone; a first network interface for communicating over a wireless local area network (WLAN); a second network interface for communicating over a low-power wide-area network (LPWAN); one or more processors; and one or more computer-readable media storing instructions that, when executed by the one or more processors, cause the one or more processors to perform operations comprising: receiving, using the first network interface and over the WLAN, a first data packet from a remote system; determining that the first data packet includes first data representing an identifier of an electronic device; determining that the first data packet includes second data representing a command for the electronic device; generating a second data packet, the second data packet including at least: third data for synchronizing the A/V device with the electronic device; fourth data representing the identifier of the electronic device; and fifth data representing the command for the electronic device; transmitting, using the second network interface and over the LPWAN, at least a portion of the second data packet to the electronic device; receiving, using the second network interface and over the LPWAN, a third data packet from the electronic device; determining, using the third data packet, that the command was performed by the electronic device; generating a fourth data packet indicating that the command was performed by the electronic device; and transmitting, using the first network interface and over the WLAN, the fourth data packet to the remote system.

In an embodiment of the eighth aspect, the one or more computer-readable media storing further instructions that, when executed by the one or more processors, cause the one or more processors to perform further operations comprising: deactivating the first network interface; determining that a first period of time has elapsed since deactivating the first network interface; after determining that the first period of time has elapsed, activating the first network interface; deactivating the second network interface; determining that a second period of time has elapsed since deactivating of the second network interface; and after determining that the second period of time has elapsed, activating the second network interface, the first period of time is different than the second period of time.

In another embodiment of the eighth aspect, the one or more computer-readable media storing further instructions that, when executed by the one or more processors, cause the one or more processors to perform further operations comprising: detecting, using at least one of the camera or a motion sensor, possible motion of an object; after detecting the possible motion, generating image data using the camera; and transmitting, using the first network interface and over the WLAN, the image data to the remote system.

In another embodiment of the eighth aspect, the A/V device further comprising a battery, communicating over the WLAN using the first network interface uses a first amount of power from the battery and communicating over the LPWAN using the second network interface uses a second amount of power from the battery, the first amount of power being greater than the second amount of power.

In a ninth aspect, an electronic device comprises: a first network interface; a second network interface; one or more processors; one or more computer-readable media storing instructions that, when executed by the one or more processors, cause the one or more processors to perform operations comprising: receiving, using the first network interface and over a first network, first data from a remote system, the first data representing a command associated with an additional electronic device; after receiving the first data, generating a data packet that includes at least: second data representing an identifier of the additional electronic device; and third data representing the command for the additional electronic device; and transmitting, using the second network interface and over a second network, at least a portion of the data packet to the additional electronic device.

In an embodiment of the ninth aspect, the first network includes a wireless local area network and the second network includes a low-power wide-area network.

In another embodiment of the ninth aspect, communicating over the first network using the first network interface uses a first amount of power and communicating over the second network using the second network interface using a second amount of power, the first amount of power being different than the second amount of power.

In another embodiment of the ninth aspect, the one or more computer-readable media storing further instructions that, when executed by the one or more processors, cause the one or more processors to perform further operations comprising: deactivating the first network interface; determining that a first period of time has elapsed since deactivating the first network interface; after determining that the first period of time has elapsed, activating the first network interface; deactivating the second network interface; determining that a second period of time has elapsed since deactivating of the second network interface; and after determining that the second period of time has elapsed, activating the second network interface.

In another embodiment of the ninth aspect, the data packet further includes fourth data for synchronizing the electronic device with the additional electronic device.

In another embodiment of the ninth aspect, the one or more computer readable media storing further instructions that, when executed by the one or more processors, cause the one or more processors to perform further operations comprising: receiving, using the second network interface and over the second network, fourth data from the additional electronic device, the fourth data indicating that the command was performed by the additional electronic device; and transmitting, using the first network interface and over the first network, fifth data to the remote system, the fifth data indicating that the command was performed by the additional electronic device.

In another embodiment of the ninth aspect, the one or more computer readable media storing further instructions that, when executed by the one or more processors, cause the one or more processors to perform further operations comprising: receiving, using the second network interface and over the second network, fourth data including an additional command to establish a network connection with the remote system; and after receiving the fourth data, establishing, using the first network interface and over the first network, the network connection with the remote system, receiving the first data from the remote system occurs after establishing the network connection with the remote system.

In another embodiment of the ninth aspect, the one or more computer readable media storing further instructions that, when executed by the one or more processors, cause the one or more processors to perform further operations comprising: determining that a time interval has elapsed; and after determining that the time interval has elapsed, establishing, using the first network interface and over the first network, a network connection with the remote system, receiving the first data from the remote system occurs after establishing the network connection with the remote system.

In another embodiment of the ninth aspect, the one or more computer readable media storing further instructions that, when executed by the one or more processors, cause the one or more processors to perform further operations comprising: determining that a time interval has elapsed; and after determining that the time interval has elapsed, establishing, using the second network interface and over the second network, a network connection with the additional electronic device, transmitting the at least the portion of the data packet to the additional electronic device occurs after establishing the network connection with the additional electronic device.

In another embodiment of the ninth aspect, the electronic device further comprising an input interface and a camera, the one or more computer readable media store further instructions that, when executed by the one or more processors, cause the one or more processors to perform further operations comprising: receiving an input using the at least one input interface; after receiving the input, generating image data using the camera; and transmitting, using the first network interface and over the first network, the image data to at least one of the remote system or a client device.

In another embodiment of the ninth aspect, the electronic device further comprising a camera, the one or more computer readable media store further instructions that, when executed by the one or more processors, cause the one or more processors to perform further operations comprising: detecting, using at least one of the camera or a motion sensor, possible motion of an object; after detecting the possible motion, generating image data using the camera; and transmitting, using the first network interface and over the first network, the image data to at least one of the remote system or a client device.

In a tenth aspect, a method comprises: establishing, using a first network interface, a first network connection with a remote system; receiving, using the first network connection, first data from the remote system; determining that the first data represents an identifier of an electronic device; determining that the first data represents a command for the electronic device; establishing, using a second network interface, a second network connection with an electronic device; transmitting, using the second network connection, second data representing the identifier of the electronic device; and transmitting, using the second network connection, third data representing the command for the electronic device.

In an embodiment of the tenth aspect, wherein: establishing the first network connection comprises establishing, using the first network interface, a wireless local area network connection with the remote system; and establishing the second network connection comprises establishing, using the second network interface, a low-power wide-area network connection with the electronic device.

In another embodiment of the tenth aspect, the method further comprising at least one of: transmitting fourth data to the remote system, the fourth data associated with synchronizing first communications with the remote system; or transmitting fifth data to the electronic device, the fifth data associated with synchronizing second communications with the electronic device.

In another embodiment of the tenth aspect, the method further comprising, after receiving the first data, generating a data packet, the data packet including at least: fourth data for synchronizing an additional electronic device with the electronic device; the second data representing the identifier of the electronic device; and the third data representing the command for the electronic device.

In another embodiment of the tenth aspect, the method further comprising: deactivating the first network interface; determining that a first period of time has elapsed since deactivating the first network interface; after determining that the first period of time has elapsed, activating the first network interface; deactivating the second network interface; determining that a second period of time has elapsed since deactivating of the second network interface; and after determining that the second period of time has elapsed, activating the second network interface.

What is claimed is:

1. An audio/video recording and communication device (A/V device) comprising:
   a camera;
   a speaker;
   a microphone;
   a first network interface for communicating over a wireless local area network (WLAN);
   a second network interface for communicating over a low-power wide-area network (LPWAN);
   one or more processors; and
   one or more computer-readable media storing instructions that, when executed by the one or more processors, cause the one or more processors to perform operations comprising:

receiving, using the first network interface and over the WLAN, a first data packet from a remote system;

determining that the first data packet includes first data representing an identifier of an electronic device;

generating a second data packet, the second data packet including at least:
    second data representing the identifier of the electronic device; and
    third data representing a command for the electronic device;

sending, using the second network interface and over the LPWAN, at least a portion of the second data packet to the electronic device;

receiving, using the second network interface and over the LPWAN, a third data packet from the electronic device;

generating a fourth data packet indicating that the command was performed by the electronic device; and sending, using the first network interface and over the WLAN, the fourth data packet to the remote system.

2. The A/V device as recited in claim 1, the one or more computer-readable media storing further instructions that, when executed by the one or more processors, cause the one or more processors to perform further operations comprising:

deactivating the first network interface;
determining that a first period of time has elapsed since the deactivating of the first network interface;
based at least in part on the determining that the first period of time has elapsed, activating the first network interface;
deactivating the second network interface;
determining that a second period of time has elapsed since the deactivating of the second network interface; and
based at least in part on the determining that the second period of time has elapsed, activating the second network interface,
wherein the first period of time is different than the second period of time.

3. The A/V device as recited in claim 1, the one or more computer-readable media storing further instructions that, when executed by the one or more processors, cause the one or more processors to perform further operations comprising:

detecting, using at least one of the camera or a motion sensor, possible motion of an object;
based at least in part on the detecting of the possible motion, generating image data using the camera; and
sending, using the first network interface and over the WLAN, the image data to the remote system.

4. The A/V device as recited in claim 1, further comprising a battery, wherein communicating over the WLAN using the first network interface uses a first amount of power from the battery and communicating over the LPWAN using the second network interface uses a second amount of power from the battery, the first amount of power being greater than the second amount of power.

5. An audio/video recording and communication doorbell (A/V doorbell) comprising:
    a first network interface;
    a second network interface;
    a camera;
    one or more speakers;
    one or more microphones;
    an input interface;
    one or more processors; and
    one or more computer-readable media storing instructions that, when executed by the one or more processors, cause the one or more processors to perform operations comprising:
        receiving, using the first network interface and over a first network, first data from a remote system, the first data representing an identifier associated with an electronic device;
        receiving, using the first network interface and over the first network, second data from the remote system, the second data representing a first command associated with the electronic device;
        sending, using the second network interface and over a second network, third data to the electronic device, the third data representing the identifier associated with the electronic device;
        sending, using the second network interface and over the second network, fourth data to the electronic device, the fourth data representing the first command associated with the electronic device;
        receiving, using the second network interface and over the second network, fifth data from the electronic device, the fifth data indicating that the first command was performed by the electronic device; and
        sending, using the first network interface and over the first network, sixth data to the remote system, the sixth data indicating that the first command was performed by the electronic device.

6. The A/V doorbell as recited in claim 5, wherein the first network includes a wireless local area network and the second network includes a low-power wide-area network.

7. The A/V doorbell as recited in claim 5, wherein communicating over the first network using the first network interface uses a first amount of power and communicating over the second network using the second network interface uses a second amount of power, the first amount of power being different than the second amount of power.

8. The A/V doorbell as recited in claim 5, the one or more computer-readable media storing further instructions that, when executed by the one or more processors, cause the one or more processors to perform further operations comprising:

deactivating the first network interface;
determining that a first period of time has elapsed since the deactivating of the first network interface;
based at least in part on the determining that the first period of time has elapsed, activating the first network interface;
deactivating the second network interface;
determining that a second period of time has elapsed since the deactivating of the second network interface; and
based at least in part on the determining that the second period of time has elapsed, activating the second network interface.

9. The A/V doorbell as recited in claim 5, the one or more computer readable media storing further instructions that, when executed by the one or more processors, cause the one or more processors to perform further operations comprising sending seventh data for synchronizing the A/V doorbell with the electronic device.

10. The A/V doorbell as recited in claim 5, the one or more computer readable media storing further instructions that, when executed by the one or more processors, cause the one or more processors to perform further operations comprising:

receiving, using the second network interface and over the second network, seventh data representing a second command to establish a network connection with the remote system; and based at least in part on the receiving of the seventh data, establishing, using the first network interface and over the first network, the network connection with the remote system, wherein the receiving of the first data from the remote system occurs based at least in part on the establishing of the network connection.

11. The A/V doorbell as recited in claim 5, the one or more computer readable media storing further instructions that, when executed by the one or more processors, cause the one or more processors to perform further operations comprising:

determining that a time interval has elapsed; and based at least in part on the determining that the time interval has elapsed, establishing, using the first network interface and over the first network, a network connection with the remote system, wherein the receiving of the first data from the remote system occurs based at least in part on the establishing of the network connection.

12. The A/V doorbell as recited in claim 5, the one or more computer readable media storing further instructions that, when executed by the one or more processors, cause the one or more processors to perform further operations comprising:

determining that a time interval has elapsed; and based at least in part on the determining that the time interval has elapsed, establishing, using the second network interface and over the second network, a network connection with the electronic device, wherein the sending of the third data to the electronic device occurs based at least in part on the establishing of the network connection.

13. The A/V doorbell as recited in claim 5, the one or more computer readable media storing further instructions that, when executed by the one or more processors, cause the one or more processors to perform further operations comprising:

receiving an input using the input interface;

based at least in part on the receiving of the input, generating image data using the camera; and sending, using the first network interface and over the first network, the image data to at least one of the remote system or a user device.

14. The A/V doorbell as recited in claim 5, the one or more computer readable media storing further instructions that, when executed by the one or more processors, cause the one or more processors to perform further operations comprising:

detecting, using at least one of the camera or a motion sensor, possible motion of an object;

based at least in part on the detecting of the possible motion, generating image data using the camera; and sending, using the first network interface and over the first network, the image data to at least one of the remote system or a user device.

15. The A/V doorbell as recited in claim 5, wherein the first command is associated with at least one of activating the electronic device or deactivating the electronic device.

16. A method comprising:

establishing, using a first network interface, a first network connection with a remote system;

receiving, using the first network connection, first data from the remote system, the first data representing an identifier associated with an electronic device;

receiving, using the first network connection, second data representing a command for the electronic device;

establishing, using a second network interface, a second network connection with the electronic device;

sending, using the second network connection and to the electronic device, third data representing the identifier;

sending, using the second network connection and to the electronic device, fourth data representing the command;

receiving, using the second network connection and from the electronic device, fifth data indicating that the command was performed by the electronic device; and sending, using the first network connection and to the remote system, sixth data indicating that the command was performed by the electronic device.

17. The method as recited in claim 16, wherein:

the establishing of the first network connection comprises establishing, using the first network interface, a wireless local area network connection with the remote system; and the establishing of the second network connection comprises establishing, using the second network interface, a low-power wide-area network connection with the electronic device.

18. The method as recited in claim 16, further comprising at least one of:

sending seventh data to the remote system, the seventh data associated with synchronizing first communications with the remote system; or sending eighth data to the electronic device, the eighth data associated with synchronizing second communications with the electronic device.

19. The method as recited in claim 16, further comprising generating a data packet, the data packet including at least:

seventh data for synchronizing with the electronic device;

the third data representing the identifier; and the fourth data representing the command.

20. The method as recited in claim 16, further comprising:

deactivating the first network interface;

determining that a first period of time has elapsed since the deactivating of the first network interface;

based at least in part on the determining that the first period of time has elapsed, activating the first network interface;

deactivating the second network interface;

determining that a second period of time has elapsed since the deactivating of the second network interface; and based at least in part on the determining that the second period of time has elapsed, activating the second network interface.

* * * * *